(12) United States Patent
Kakutani

(10) Patent No.: US 7,742,195 B2
(45) Date of Patent: Jun. 22, 2010

(54) IMAGE PROCESSING DEVICE, IMAGE PROCESSING METHOD, AND PROGRAM PRODUCT FOR THE SAME

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1113 days.

(21) Appl. No.: 11/241,782

(22) Filed: Sep. 29, 2005

(65) Prior Publication Data

US 2006/0215227 A1    Sep. 28, 2006

(30) Foreign Application Priority Data

Sep. 30, 2004  (JP)  ............... 2004-288712
Nov. 4, 2004   (JP)  ............... 2004-320146

(51) Int. Cl.
G06K 15/00  (2006.01)
H04N 1/40   (2006.01)

(52) U.S. Cl. ................ 358/3.13; 358/3.09; 358/3.14; 358/3.21

(58) Field of Classification Search .......... 358/1.9, 358/3.16, 3.01
See application file for complete search history.

(56) References Cited

U.S. PATENT DOCUMENTS

| | | | | |
|---|---|---|---|---|
| 5,980,012 | A * | 11/1999 | Fujita et al. | 347/5 |
| 6,543,870 | B1 * | 4/2003 | Kakutani | 347/15 |
| 6,731,817 | B2 * | 5/2004 | Shibaki et al. | 382/252 |
| 7,050,194 | B1 * | 5/2006 | Someno et al. | 358/1.9 |
| 7,251,060 | B2 | 7/2007 | Tonami et al. | |
| 2002/0181987 | A1 * | 12/2002 | Kakutani | 400/76 |
| 2003/0038853 | A1 | 2/2003 | Moroo | |
| 2005/0015193 | A1 * | 1/2005 | Yasui et al. | 701/99 |
| 2007/0188777 | A1 * | 8/2007 | Kakutani | 358/1.9 |

FOREIGN PATENT DOCUMENTS

| | | |
|---|---|---|
| JP | 2002-185785 | 6/2002 |
| JP | 2002-185789 | 6/2002 |
| WO | WO 01/98086 | 12/2001 |

OTHER PUBLICATIONS

Abstract of Japanese Patent Publication No. 2002-185789, Pub. Date: Jun. 28, 2002, Patent Abstracts of Japan.
Abstract of Japanese Patent Publication No. 2002-185785, Pub. Date: Jun. 28, 2002, Patent Abstracts of Japan.

* cited by examiner

*Primary Examiner*—Twyler L Haskins
*Assistant Examiner*—David L Suazo
(74) *Attorney, Agent, or Firm*—Martine Penilla & Gencarella, LLP

(57) ABSTRACT

An image printing process of the invention first specifies a pixel group tone value of each pixel group consisting of a preset number of multiple pixels and refers to one of correlation maps selected for the pixel group to convert the specified pixel group tone value to a multivalue code. Each of the correlation maps sets multivalue codes in correlation to pixel group tone values. The multivalue codes of all pixel groups constituting an image are output as control data to an image output device. The image output device determines the dot on-off state in respective pixels of each pixel group according to the received control data and actually creates dots on an output medium to complete an output image. Each correlation map referred to for the multivalue coding has a slightly lower tone resolution in a higher tone value area than in a lower tone value area. This arrangement desirably reduces the data volume of the control data, while preventing deterioration of the picture quality. The technique of the invention enables quick output of the control data and accordingly ensures high-speed output of a high-quality image by this simple procedure.

23 Claims, 45 Drawing Sheets

MAIN SCANNING DIRECTION

SUB-SCANNING DIRECTION

Fig.13

| ENCODED DOT NUMBER DATA | NUMBERS OF DOTS | | |
|---|---|---|---|
| | LARGE-SIZE DOT | MEDIUM-SIZE DOT | SMALL-SIZE DOT |
| 0 | 0 | 0 | 0 |
| 1 | 0 | 0 | 1 |
| 2 | 0 | 0 | 2 |
| 3 | 0 | 0 | 3 |
| 160 | 6 | 2 | 0 |
| 161 | 7 | 0 | 0 |
| 162 | 7 | 0 | 1 |
| 163 | 7 | 1 | 0 |
| 164 | 8 | 0 | 0 |

Fig.14

(a) PRIORITY ORDER MATRIX CORRESPONDING TO PIXEL GROUP CLASSIFICATION NUMBER '1'

| 1 | 6 | 3 | 5 |
|---|---|---|---|
| 8 | 4 | 7 | 2 |

(b) PRIORITY ORDER MATRIX CORRESPONDING TO PIXEL GROUP CLASSIFICATION NUMBER '2'

| 3 | 6 | 4 | 5 |
|---|---|---|---|
| 8 | 1 | 7 | 2 |

(c) PRIORITY ORDER MATRIX CORRESPONDING TO PIXEL GROUP CLASSIFICATION NUMBER '3'

| 6 | 4 | 1 | 7 |
|---|---|---|---|
| 2 | 8 | 5 | 3 |

Fig.16

→ 128 PIXELS

↓ 64 PIXELS

| 1 | 177 | 58 | 170 | 70 | 186 | 79 | 161 | 94 | 171 | 16 | 164 | 24 | 158 | 227 | 6 | 133 | 157 |
|---|---|---|---|---|---|---|---|---|---|---|---|---|---|---|---|---|---|
| 255 | 109 | 212 | 42 | 242 | 5 | 223 | 48 | 209 | 67 | 248 | 81 | 234 | 132 | 56 | 120 | 253 | |
| 123 | 33 | 127 | 181 | 83 | 155 | 105 | 140 | 30 | 150 | 119 | 182 | 40 | 89 | 220 | 163 | 44 | |
| 219 | 91 | 237 | 22 | 121 | 198 | 61 | 188 | 111 | 215 | 3 | 98 | 201 | 140 | 10 | 95 | | |
| 11 | 195 | 53 | 136 | 227 | 37 | 247 | 12 | 233 | 52 | 192 | 135 | 32 | 246 | 113 | 194 | | |
| 99 | 144 | 107 | 184 | 68 | 172 | 97 | 151 | 77 | 173 | 84 | 237 | 123 | 61 | 167 | 46 | | |
| 225 | 40 | 251 | 6 | 217 | 116 | 28 | 196 | 125 | 35 | 207 | 17 | 153 | 203 | 24 | | | |
| 87 | 169 | 78 | 162 | 59 | 146 | 211 | 64 | 254 | 142 | 72 | 178 | 87 | 118 | 228 | | | |
| 190 | 15 | 202 | 111 | 238 | 19 | 93 | 169 | 8 | 110 | 221 | 49 | 249 | 2 | 144 | | | |
| 74 | 246 | 134 | 43 | 174 | 128 | 230 | 50 | 216 | 154 | 26 | 168 | 79 | 184 | | | | |
| 176 | 30 | 98 | 219 | 86 | 34 | 139 | 195 | 101 | 56 | 241 | 127 | 213 | 37 | | | | |
| 69 | 148 | 196 | 2 | 159 | 247 | 89 | 11 | 136 | 185 | 92 | 14 | 108 | | | | | |
| 187 | 41 | 126 | 226 | 106 | 57 | 190 | 115 | 235 | 36 | 208 | 121 | 229 | | | | | |
| 81 | 214 | 92 | 53 | 145 | 204 | 27 | 166 | 74 | 157 | 82 | 165 | 31 | | | | | |
| 232 | 21 | 170 | 240 | 13 | 132 | 252 | 51 | 222 | 4 | 245 | 48 | | | | | | |
| 130 | 155 | 55 | 115 | 183 | 78 | 122 | 196 | 102 | 180 | 65 | 173 | | | | | | |
| 72 | 252 | 100 | 211 | 45 | 231 | 20 | 148 | 39 | 133 | 205 | | | | | | | |
| 202 | 32 | 179 | 5 | 163 | 95 | 191 | 86 | 239 | 111 | 29 | | | | | | | |
| 104 | 143 | 58 | 243 | 70 | 218 | 63 | 161 | 9 | 209 | | | | | | | | |
| 64 | 236 | 129 | 110 | 151 | 25 | 199 | 49 | 172 | 68 | | | | | | | | |
| 171 | 17 | 208 | 38 | 225 | 131 | 99 | 254 | 113 | | | | | | | | | |
| 80 | 191 | 87 | 174 | 76 | 189 | 13 | 143 | | | | | | | | | | |
| 247 | 35 | 152 | 2 | 248 | 55 | | | | | | | | | | | | |
| 140 | 108 | 197 | 127 | 96 | | | | | | | | | | | | | |
| 13 | 215 | 46 | 229 | | | | | | | | | | | | | | |
| 164 | 90 | 180 | | | | | | | | | | | | | | | |
| 52 | 253 | | | | | | | | | | | | | | | | |
| 205 | | | | | | | | | | | | | | | | | |

Fig.19A
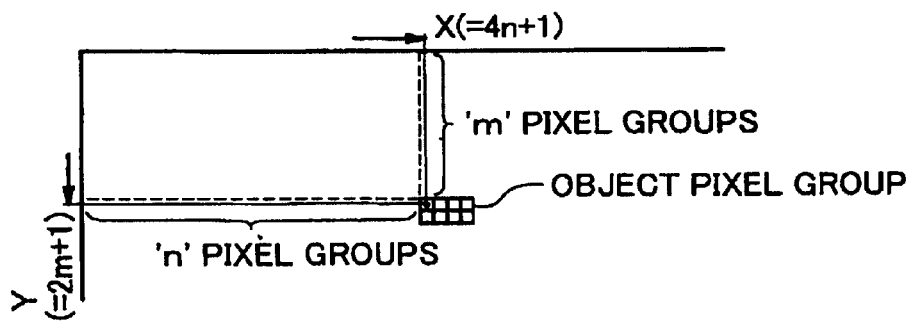
Fig.19B
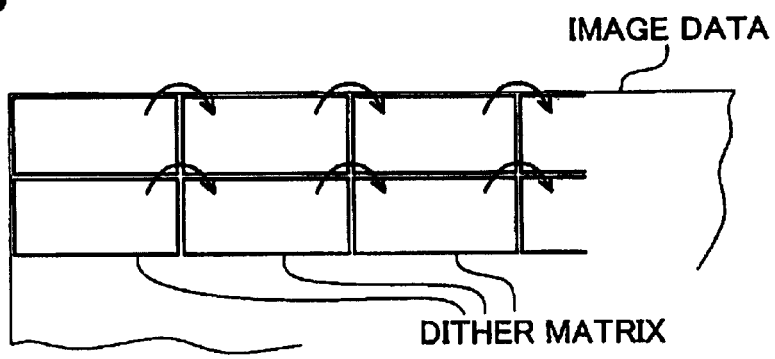
Fig.19C
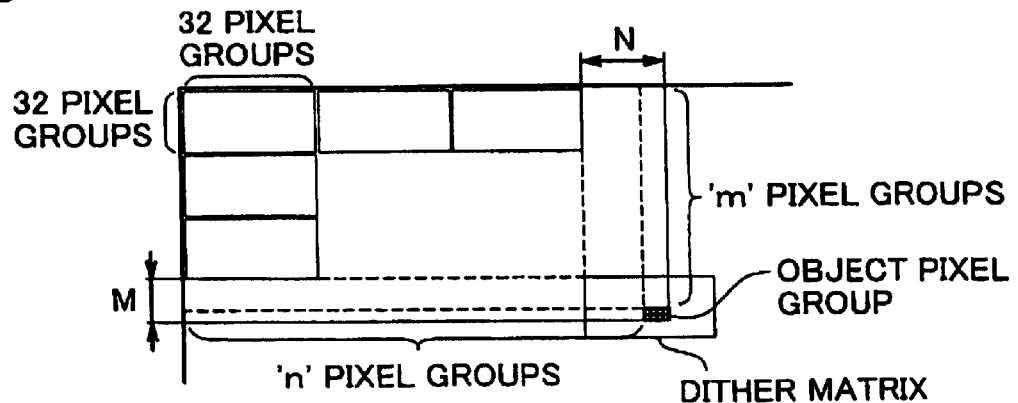
Fig.19D
$$\begin{cases} N = n - \text{int}(n/32) \times 32 + 1 \\ M = m - \text{int}(m/32) \times 32 + 1 \end{cases}$$

Fig.20

(a)      X :    |1|2|3|4|5|6|7|8|9|10|
                                          ⟩ RIGHTWARD SHIFT BY 2 BITS (b)      n :    |0|0|1|2|3|4|5|6|7|8|
                                          ⟩ RIGHTWARD SHIFT BY 5 BITS (c)      int (n/32) :    |0|0|0|0|0|0|0|1|2|3|
                                         ⟩ LEFTWARD SHIFT BY 5 BITS (d)      int (n/32) × 32 :    |0|0|1|2|3|0|0|0|0|0|

(e)      n − int (n/32) × 32 :    |0|0|0|0|0|4|5|6|7|8|

(f)      MASK DATA :    |0|0|0|0|0|1|1|1|1|1|

(g)      MASK DATA :    |0|0|0|1|1|1|1|1|0|0|

Fig.25

| NUMBER OF THRESHOLD TONE VALUES Rth | THRESHOLD TONE VALUE Vth | PIXEL GROUP TONE VALUE | MULTIVALUE CODE |
|---|---|---|---|
| | | 0~11 | 1 |
| 1 | 12 | 12~30 | 2 |
| 2 | 31 | 31~34 | 3 |
| 3 | 35 | 35~55 | 4 |
| 4 | 56 | 56~58 | 5 |
| 5 | 59 | 59~81 | 6 |
| 6 | 82 | 82~87 | 7 |
| 7 | 88 | 88~107 | 8 |
| ⋮ | ⋮ | ⋮ | ⋮ |
| 12 | 179 | 179~189 | 13 |
| 13 | 190 | 190~197 | 14 |
| 14 | 198 | 198~202 | 15 |
| 15 | 203 | 203~207 | 16 |
| 16 | 208 | 208~224 | 17 |
| 17 | 225 | 225~236 | 18 |
| 18 | 237 | 237~255 | 19 |

→

| NUMBER OF THRESHOLD TONE VALUES Lth | THRESHOLD TONE VALUE Vth | PIXEL GROUP TONE VALUE | MULTIVALUE CODE |
|---|---|---|---|
| | | 0~11 | 1 |
| 1 | 12 | 12~30 | 2 |
| 2 | 31 | 31~34 | 3 |
| 3 | 35 | 35~55 | 4 |
| 4 | 56 | 56~58 | 5 |
| 5 | 59 | 59~81 | 6 |
| 6 | 82 | 82~87 | 7 |
| 7 | 88 | 88~107 | 8 |
| ⋮ | ⋮ | ⋮ | ⋮ |
| 12 | 179 | 179~197 | 13 |
| 13 | 198 | 198~207 | 14 |
| 14 | 208 | 208~236 | 15 |
| 15 | 237 | 237~255 | 16 |

Fig.26

| NUMBER OF THRESHOLD TONE VALUES Ith | THRESHOLD TONE VALUE Vth(Ith) |
|---|---|
| 1 | 12 |
| 2 | 31 |
| 3 | 35 |
| 4 | 56 |
| 5 | 59 |
| 6 | 82 |
| 7 | 88 |
| ⋮ | ⋮ |
| 12 | 179 |
| 13 | 198 |
| 14 | 208 |
| 15 | 237 |
| (255) | |

TONE DIFFERENCE =19
TONE DIFFERENCE =10
TONE DIFFERENCE =29
TONE DIFFERENCE =18

⟹

| NUMBER OF THRESHOLD TONE VALUES Ith | THRESHOLD TONE VALUE Vth(Ith) |
|---|---|
| 1 | 12 |
| 2 | 31 |
| 3 | 35 |
| 4 | 56 |
| 5 | 59 |
| 6 | 82 |
| 7 | 88 |
| ⋮ | ⋮ |
| 12 | 179 |
| 13 | 185 |
| 14 | 201 |
| 15 | 225 |
| (255) | |

TONE DIFFERENCE =16
TONE DIFFERENCE =16
TONE DIFFERENCE =24
TONE DIFFERENCE =30

Fig.32A
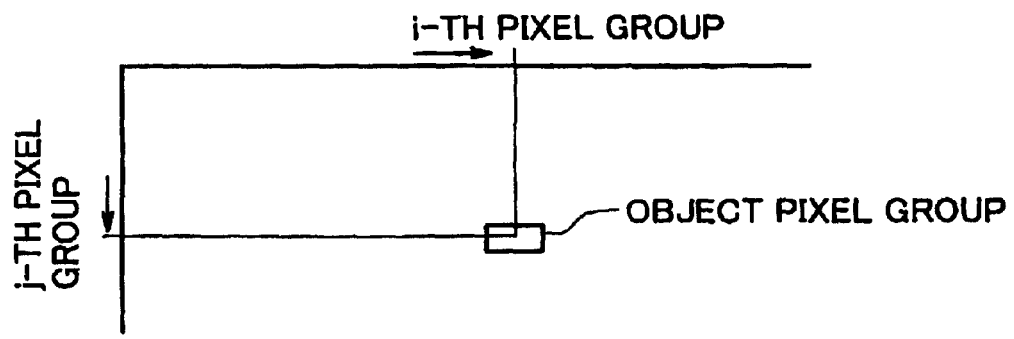
Fig.32B
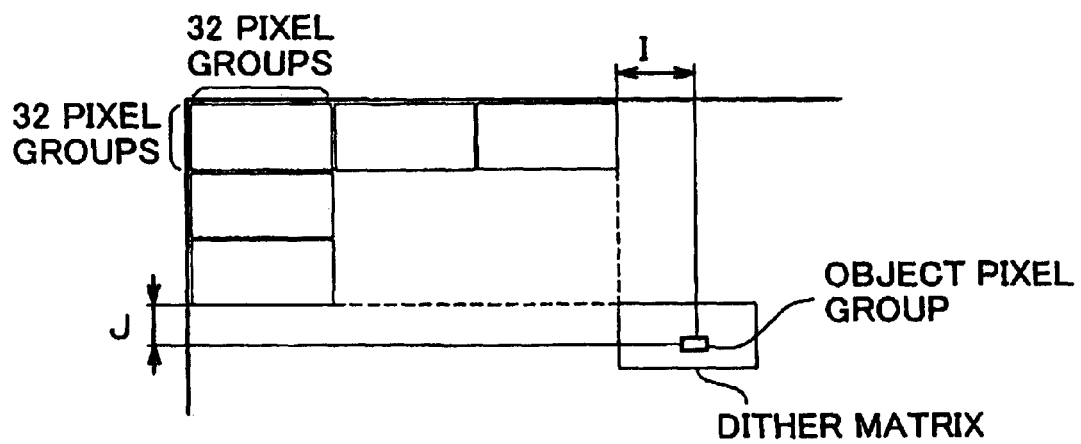
Fig.32C
$$\begin{cases} I = i - \text{int}(i/32) \times 32 \\ J = j - \text{int}(j/32) \times 32 \end{cases}$$

Fig.33

$\left\{\begin{array}{l}\text{(a)} \quad i \quad : \quad \boxed{1|2|3|4|5|6|7|8|9|10} \\ \qquad\qquad\qquad\qquad\qquad\qquad\qquad\qquad\text{RIGHTWARD SHIFT BY 5 BITS} \\ \text{(b)} \quad \text{int (i/32)} \quad : \quad \boxed{0|0|0|0|0|1|2|3|4|5} \\ \qquad\qquad\qquad\qquad\qquad\qquad\qquad\qquad\text{LEFTWARD SHIFT BY 5 BITS} \\ \text{(c)} \quad \text{int (i/32)} \times 32 \quad : \quad \boxed{1|2|3|4|5|0|0|0|0|0} \\ \text{(d)} \quad i - \text{int (i/32)} \times 32 \quad : \quad \boxed{0|0|0|0|0|6|7|8|9|10}\end{array}\right.$

Fig.38

| NUMBER OF THRESHOLD TONE VALUES Ith | THRESHOLD TONE VALUE Vth(Ith) |
|---|---|
| 1 | 17 |
| 2 | 34 |
| 3 | 56 |
| 4 | 74 |
| 5 | 116 |
| 6 | 178 |
| 7 | 212 |
| (255) | |

TONE DIFFERENCE =42 (between 4 and 5)
TONE DIFFERENCE =62 (between 5 and 6)
TONE DIFFERENCE =34 (between 6 and 7)
TONE DIFFERENCE =43 (between 7 and 255)

→

| NUMBER OF THRESHOLD TONE VALUES Ith | THRESHOLD TONE VALUE Vth(Ith) |
|---|---|
| 1 | 17 |
| 2 | 34 |
| 3 | 56 |
| 4 | 74 |
| 5 | 104 |
| 6 | 144 |
| 7 | 194 |
| (255) | |

TONE DIFFERENCE =30 (between 4 and 5)
TONE DIFFERENCE =40 (between 5 and 6)
TONE DIFFERENCE =50 (between 6 and 7)
TONE DIFFERENCE =61 (between 7 and 255)

Fig.39
PIXEL GROUP A
| NUMBER OF THRESHOLD TONE VALUES Ith | THRESHOLD TONE VALUE Vth |
|---|---|
| 1 | 12 |
| 2 | 31 |
| 3 | 35 |
| 4 | 56 |
| 5 | 59 |
| 6 | 82 |
| 7 | 88 |
| ⋮ | ⋮ |
| 11 | 179 |
| 12 | 190 |
| 13 | 198 |
| 14 | 203 |
| 15 | 208 |
| 16 | 225 |
| 17 | 237 |
PIXEL GROUP B
| NUMBER OF THRESHOLD TONE VALUES Ith | THRESHOLD TONE VALUE Vth |
|---|---|
| 1 | 5 |
| 2 | 20 |
| 3 | 23 |
| 4 | 47 |
| 5 | 61 |
| 6 | 74 |
| 7 | 83 |
| ⋮ | ⋮ |
| 11 | 148 |
| 12 | 165 |
| 13 | 171 |
| 14 | 202 |
| 15 | 225 |
| 16 | 239 |
| 17 | 246 |
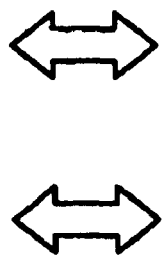

Fig.41

| CODE DATA | INTERMEDIATE DATA | CORRESPONDING NUMBERS OF RESPECTIVE SIZE DOTS | | |
|---|---|---|---|---|
| | | LARGE | MEDIUM | SMALL |
| 0 | 0000000000000000 | 0 | 0 | 0 |
| 1 | 0000000000000001 | 0 | 0 | 1 |
| 2 | 0000000000000101 | 0 | 0 | 2 |
| 3 | 0000000000010101 | 0 | 0 | 3 |
| 160 | 1010111111111111 | 6 | 2 | 0 |
| 161 | 0011111111111111 | 7 | 0 | 0 |
| 162 | 0111111111111111 | 7 | 0 | 1 |
| 163 | 1011111111111111 | 7 | 1 | 0 |
| 164 | 1111111111111111 | 8 | 0 | 0 |

Fig.43

| | | MULTIVALUE CODE | | | | | |
|---|---|---|---|---|---|---|---|
| | | 0 | 1 | 2 | 3 | 4 | 5 |
| CLASSIFICATION NUMBER | 1 | DD(1,0) | DD(1,1) | DD(1,2) | DD(1,3) | DD(1,4) | DD(1,5 |
| | 2 | DD(2,0) | DD(2,1) | DD(2,2) | DD(2,3) | DD(2,4) | D |
| | 3 | DD(3,0) | DD(3,1) | DD(3,2) | DD(3,3) | DD(3,4) | |
| | 4 | DD(4,0) | DD(4,1) | DD(4,2) | DD(4,3) | DD(4,4) | |
| | 5 | DD(5,0) | DD(5,1) | DD(5,2) | DD(5,3) | | |
| | 6 | DD(6,0) | DD(6,1) | DD(6,2) | | | |
| | 7 | DD | | | | | |

$DD(i, j) =$ | (1) | (2) | (3) | (4) | (5) | (6) | (7) | (8) |
| 1 1 | 0 0 | 1 0 | 0 0 | 0 0 | 0 0 | 1 0 | 1 0 |

IMAGE PROCESSING DEVICE, IMAGE PROCESSING METHOD, AND PROGRAM PRODUCT FOR THE SAME

CLAIM OF PRIORITY

The present application claims the priority from Japanese applications P2004-288712A filed on Sep. 30, 2004 and P2004-320146A filed on Nov. 4, 2004, the contents of which are hereby incorporated by reference into this application.

BACKGROUND OF THE INVENTION

1. Field of the Invention

The present invention relates to a technique of outputting images based on image data. More specifically the invention pertains to a technique of processing image data by a preset series of image processing to create dots at adequate densities and accordingly output a processed image.

2. Description of the Related Art

Image output devices that create dots on various output media, such as printing media and liquid crystal screens, to output images have been used widely as output devices of diverse imaging devices. The image output device processes each image as a collection of very small areas called pixels and creates dots in these pixels. Each pixel individually takes only one of two dot states, that is, dot-on state and dot-off state. The density of dot creation may be varied in a relatively wide image area. The varying dot creation density enables output of a multi-tone image. For example, in the case of creation of black ink dots on printing paper, areas of dense dot creation are darker and areas of sparse dot creation are brighter. In the case of creation of dots as bright points on a liquid crystal screen, areas of dense dot creation are brighter and areas of sparse dot creation are darker. The adequate regulation of the dot creation density enables output of a multi-tone image. An object image to be output goes through a preset series of image processing to give control data for creation of dots at adequate densities.

The latest requirements for these image output devices are size enlargement and enhanced picture quality of output images. Division of an image into smaller pixels is an effective measure for the enhanced picture quality requirement. The smaller pixels make the respective dots created in the pixels inconspicuous and thereby improve the picture quality. Increasing the number of pixels is an effective measure for the size enlargement requirement. The increased dimensions of the respective pixels naturally enlarge an output image but undesirably lower the picture quality of the output image. The increased number of pixels is thus effective for the size enlargement of the output image.

The increased number of pixels constituting an image, however, undesirably extends the time of image processing and interferes with high-speed image output. Various techniques have accordingly been proposed to attain high-speed image process (for example, JP-A-2002-185789).

The high-speed image processing alone is, however, not sufficient to attain the high-speed image output. Another requirement is thus high-speed transfer of original image data and processed image data.

With the wide spread of digital cameras, there is a requirement of direct supply of image data taken with a digital camera to a printing device or another image output device for immediate image output. In such cases, a personal computer or another image processing device of high throughput is not usable for the required image processing. The image processing should thus be simplified to be executable by one or both of an imaging device, such as a digital camera, and an image output device, which are generally of relatively low throughput.

SUMMARY OF THE INVENTION

The object of the present invention is thus to eliminate the drawbacks of the prior art and to provide a simple image processing technique that attains high-speed image processing and data transfer without requiring a personal computer or any other device of high throughput.

In order to attain at least part of the above and the other related objects, the present invention is directed to an image processing device that processes image data representing a multi-tone image by multivalue coding and outputs results of the multivalue coding.

The image processing device includes: a pixel group tone value specification module that collects every preset number of multiple pixels to one pixel group to divide a large number of pixels constituting the image to plural pixel groups, and specifies a pixel group tone value as a representative tone value of each pixel group; a correlation map storage module that stores in advance plural correlation maps, each correlation map setting a restricted number of multivalue codes obtained as results of the multivalue coding in correlation to pixel group tone values, where the restricted number of multivalue codes is less than a total number of possible states, one of which is selectively specified for each pixel group based on a preset number of threshold values provided corresponding to the preset number of multiple pixels included in the pixel group; a multivalue coding module that selects one correlation map for each pixel group among the stored plural correlation maps and refers to the selected correlation map to convert the specified pixel group tone value of the pixel group to a multivalue code; and an output module that outputs multivalue codes of all the plural pixel groups.

There is an image processing method corresponding to this image processing device. The invention is thus directed to an image processing method that processes image data representing a multi-tone image by multivalue coding and outputs results of the multivalue coding.

The image processing method includes the steps of collecting every preset number of multiple pixels to one pixel group to divide a large number of pixels constituting the image to plural pixel groups, and specifying a pixel group tone value as a representative tone value of each pixel group; storing in advance plural correlation maps, each correlation map setting a restricted number of multivalue codes obtained as results of the multivalue coding in correlation to pixel group tone values, where the restricted number of multivalue codes is less than a total number of possible states, one of which is selectively specified for each pixel group based on a preset number of threshold values provided corresponding to the preset number of multiple pixels included in the pixel group; selecting one correlation map for each pixel group among the stored plural correlation maps; and referring to the selected correlation map to convert the specified pixel group tone value of the pixel group to a multivalue code and outputting multivalue codes of all the plural pixel groups.

The image processing device or the corresponding image processing method of the invention specifies the pixel group tone value as the representative tone value of each pixel group consisting of the preset number of multiple pixels, and refers to one correlation map selected for the pixel group among the plural stored correlation maps to convert the specified pixel group tone value to a multivalue code. The pixel group tone value of a pixel group is specified, for example, according to image data of respective pixels included in the pixel group. The multivalue codes of all the plural pixel groups may be output as control data to an image generation device that generates an image based on the received multivalue codes. The multivalue codes of an image occupy an extremely small data volume and accordingly enable high-speed output, compared with conventional dot state data representing the dot on-off state in individual pixels included in the image. This characteristic of the invention will be described in detail later.

The image generation device receives the output multivalue codes, determines the dot on-off state in respective pixels of each pixel group according to the received multivalue code of the pixel group by a procedure described later, and generates an output image based on results of the determination. Namely high-speed output of the control data to the image generation device enables high-speed image output.

The specified pixel group tone value of each pixel group is converted to a multivalue code by referring to the selected correlation map that sets the multivalue codes in correlation to the pixel group tone values. This arrangement ensures high-speed generation of the multivalue code of each pixel group.

In each of the correlation maps referred to for the multivalue coding, the number of multivalue codes set for each pixel group is less than the total number of possible states taken in the pixel group. The possible states taken in each pixel group may be expressed by information on the dot on-off state in the respective pixels the pixel group determined on the assumption that all the pixels in the pixel group have tone values equal to the specified pixel group tone value. For example, when each correlation map is designed to include a set of threshold values extracted from a global dither matrix, the possible states taken in each pixel group may be defined by the dot on-off state determined by application of this correlation map. The total number of possible states taken in each pixel group may be the number of different dot creation states when the pixel group tone value varies from a minimum tone value to a maximum tone value in determination of the dot on-off state of the pixel group. The use of the correlation map setting the restricted number of multivalue codes for each pixel group desirably reduces the variety of multivalue codes converted from the pixel group tone values. The less variety of multivalue codes accelerates the multivalue coding of the pixel group tone values and enables high-speed generation of the multivalue codes. The less variety of multivalue codes generally reduces the data volume required for expression of the multivalue codes. This enables the higher-speed output of the multivalue codes.

In the image processing device of the invention, each of the plural correlation maps referred to for the multivalue coding may be designed to have the following characteristic, in addition to the restricted number of multivalue codes. In one preferable example, each of the plural correlation maps sets plural changeover tone values defined as pixel group tone values having stepwise changes in multivalue code when the multivalue codes are arranged in a magnitude order of the pixel group tone values. At least half of the plural changeover tone values are identical with plural threshold tone values defined as pixel group tone values having changes in state specified for each pixel group based on the threshold values provided corresponding to the multiple pixels included in the pixel group. The changeover tone values are defined as pixel group tone values having stepwise changes in multivalue code when the multivalue codes set in each correlation map are arranged in a magnitude order of the correlated pixel group tone values. The threshold tone values are defined, for example, as pixel group tone values having changes in dot creation state when the pixel group tone value varies from a minimum tone value to a maximum tone value in determination of the dot on-off state based on a dither matrix applied to each pixel group.

As described later in detail, the use of the dither matrix for specification of the multivalue code correlated to the pixel group tone value gives a result of dot creation having the characteristic of the dither matrix, which is equivalent to a result of dot creation by determination of the dot on-off state based on the dither matrix. The use of a highly dispersive dither matrix gives a high-quality image with favorable dot dispersion. Perfect match of the changeover tone values set in each correlation map with the threshold tone values causes the correlation map to be practically equal to a correlation map set according to the dither matrix. The multivalue coding of the pixel group tone values with reference to this correlation map with settings of the changeover tone values perfectly equal to the threshold tone values gives an output image having the characteristic of the dither matrix. The multivalue coding of the pixel group tone values with reference to the correlation map with settings of at least half of the changeover tone values equal to the threshold tone values accordingly gives an output image with part of the characteristic of the dither matrix. The use of a highly dispersive dither matrix reduces the variety of multivalue codes with minimized deterioration of the resulting picture quality, thus attaining high-speed output of a high-quality image.

In the image processing device of the invention, each of the plural correlation maps referred to for the multivalue coding may be designed to have the following characteristic. In another preferable example, a matching rate of the plural changeover tone values set in each correlation map with the plural threshold tone values is higher in a lower tone value area of the image data below a medium tone value than in a higher tone value area of the image data above the medium tone value.

In general, a lower tone area (having a lower dot creation density) has the greater effects on the picture quality than a higher tone area (having a higher dot creation density). Setting the higher matching rate of the plural changeover tone values with the plural threshold tone values in the lower tone area than the matching rate in the higher tone area enables a result of dot creation to have a greater influence of the characteristic of the dither matrix in the lower tone area having the greater effects on the picture quality. This arrangement effectively reduces the potential effects on the picture quality due to the less variety of multivalue codes converted from the pixel group tone values, thus ensuring high-speed output of a high-quality image.

As mentioned above, in one preferable example, each of the plural correlation maps referred to for the multivalue coding sets plural changeover tone values defined as pixel group tone values having stepwise changes in multivalue code when the multivalue codes are arranged in a magnitude order of the pixel group tone values. At least half of the plural changeover tone values are identical with plural threshold tone values defined as pixel group tone values having changes in state specified for each pixel group based on the threshold values provided corresponding to the multiple pixels included in the pixel group. In one preferable application of this embodiment, at least half of the changeover tone values set in each correlation map are identical with remaining threshold tone values after exclusion of a preset number of non-adjacent but discrete threshold tone values from the plural threshold tone values arranged in a magnitude order.

In this application, each correlation map is designed to have at least half of the changeover tone values identical with the remaining threshold tone values after exclusion of non-adjacent but discrete threshold tone values. This arrangement desirably prevents the potential influence on the picture quality due to exclusion of some threshold tone values from concentrically appearing in a specific tone value range. Over half of the changeover threshold values are equal to the remaining threshold tone values, so that a resulting output image has part of the characteristic of the dither matrix. The use of a highly dispersive dither matrix effectively reduces the potential effects on the picture quality due to the less variety of multivalue codes and attains high-speed output of a high-quality image.

In still another preferable example, at least half of the changeover tone values set in each correlation map referred to for the multivalue coding are identical with remaining threshold tone values after exclusion of one of adjacent threshold tone values having a tone difference of not greater than a preset value when the plural threshold tone values are arranged in a magnitude order.

Exclusion of the threshold tone values from a part having a smaller tone difference between adjacent threshold tone values desirably reduces the potential effects on the picture quality. This arrangement thus enables high-speed output of an image, while keeping the high picture quality of the image.

In another preferable example, each correlation map referred to for multivalue coding of each pixel group is specified by taking into account plural changeover tone values with stepwise changes in multivalue code set in another correlation map applied to another pixel group adjoining to the pixel group. In one preferable application of this example, at least half of the plural changeover tone values set in each correlation map are identical with remaining threshold tone values after exclusion of at least one threshold tone value from plural threshold tone values with changes in state specified for each pixel group based on the threshold values provided corresponding to the multiple pixels included in the pixel group. The at least one excluded threshold tone value is selected such that corresponding changeover tone values between correlation maps applied to adjacent pixel groups have at least a preset tone difference. The at least one excluded threshold tone value may otherwise be selected such that excluded threshold tone values from adjacent pixel groves have at least a predetermined tone difference.

The use of this correlation map for conversion of the pixel group tone value to the multivalue code prevents the potential effects on the picture quality due to the less variety of multivalue codes from concentrically appearing in similar tone value ranges between adjacent pixel groups. This arrangement thus minimizes the potential influence on the picture quality and enables high-speed output of a high-quality image.

In one preferable application of the image processing device of the invention, plural different combinations of multiple threshold values are stored as the plural correlation maps. The image processing device refers to a correlation map selected for each pixel group and compares the specified pixel group tone value of the pixel group with the multiple threshold values set in the selected correlation map to convert the pixel group tone value to a multivalue code.

In this application, only a set of multiple threshold values is stored as each correlation map of correlating the pixel group tone value to the multivalue code. This arrangement desirably saves the total storage capacity for storing the correlation maps.

In another preferable application of the image processing device of the invention, each pixel group is identified by a classification number, and each correlation map correlates the pixel group tone value to the multivalue code with regard to each classification number. The pixel group tone value of each pixel group is converted to the multivalue code by referring to a correlation map corresponding to the classification number allocated to the pixel group.

Allocation of an adequate classification number to each pixel group ensures adequate conversion of the pixel group tone value of each pixel group to the multivalue code. Identification of each pixel group by the classification number desirably simplifies the multivalue coding of the pixel group tone value.

In one preferable example, plural pixel groups included in one image may be classified into multiple different classes according to the positions of the respective pixel groups on the image. An identical classification number is then allocated to each class of the pixel groups. This arrangement does not require previous allocation of classification numbers to the respective pixel groups but allocates the adequate classification numbers to the respective pixel groups according to the positions of the pixel groups on the image when required.

Each of the correlation maps referred to for the multivalue coding may correlate the pixel group tone value to the multivalue code with regard to each of at least 100 classification numbers.

Adjacent pixel groups generally do not have identical classification numbers. Even when adjacent pixel groups have an identical pixel group tone value, setting the correlation of the pixel group tone value to the multivalue code with regard to each classification number does not give identical multivalue codes to the adjacent pixel groups. Output of such multivalue codes as control data desirably prevents dot creation in a fixed pattern. The extremely small variety of classification numbers, however, does not ensure the sufficient effects but may cause the appearance of some regularity in a dot creation pattern according to the multivalue codes obtained by reference to the correlation map set for each classification number. The greater variety of classification numbers is preferable to eliminate this potential. According to the empirical data, the use of 100 or more classification numbers effectively reduces the potential for the appearance of some regularity in a dot creation pattern to a practically insignificant level.

The variety of classification numbers and the number of pixels included in each pixel group may be set to have the product of not less than 1000.

As mentioned above, the extremely small variety of classification numbers may cause the appearance of some regularity in a dot creation pattern. The increased number of pixels included in each pixel group results in a greater variety of dot creation in each pixel group and thus prevents the appearance of some regularity in the dot creation pattern even with the less variety of classification numbers. Setting the variety of classification numbers and the number of pixels included in each pixel group to have the product of not less than 1000 reduces the potential for the appearance of some regularity in a dot creation pattern to a practically insignificant level.

In one preferable embodiment of the image processing device or the corresponding image processing method of the invention, each multivalue code is defined as a combination of three different dots having different tone values. The pixel group tone value specification module specifies the pixel group tone value as a representative tone value of each pixel group consisting of a preset number N of pixels, where N is an integer of not less than 2. Each correlation map stored in the correlation map storage module sets multivalue codes of not less than (N+2) and of not greater than 2N. In this embodiment, the specified pixel group tone value is readily and quickly converted to a multivalue code by simply referring to a selected correlation map. All the correlation maps selected for any pixel groups have settings of multivalue codes in the range of (N+2) to 2N. Here N represents the number of pixels included in each pixel group and is an integer of not less than 2. When three different dots having different tone values are available, the required variety of multivalue codes in each pixel group generally exceeds 2N for generation of a high-quality image with favorable dot dispersibility. Restriction of the variety of multivalue codes in each pixel group to be not greater than 2N desirably accelerates the multivalue coding. The less variety of multivalue codes generally decreases the data volume required for expression of these multivalue codes and accordingly enables high-speed output of the multivalue codes as control data. When each pixel group consists of N pixels and only one type of dot is available, the number of states possibly taken in each pixel group is (N+1), which corresponds to creation of 0 dot to creation of N dots. In this case, there are (N+1) different multivalue codes in each pixel group. Setting (N+2) or more multivalue codes in combination with the availability of three different dots takes advantage of the greater dot variety and ensures output of a high-quality image. Restriction of the variety of multivalue codes for each pixel group to the range of (N+2) to 2N thus enables high-speed output of a high-quality image.

The number of multivalue codes set in each correlation map for any pixel group may be fixed to 2N. For example, when each pixel group consists of 8 pixels, it is preferable to set '16' to the number of multivalue codes set in each correlation map for any pixel group. When each pixel group consists of 16 pixels, it is preferable to set '32' to the number of multivalue codes set in each correlation map for any pixel group. Setting a fixed number of multivalue codes in all the correlation maps for any pixel groups ensures the efficient expression of multivalue coding, compared with varying the number of multivalue codes set in the respective correlation maps. Setting a value expressible as a power of 2, for example, 16 or 32, to the number of multivalue codes desirably requires only the small data volume for efficient expression of a large variety of multivalue codes.

The number of multivalue code set in each correlation map for any pixel group may be set in a range of (2N−1) to (2N−3). For example, when each pixel group consists of 8 pixels, the number of multivalue codes may be set in a range of 13 to 15. When each pixel group consists of 16 pixels, the number of multivalue codes may be set in a range of 29 to 31. Expression of the multivalue codes by binary data gives 1 to 3 margins in each pixel group for expressing extra data different from the multivalue codes. Such margins are usable for optimization of the processing, for example, for switchover of the processing executed in an image output device.

In the image processing device of the invention, a set of multiple threshold values for each pixel group may be stored as a correlation map. The pixel group tone value is successively compared with the multiple threshold values set in the correlation map to be converted to a multivalue code.

This arrangement requires storage of only the multiple threshold values for each pixel group as the correlation map of correlating the pixel group tone values to the multivalue codes, thus desirably saving the memory capacity for storing the correlation maps.

In another preferable embodiment of the image processing device or the corresponding image processing method of the invention, each multivalue code is defined as a combination of two different dots having different tone values. The pixel group tone value specification module specifies the pixel group tone value as a representative tone value of each pixel group consisting of a preset number N of pixels, where N is an integer of not less than 2. Each correlation map stored in the correlation map storage module sets (N+1) multivalue codes. When each pixel group consists of N pixels and only one type of dot is available, there are (N+1) multivalue codes in each pixel group. When two different dots are available, it is preferable to restrict the variety of multivalue codes to or below (N+1). This ensures high-speed output of the multivalue codes as control data regardless of the increased dot variety and accordingly enables high-speed image output. The increased dot variety to 2 different dots naturally increases the number of expressible tone values in each pixel group. The variety of multivalue codes for each pixel group in the availability of two different types of dots is, however, identical with the variety of multivalue codes in the availability of only one type of dot. The use of two different types of dots ensures the higher picture quality of a resulting image, compared with the use of only one type of dot, because of the reason given below.

With a view to attaining the higher picture quality, setting a higher resolution of tone expression in a lower tone area (with sparsely created dots) is preferable over setting a fixed resolution of tone expression over a higher tone area (with densely created dots) to the lower tone area. A variation in tone value in the lower tone area is more conspicuous than the same variation in tone value in the higher tone area, since the rate of the variation is greater in the lower tone area. Creation of two different types of dots naturally increases the number of expressible tone values. The resolution of tone expression is raised in the lower tone area and is reduced in the higher tone area to have an appropriate distribution. The appropriate distribution of the resolution with creation of the two different types of dots desirably improves the picture quality without increasing the variety of multivalue codes.

When each pixel group consists of a preset number M of pixels, where M is an integer expressible as a power of 2, each of the correlation maps selected for each pixel group may set M multivalue codes at the maximum. This arrangement enables efficient expression of the multivalue codes by a less number of bits and thereby ensures high-speed output of the multivalue codes as control data. Setting M multivalue codes in each correlation map is especially preferable for the most efficient expression of the multivalue codes.

Another application of the invention is a computer program that is read and executed by a computer to attain the image processing method described above. This computer program may be recorded in a recording medium. The computer reads and executes the program and performs the various functions described above to enable high-speed image processing and data transfer and thereby attain high-speed output of a high-quality image.

BRIEF DESCRIPTION OF THE DRAWINGS

FIG. 13 shows a correlation map that allocates encoded dot number data to each combination of the numbers of large-size dots, medium-size dots, and small-size dots to be created in each pixel group;

FIG. 14 shows one example of priority order matrixes;

FIG. 16 conceptually shows part of a dither matrix as an example;

FIGS. 19A through 19D show a method of computing the classification number of an object pixel group;

FIG. 20 shows a concrete procedure of specifying the classification number according to binary data of coordinates representing the object pixel group;

FIG. 25 shows an example of skipping out some of detected threshold tone values for reduction of the total number of threshold tone values to a required number;

FIG. 26 shows adjustment of remaining threshold tone values after the skip-out;

FIGS. 32A through 32C show a method of specifying the classification number of a pixel group according to the position of the pixel group on an image;

FIG. 33 shows a concrete procedure of determining the position of an object pixel group in a dither matrix according to coordinate values 'i' and 'j' of the object pixel group to specify a classification number;

FIG. 38 shows adjustment of remaining threshold tone values after the skip-out to have a better distribution of tone differences;

FIG. 39 conceptually shows skip-out of threshold values with consideration to prevent skip-out of close threshold tone values between adjacent pixel groups in a third modified example;

FIG. 41 shows a correlation map of correlating intermediate data to code data representing the numbers of respective size dots;

FIG. 43 conceptually shows a conversion table referred to in a modified dot on-off state determination process of a fifth modified example;

DESCRIPTION OF THE PREFERRED EMBODIMENTS

In order to clarify the functions and the effects of the invention, some modes of carrying out the invention are described below as a preferred embodiment and its modified examples in the following sequence with reference to the accompanied drawings:

- A. Outline of the System
- B. System Configuration
- C. General Outline of Image Printing Process
- C-1. Outline of Multivalue Code Generation Process
- C-2. Outline of Dot On-Off State Determination Process
- C-3. Outline of Dither Technique
- C-4. Principle of Specifying Classification Number
- C-5. Method of Setting Multivalue Code Table
- C-6. Method of Setting Conversion Table
- C-7. Method of Setting Priority Order Matrix
- C-8. Principle of Adequately Determining Dot On-Off State Based on Multivalue Code
- C-9. Method of Specifying Classification Number According to Position of Pixel Group
- D. Modifications
- D-1. First Modified Example
- D-2. Second Modified Example
- D-3. Third Modified Example
- D-4. Fourth Modified Example
- D-5. Fifth Modified Example

A. Outline of the System

Figure 1:
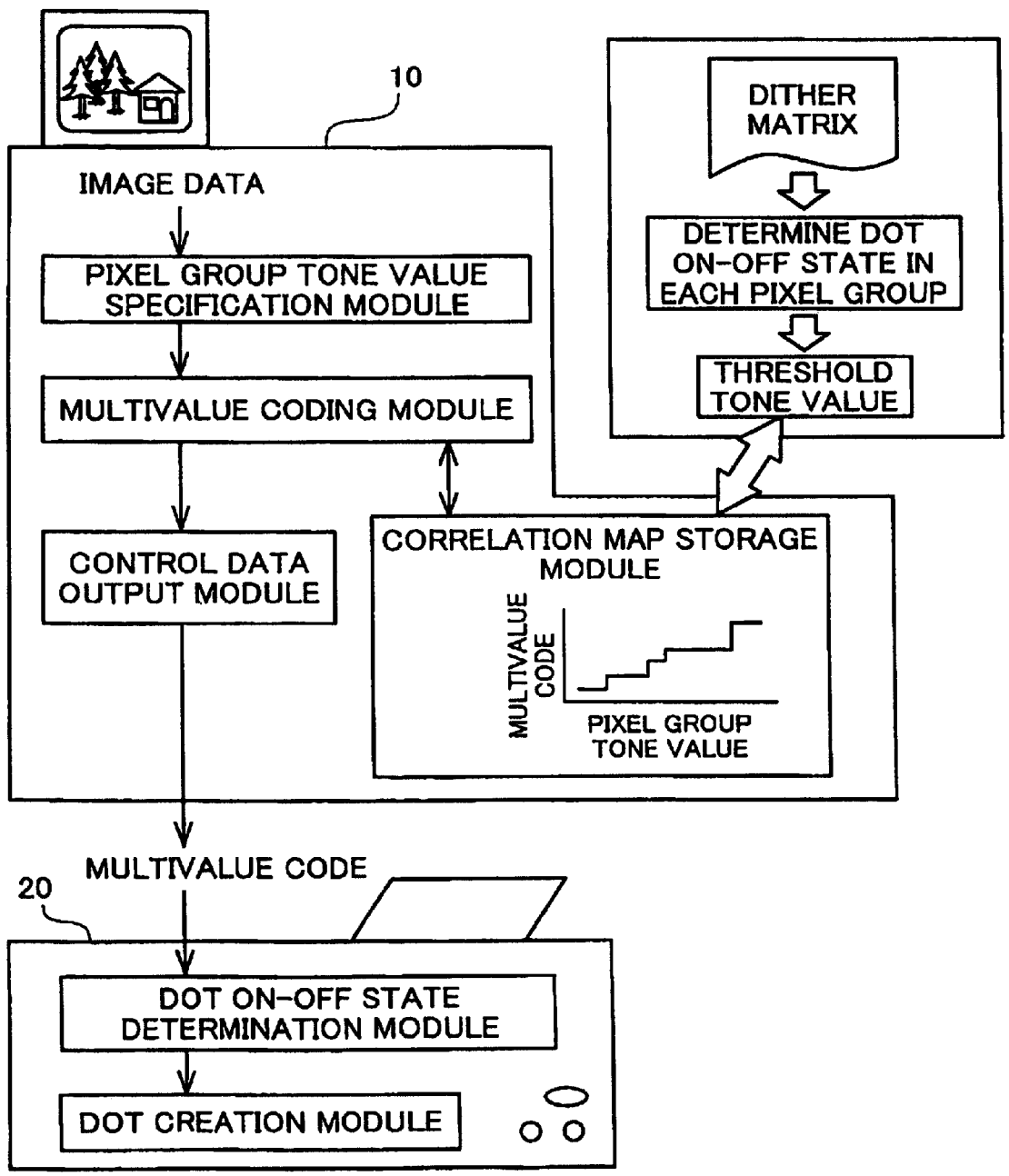
FIG. 1 shows the configuration of a printing system to briefly explain the technique of the invention.

The general outline of the system is described with reference to FIG. 1, prior to detailed description of an embodiment. FIG. 1 shows the configuration of a printing system to briefly explain the technique of the embodiment. The printing system includes a computer 10 as an image processing device and a printer 20 as an image output device. The computer 10 loads and executes a preset program to function in connection with the printer 20 as an image output system. The printer 20 creates dots on a printing medium to complete a printed image. The computer 10 processes image data, which represents an object image to be printed, by a preset series of image processing to generate print control data and supplies the generated print control data to the printer 20 to control the dot on-off state in each pixel.

In a conventional printing system, a computer performs a preset series of image processing to convert image data into dot state data representing the dot on-off state of respective pixels and supplies the dot state data to a printer. The printer creates dots according to the received dot state data to complete a printed image. A significant increase in number of pixels included in an object image to be printed naturally extends the time required for image processing and accordingly interferes with high-speed image printing. The increased number of pixels also expands the volume of the dot state data representing the dot on-off state of the respective pixels. The expanded data volume undesirably extends the time required for data output from the computer to the printer and thus increases a total printing time.

In the printing system of FIG. 1, a pixel group tone value specification module provided in the computer 10 receives image data representing an object image to be printed and collects each preset number of multiple pixels included in the received image data to one pixel group. The pixel group tone value specification module then specifies a pixel group tone value as a representative tone value of each pixel group and supplies the specified pixel group tone value of each pixel group to a multivalue coding module. The multivalue coding module performs multivalue coding to convert the received pixel group tone value to a multivalue code. A correlation map storage module stores a correlation map that correlates a pixel group tone value to a multivalue code with regard to each pixel group. The multivalue coding module attains quick conversion of the pixel group tone value to the multivalue code by referring to this correlation map. The multivalue code obtained for each pixel group is supplied to a control data output module and is output as control data to the printer 20.

A dot on-off state determination module provided in the printer 20 receives the control data representing the multivalue code with regard to each pixel group and determines the dot on-off state in each of the pixels included in each pixel group. Any of diverse methods described later is applicable to determine the dot on-off state of each pixel based on the received multivalue code of each pixel group. One applicable method converts the received multivalue code of each pixel group into dot number data representing the number of dots to be created in the pixel group and determines dot-on pixel positions according to the dot number data. Another applicable method stores in advance a map correlating the multivalue code of each pixel group to dot-on pixel positions in the pixel group and reads the map to determine the dot-on pixel positions corresponding to the received multivalue code of each pixel group. Dot state data representing the dot on-off state in each of the pixels included in each pixel group is obtained and supplied to a dot creation module. The dot creation module creates dots according to the received dot state data to complete a printed image.

The printing system converts the pixel group tone value to the multivalue code by the extremely simple operation of referring to the correlation map. Even a device of a relatively low throughput thus attains quick multivalue coding. The multivalue code of each pixel group has an extremely small data volume, compared with the volume of the dot state data representing the dot on-off state of each pixel. The computer 10 of this printing system outputs the multivalue code of each pixel group as control data to the printer 20, instead of the dot state data of each pixel. This enables high-speed output of the control data.

The correlation map referred to for multivalue coding correlates the pixel group tone value to the multivalue code with regard to each pixel group. The number of multivalue codes available for each pixel group is set to be smaller than the number of possible dot creation states in the pixel group. The dot creation state in each pixel group is determined by application of a dither matrix to respective pixels in the pixel group, on the assumption that all pixels in the pixel group have an identical pixel group tone value. As is known in the art, the dither matrix has threshold values allocated to respective pixel positions. Comparison between the pixel group tone value of each pixel in one pixel group and the threshold value at the corresponding pixel position in the dither matrix determines the dot on-off state of the pixel in the pixel group. This accordingly specifies the dot creation state of the pixel group. The number of possible dot creation states in each pixel group is determined by varying the pixel group tone value to a minimum possible tone value to a maximum possible tone value in the process of specifying the dot creation state of the pixel group. Application of the correlation map with such a restricted number of available multivalue codes for each pixel group enables multivalue coding of the pixel group tone value to a less variety of multivalue codes. The less variety of multivalue codes desirably accelerates the multivalue coding of the pixel group tone value. The less variety of multivalue codes generally reduces data volume required for expression of the multivalue code and thus further accelerates output of control data from the computer 10 to the printer 20.

When the printer 20 is capable of creating three different dots having different tone values, the number of available multivalue codes for each pixel group is set to be in a range between (N+2) to 2N, where N represents the number of pixels included in the pixel group. When the printer 20 is capable of creating two different dots having different tone values, the number of available multivalue codes for each pixel group is set to be not greater than (N+1). Application of this correlation map for conversion of the pixel group tone value to the multivalue code enables high-speed output of control data from the computer 10 to the printer 20, while keeping the high picture quality. One embodiment of the invention is described below in detail.

B. System Configuration

Figure 2:
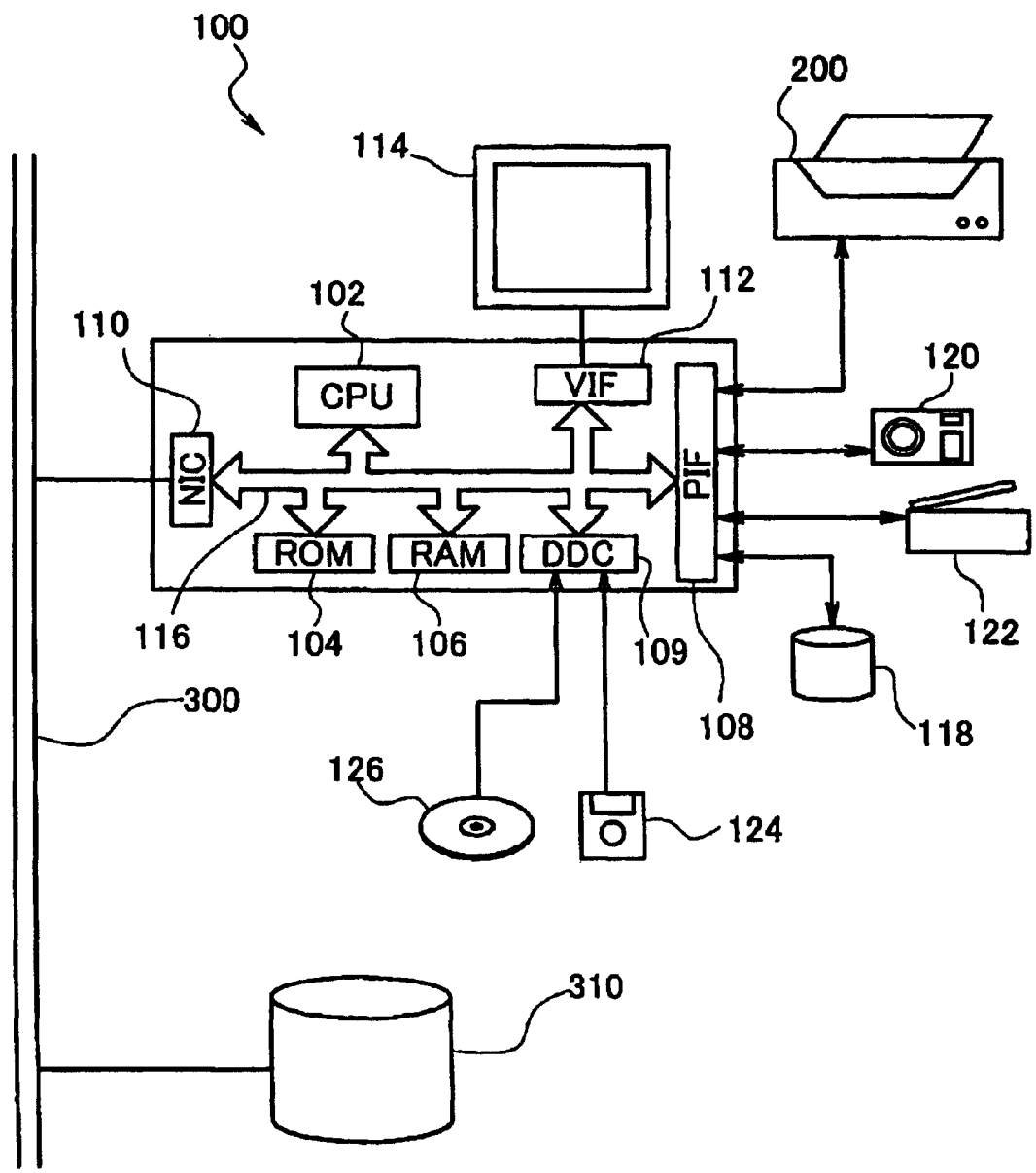
FIG. 2 schematically shows the structure of a computer as an image processing device in one embodiment of the invention.

FIG. 2 schematically shows the structure of a computer 100 as an image processing device in one embodiment of the invention. The computer 100 has a known structure including a CPU 102, a ROM 104, and a RAM 106 that are interconnected via a bus 116.

The computer 100 has a disk controller DDC 109 to read data from, for example, a flexible disk 124 or a compact disc 126, a peripheral equipment interface PIF 108 to receive and send data from and to peripheral equipment, and a video interface VIF 112 to drive and actuate a CRT 114. The PIF 108 is connected with a color printer 200 (described later) and a hard disk unit 118. Connection of a digital camera 120 or a color scanner 122 with the PIF 108 enables printing of images taken by the digital camera 120 or the color scanner 122.

Insertion of a network interface card NIC 110 into the computer 100 connects the computer 100 to a communication line 300 to obtain data stored in a storage device 310 on the communication line 300.

Figure 3:
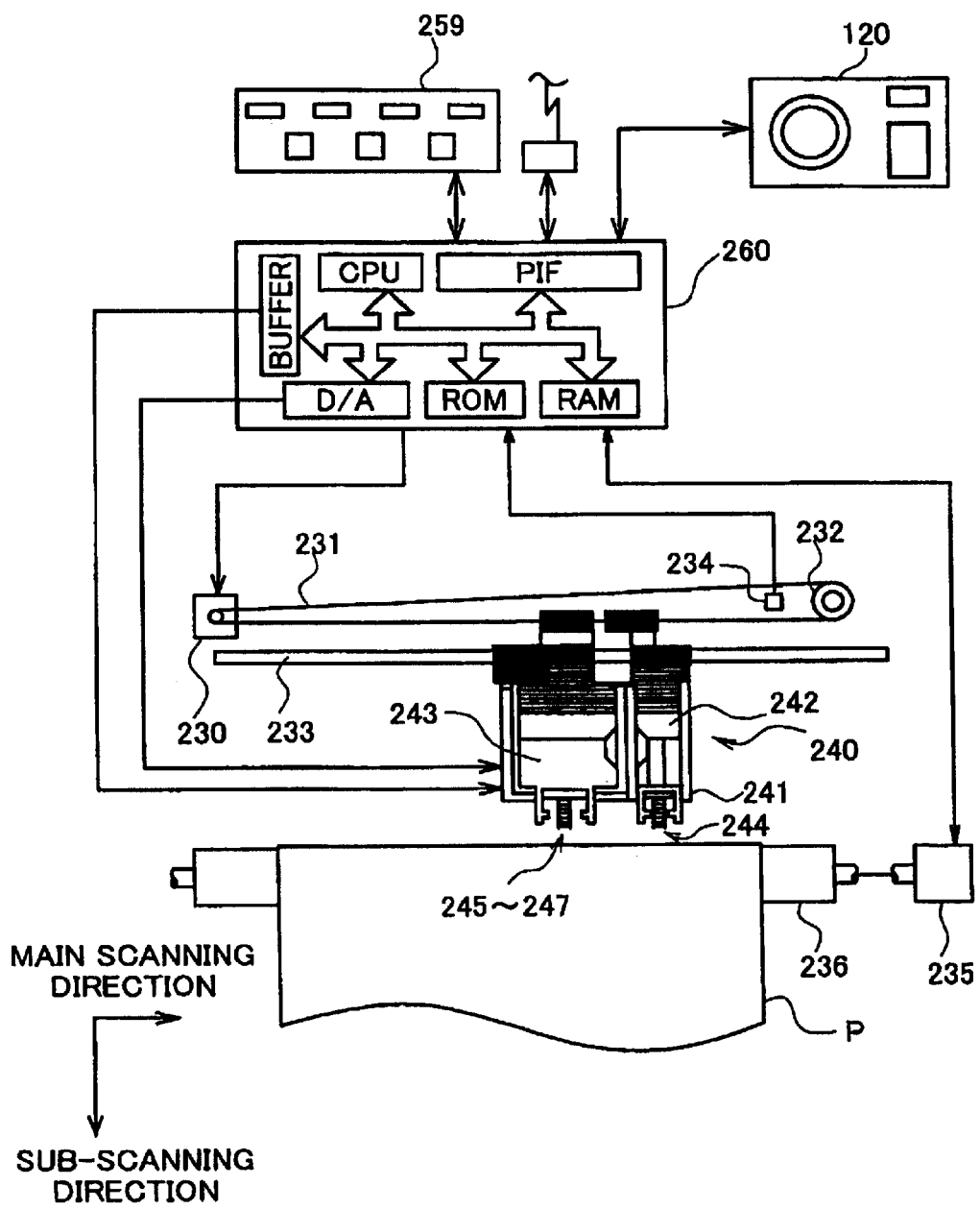
FIG. 3 schematically shows the structure of a color printer in the embodiment.

FIG. 3 schematically shows the structure of the color printer 200 in the embodiment. The color printer 200 is an inkjet printer that is capable of creating dots of four different color inks, cyan, magenta, yellow, and black. The color printer 200 may otherwise be an inkjet printer that is capable of creating dots of six different color inks, light cyan ink having a lower dye or pigment density and a light magenta ink having a lower dye or pigment density, in addition to the above four color inks. In the description below, cyan ink, magenta ink, yellow ink, black ink, light cyan ink, and light magenta ink may respectively be referred to as C ink, M ink, Y ink, K ink, LC ink, and LM ink.

As illustrated, the color printer 200 has a mechanism of actuating a print head 241 mounted on a carriage 240 to eject inks and create dots, a mechanism of activating a carriage motor 230 to move the carriage 240 back and forth along a shaft of a platen 236, a mechanism of activating a paper feed motor 235 to feed printing paper P, and a control circuit 260 that controls the creation of dots, the shift of the carriage 240, and the feed of the printing paper P.

An ink cartridge 242 for storing the K ink and an ink cartridge 243 for storing the C, M, and Y inks are attached to the carriage 240. The respective inks in the ink cartridges 242 and 243 attached to the carriage 240 are supplied through non-illustrated ink conduits to corresponding ink ejection heads 244 through 247 of the respective colors formed on the bottom face of the print head 241.

Figure 4:
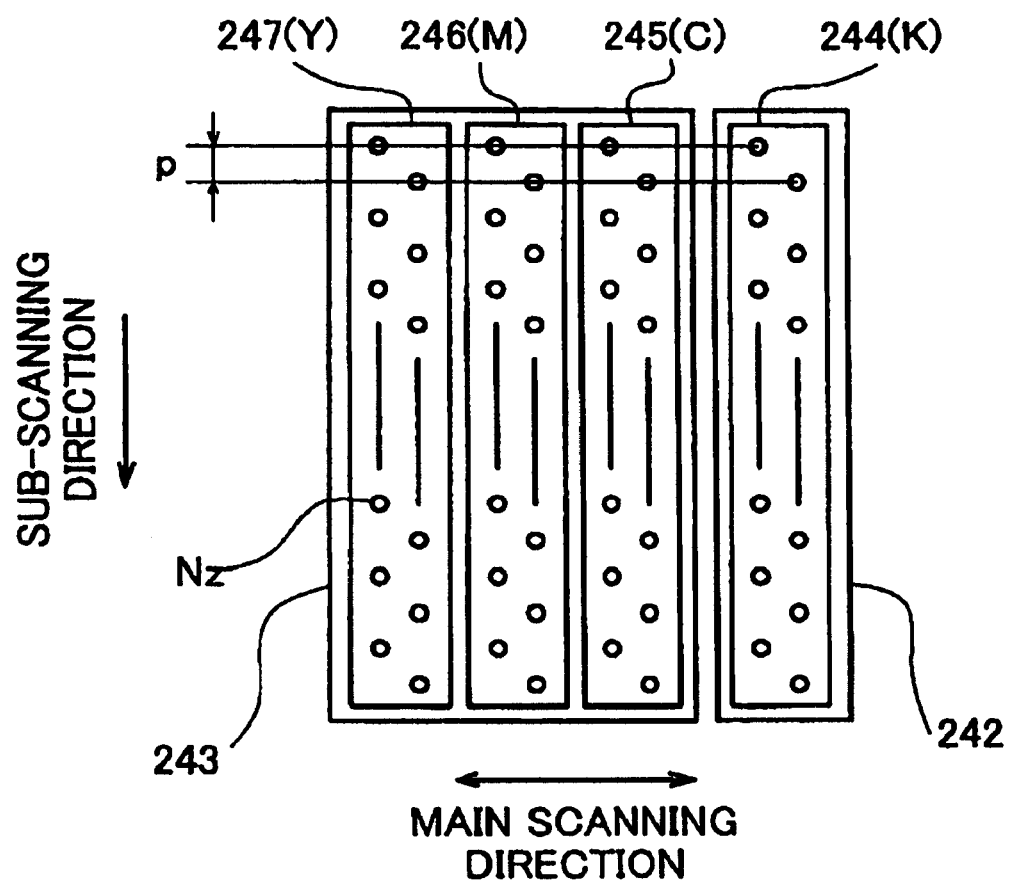
FIG. 4 shows an arrangement of inkjet nozzles on respective ink ejection heads of the color printer.

FIG. 4 shows an arrangement of inkjet nozzles Nz on the respective ink ejection heads 244 through 247. Four nozzle arrays for ejecting the C, M, Y, and K color inks are formed on the bottom face of the respective ink ejection heads 244 through 247. Each nozzle array includes 48 nozzles Nz arranged at a fixed nozzle pitch 'k'.

The control circuit 260 includes a CPU, a ROM, a RAM, and a PIF (peripheral equipment interface), which are interconnected via a bus. The control circuit 260 controls the operations of the carriage motor 230 and the paper feed motor 235 to regulate main scans and sub-scans of the carriage 240, while controlling ejection of ink droplets from the respective nozzles at adequate timings according to print data supplied from the computer 100. The color printer 200 creates ink dots of the respective colors at adequate positions on a printing medium under control of the control circuit 260 and thereby prints a color image.

The color printer 200 of the embodiment regulates the size of ejected ink droplets to control the size of ink dots. The color printer 200 adopts the following method to create variable-size ink dots. The description first regards the internal structure of each nozzle for ejecting color ink.

Figure 5A:
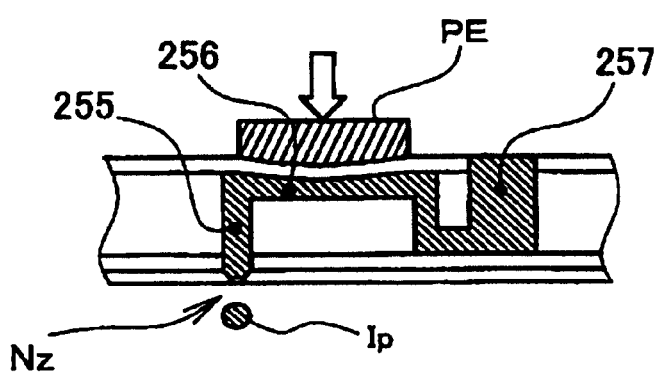
FIGS. 5A and 5B show the principle of creating variable-size dots by controlled ejection of ink droplets.

FIG. 5A shows the internal structure of a nozzle Nz for ink ejection. As mentioned above, each of the ink ejection heads 244 through 247 for each color has multiple nozzles Nz. As illustrated, the nozzle Nz has an ink conduit 255, an ink chamber 256, and a piezoelectric element PE placed on the ink chamber 256. Each of the inks kept in the ink cartridges 242 and 243 attached to the carriage 240 flows through an ink gallery 257 and is supplied to the ink chamber 256. As is known in the art, the piezoelectric element PE deforms its crystal structure by application of a voltage to attain extremely high-speed conversion of electrical energy to mechanical energy. In the structure of this embodiment, application of voltage having a specific waveform between electrodes on both ends of the piezoelectric element PE deforms the side wall of the ink chamber 256. The deformation reduces the volume of the ink chamber 256 and causes a certain amount of ink corresponding to the volume reduction to be ejected as an ink droplet Ip from the nozzle Nz. The ink droplet Ip is soaked into the printing paper P set on the platen 236 to create an ink dot on the printing paper P.

Figure 5B:
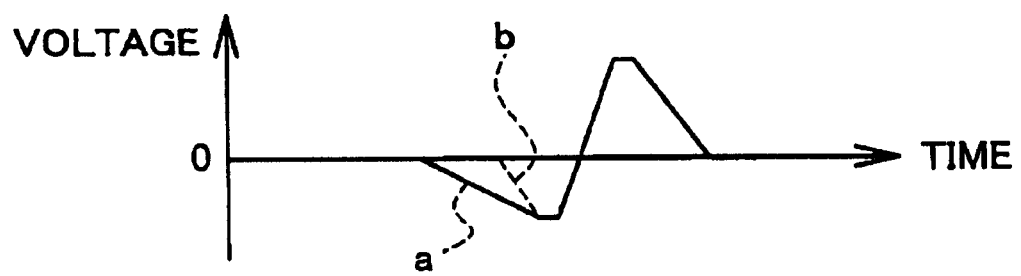

FIG. 5B shows the principle of varying the size of an ejected ink droplet by regulating the voltage waveform applied to the piezoelectric element PE. The procedure of ink ejection from the nozzle Nz first applies a negative voltage to the piezoelectric element PE to suck the ink from the ink gallery 257 into the ink chamber 256 and subsequently applies a positive voltage to the piezoelectric element PE to reduce the volume of the ink chamber 256 and eject the ink droplet Ip. An adequate sucking speed enables suction of a sufficient amount of ink corresponding to the volume reduction of the ink chamber 256. An excessively high sucking speed, however, causes an insufficient inflow of ink from the ink gallery 257, due to a passage resistance between the ink gallery 257 and the ink chamber 256. There is accordingly a back flow of ink from the ink conduit 255 into the ink chamber 256. The ink interface at a nozzle opening is thus significantly concaved. A voltage waveform 'a' shown by the solid line in FIG. 5B gives the adequate sucking speed of ink, whereas a voltage waveform 'b' shown by the broken line gives the excessively high sucking speed.

Under condition of a sufficient ink supply to the ink chamber 256, application of a positive voltage to the piezoelectric element PE causes an ink droplet Ip having a volume corresponding to the volume reduction of the ink chamber 256 to be ejected from the nozzle Nz. Under condition of an insufficient ink supply to the ink chamber 256 to give a significantly concaved ink interface, on the other hand, application of a positive voltage to the piezoelectric element PE causes a smaller ink droplet Ip to be ejected from the nozzle Nz. The printer 200 of this embodiment adjusts the waveform of the applied negative pressure to vary the sucking speed of ink and accordingly control the size of the ejected ink droplet. The printer 200 is capable of creating three different-size ink dots, that is, large-size dot, medium-size dot, and small-size dot.

The variable-size dots created are not restricted to these three different-size dots but may have a greater variation. The size of an ink dot created on the printing paper P may be controlled by another technique that regulates the number of small ink droplets simultaneously ejected. Selective use of the variable-size ink dots according to the tone values of an object image gives a high-quality printed image.

Any of diverse methods may be applied to eject ink droplets from the ink ejection heads of the respective colors. Typical examples of the available techniques include a method that uses piezoelectric elements for ejection of ink droplets and a method that uses heaters located in respective ink conduits to generate bubbles in the ink conduits for ejection of ink droplets. The technique of the invention is not restricted to such inkjet printers or bubble jet printers but is also applicable to printers that take advantage of thermal transfer to create ink dots on a printing medium and printers that take advantage of static electricity to make toners of respective colors adhere to a printing medium.

In the color printer 200 having the hardware configuration discussed above, the carriage motor 230 is driven to move the ink ejection heads 244 through 247 of the respective colors in a main scanning direction relative to the printing paper P, while the paper feed motor 235 is actuated to feed the printing paper P in a sub-scanning direction. The control circuit 260 drives the nozzles Nz at adequate timings to eject ink droplets synchronously with the main scans and the sub-scans of the carriage 240. The color printer 200 thus prints a resulting color image on the printing paper P.

C. General Outline of Image Printing Process

The computer 100 and the color printer 200 constructed as discussed above execute series of image processing (image printing process) to process image data and print a processed image. For the better understanding, the description first regards the general flow of the image printing process and then the advantages of this image printing process to attain high-speed image printing without lowering the picture quality.

The following description is on the assumption that a first half of the image printing process is executed by the computer 100 and a latter half of the image printing process is executed by the printer 200. The first half of the image printing process may alternatively be performed in the color printer 200 or in an imaging device that generates image data, for example, the digital camera 120, instead of the computer 100. The first half of the image printing process of this embodiment is significantly simplified as discussed later and is thus executable at a sufficiently high speed even by a CPU of a relatively low throughput. Incorporation of the first half of the image printing process in the color printer 200 or the digital camera 120 still constructs a sufficiently practical printing system.

Figure 6:
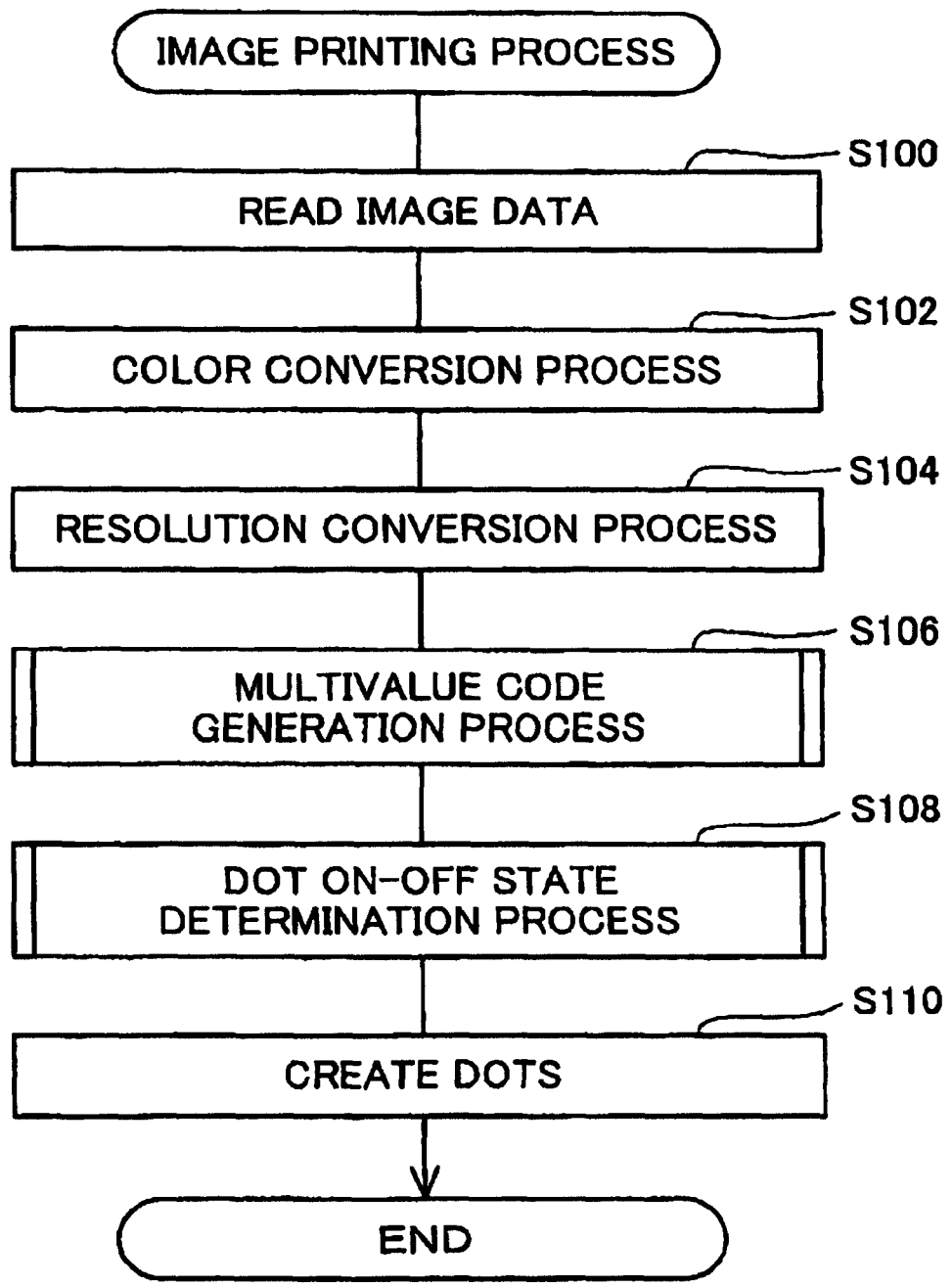
FIG. 6 is a flowchart showing a general flow of image printing process executed in the embodiment.

FIG. 6 is a flowchart showing a general flow of image printing process executed in the embodiment. In the image printing process of the embodiment, the computer 100 first reads object image data to be processed (step S100). The object image data input here is RGB color image data. The technique of this embodiment is, however, not restricted to color image data and a color printer, but is also applicable to monochromatic image data and a monochromatic printer.

The input color image data goes through a color conversion process (step S102). The color conversion process converts the RGB color image data expressed by combinations of tone values of the colors R, G, and B into image data expressed by combinations of tone values of respective color inks used for printing. As mentioned above, the printer 200 prints each image with the four color inks C, M, Y, and K. The color conversion process of the embodiment accordingly converts the image data expressed by the tone values of the colors R, G, and B into image data expressed by the tone values of the four color inks C, M, Y, and K. A concrete procedure of color conversion refers to a three-dimensional numerical table called a color conversion table (LUT). The LUT stores in advance the tone values of the respective colors C, M, Y, and K in relation to the RGB color image data. The processing of step S102 refers to the LUT to attain high-speed color conversion of the input RGB color image data into image data of the respective colors C, M, Y, and K.

On completion of the color conversion process, the color-converted image data goes through a resolution conversion process (step S104). The resolution conversion process converts the resolution of the image data into a resolution for printing by the printer 200 (printing resolution). The resolution conversion process generates new image data between adjacent pixels by interpolation, when the resolution of the image data is lower than the printing resolution. The resolution conversion process skips out existing image data at a preset rate, on the other hand, when the resolution of the image data is higher than the printing resolution. In this manner, the resolution of the image data is made equal to the printing resolution.

After conversion of the resolution of the image data into the printing resolution, the computer 100 starts a multivalue code generation process (step S106). The multivalue code generation process will be described later in detail and is here mentioned only briefly. The multivalue code generation process collects a preset number of adjacent pixels into one pixel group and accordingly divides one object image into multiple pixel groups. The number of adjacent pixels collected to each pixel group may not be fixed to all pixel groups but may be varied. For example, the number of pixels collected to each pixel group may be changed according to a preset rule or may be changed according to the positions of the respective pixel groups consisting of an image. For the better understanding, the description regards the simplest case where all the pixel groups have an identical number of pixels. After collection of the preset number of adjoining pixels into each pixel group, the multivalue code generation process specifies a pixel group tone value as a representative pixel value of the pixel group and performs the multivalue coding to convert the specified pixel group tone value to a multivalue code of the pixel group.

The multivalue code obtained for each pixel group is output as control data to the color printer 200. The technique of converting the pixel group tone value of each pixel group to the multivalue code significantly reduces the volume of the output data to the color printer 200. Only a short time is required for such conversion of the pixel group tone value to the multivalue code with regard to each pixel group as described later. This technique thus enables extremely high-speed output of the multivalue code having the significantly reduced data volume to the color printer 200.

There is a known technique called the density pattern method that converts a tone value to a multivalue code with regard to each group of plural pixels. Unlike this known density pattern method, however, the multivalue code generation process of this embodiment independently sets a multivalue code for each pixel group. The multivalue code converted from the pixel group tone value is specified with regard to each pixel group. An identical pixel group tone value may thus be converted to different multivalue codes. This multivalue coding technique of the embodiment gives a high-quality printed image with favorable dot dispersibility, which is equivalent to the dot dispersibility attained by a large-scale dither matrix, for example, a blue noise mask or a green noise mask, as described later. The multivalue coding technique of the embodiment is also free from the disadvantage generally observed in the conventional density pattern method, that is, the lowered picture quality with an increase in number of pixels included in each pixel group.

The multivalue code generation process of this embodiment restricts the number of available multivalue codes for each pixel group. This further shortens the time required for generation of the multivalue code and reduces the data volume of the generated multivalue code. This technique accordingly enables extremely efficient output of the multivalue code as the control data to the color printer 200. The multivalue code generation process of this embodiment will be described in detail later.

The internal CPU of the control circuit 260 included in the color printer 200 receives the multivalue code of each pixel group supplied as the control data from the computer 100 and starts a dot on-off state determination process (step S108). As mentioned above, the multivalue code of each pixel group is converted from the pixel group tone value by the multivalue coding technique and does not specify the positions of dot-on pixels in the pixel group. The dot on-off state determination process of the embodiment adopts a technique described later to determine the positions of dot-on pixels in each pixel group according to the multivalue code of the pixel group.

The conventional density pattern method determines the positions of dot-on pixels in each pixel group according to the multivalue code of the pixel group. Unlike the conventional density pattern method, however, the multivalue code generation process of this embodiment sets the multivalue code for each pixel group as mentioned above. The conventional density pattern method is thus not applicable to the dot on-off state determination process of this embodiment. The dot on-off state determination process of this embodiment adopts a different technique to determine the positions of dot-on pixels in each pixel group according to the multivalue code of the pixel group. This technique gives a high-quality printed image with favorable dot dispersibility, which is equivalent to the dot dispersibility attained by a large-scale dither matrix, for example, a blue noise mask or a green noise mask. The details of the dot on-off state determination process and the resulting favorable dot dispersibility will be described later.

After determination of the positions of dot-on pixels, the printer 200 actually creates dots in the determined positions of dot-on pixels (step S110). The printer 200 repeats the main scans and the sub-scans of the carriage 240 and drives the ink ejection heads 244 to 247 to eject ink droplets and create ink dots on the printing paper, as described above with reference to FIG. 3. The creation of ink dots gives a resulting printed image according to the image data.

C-1. Outline of Multivalue Code Generation Process

Figure 7:
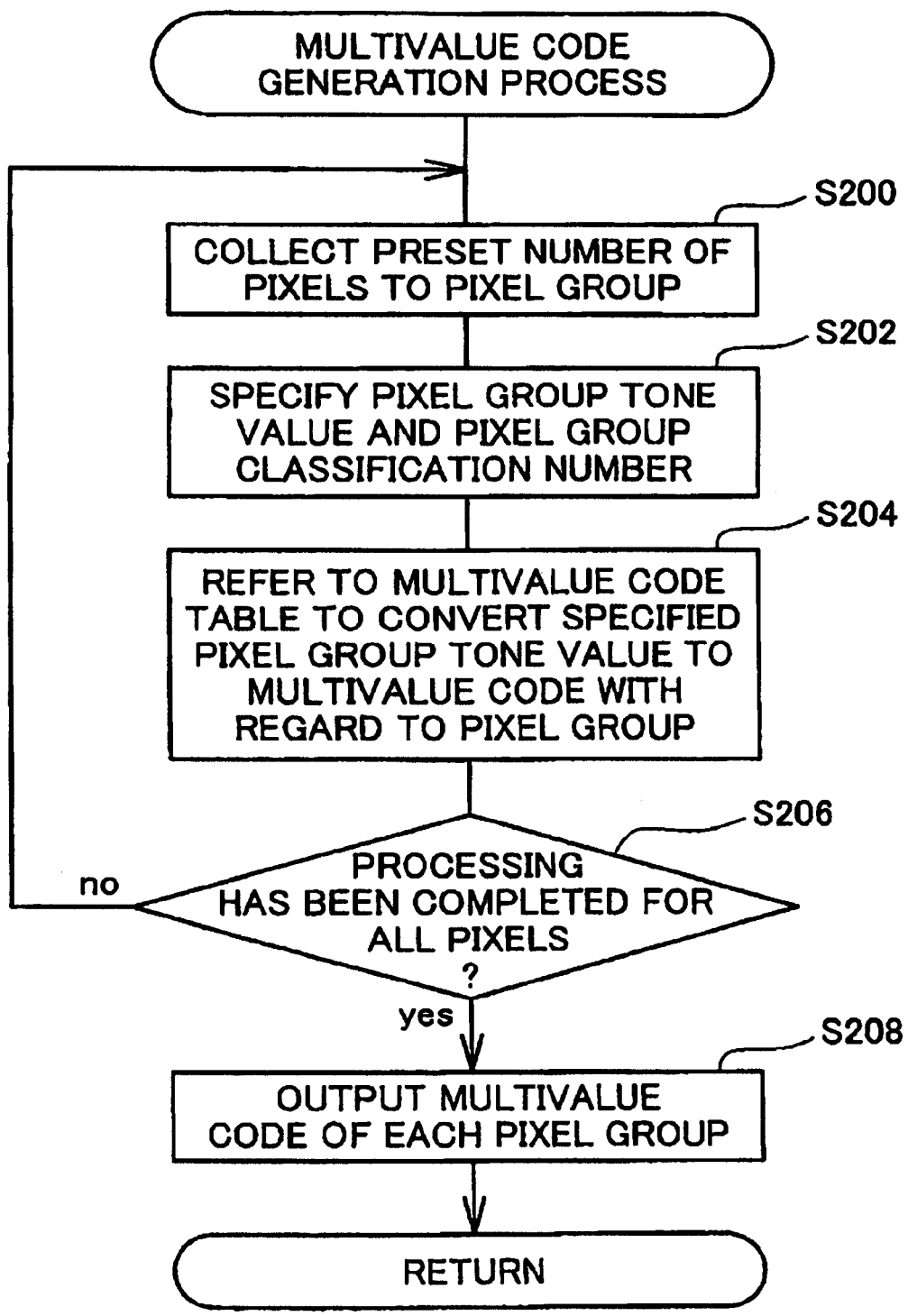
FIG. 7 is a flowchart showing the detailed flow of the multivalue code generation process executed at step S106 in the image printing process of FIG. 6.

FIG. 7 is a flowchart showing the detailed flow of the multivalue code generation process executed at step S106 in the image printing process of FIG. 6. The multivalue code generation process is performed by the computer 100 in this embodiment. The multivalue code generation process may be extremely simplified as described later to be executable in the color printer 200 or the digital camera 120 instead of the computer 100. The details of the multivalue code generation process are described below with reference to the flowchart of FIG. 7.

The multivalue code generation process of the embodiment first collects a preset number of adjacent pixels included in an object image to one pixel group (step S200). For example, the pixel group includes total of 8 pixels, that is, 4 pixels in the main scanning direction by 2 pixels in the sub-scanning direction. The pixels collected to one pixel group may not be included in a rectangular range defined by straight horizontal and vertical sides, but may be any adjacent pixels having a preset positional relation.

The multivalue code generation process subsequently specifies a pixel group tone value and a pixel group classification number of the pixel group (step S202). The pixel group tone value is a representative tone value of each pixel group and is easily specified, for example, as an average of tone values allocated to respective pixels in the pixel group, as a tone value most frequently allocated to pixels included in the pixel group, or as a tone value allocated to a pixel at a predetermined position in the pixel group.

Figure 8A:
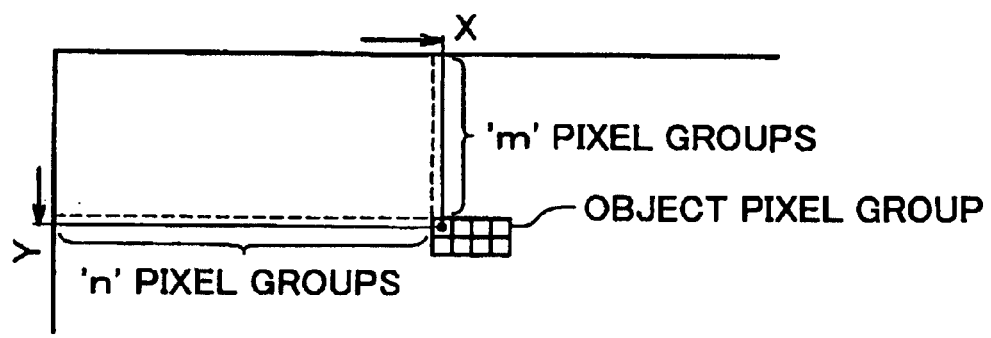
FIGS. 8A and 8B show a method of specifying a pixel group classification number of each pixel group.
Figure 8B:
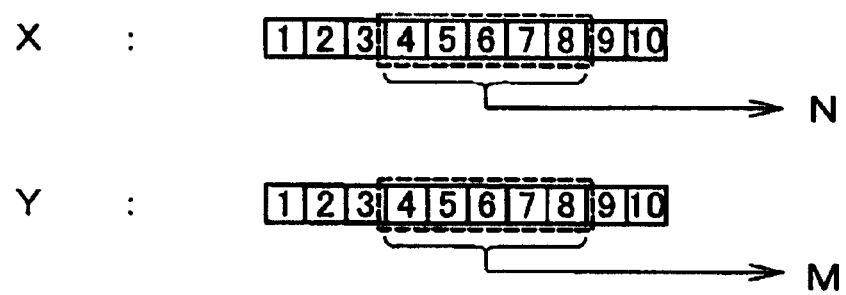

The pixel group classification number is also specified by an extremely simple method. FIG. 8 shows a method of specifying a pixel group classification number of each pixel group. In the illustrated example of FIG. 8A, 8 pixels in an image are collected to one pixel group. The terminology 'object pixel group' in the following description represents a pixel group currently being processed for specification of the pixel group classification number as shown in FIG. 8A.

An upper left corner of the image is set to the origin, and each pixel position is expressed by the numbers of pixels apart from the origin in both the main scanning direction and the sub-scanning direction. The position of each pixel group is represented by the position of a pixel at an upper left corner in the pixel group. The position of the upper left pixel representing the position of the object pixel group is shown by a closed circle in FIG. 8A. The position of this upper left pixel is defined as (X,Y). The pixel group classification number of the object pixel group is specified by an extremely simple procedure of expressing X and Y in binary notation and reading data stored at specified bits. In the illustrated example of FIG. 8B, X and Y defining the position of the object pixel group are respectively 10-bit data, and N and M respectively denote a value obtained by reading data from a $4^{th}$ bit to an $8^{th}$ bit of the binary digit X and a value obtained by reading data from a $4^{th}$ bit to an $8^{th}$ bit of the binary digit Y.

$$N+(M-1)\times 32 \tag{1}$$

Calculation of Equation (1) given above easily determines the pixel group classification number, because of the reason discussed later.

Figure 9:
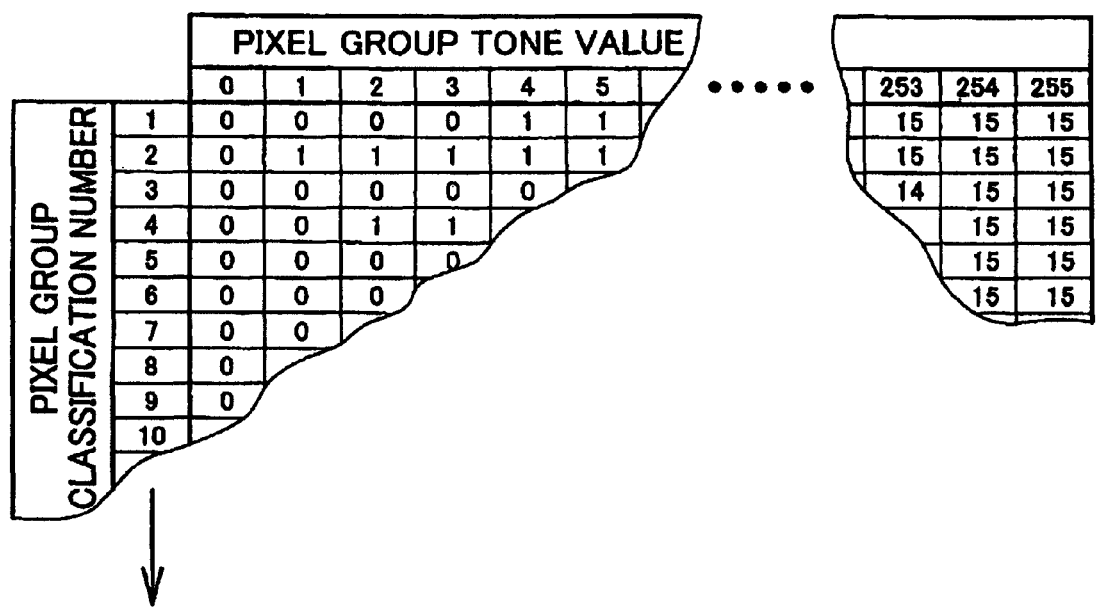
FIG. 9 conceptually shows a multivalue code table referred to for multivalue coding.

After specification of the pixel group tone value and the pixel group classification number, the multivalue code generation process refers to a multivalue code table to convert the specified pixel group tone value to a multivalue code (step S204). FIG. 9 conceptually shows a multivalue code table referred to for multivalue coding. As illustrated, the multivalue code table stores variations in multivalue code against the pixel group tone value with regard to each pixel group classification number. The multivalue code increases with an increase in pixel group tone value.

The multivalue code set in the multivalue code table of this embodiment is variable in a tone value range of 0 to 15 with regard to any pixel group. The number of available multivalue codes for each pixel group is restricted to 16 at the maximum (tone value range of 0 to 15). This enables expression of the multivalue code by 4-bit data. The less variety of multivalue codes as different possible states generally has adverse effects on the picture quality. The multivalue code table of this embodiment is, however, set to have restriction in available tone value range of the multivalue codes with minimized possible adverse effects on the picture quality. The method of setting the multivalue code table and the technique of restricting the available tone value range of the multivalue codes while minimizing the possible adverse effects on the picture quality will be described later in detail.

Figure 10:
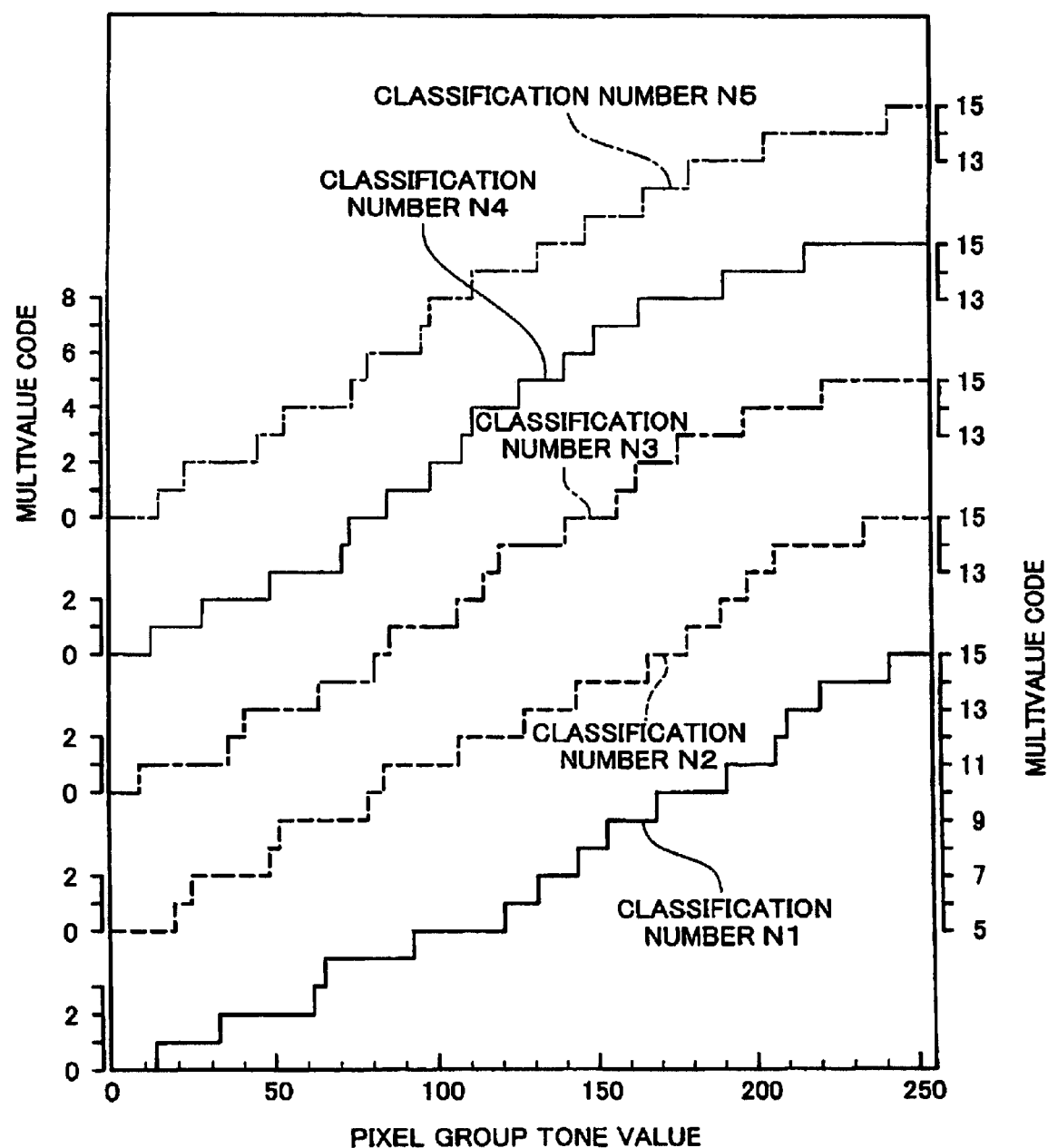
FIG. 10 shows a stepwise increase of multivalue code with an increase of pixel group tone value with regard to each classification number.

FIG. 10 shows a stepwise increase of the multivalue code with an increase of the pixel group tone value with regard to each classification number. The graph of FIG. 10 is expressed by the pixel group tone value as abscissa and by the multivalue code as ordinate. Each polygonal line shows a variation in multivalue code against the pixel group tone value. In the graph of FIG. 10, variations in multivalue code are shown with regard to five different classification numbers N1 to N5. For the clarity of illustration, the polygonal lines of these five pixel groups are shifted to start from different positions of the origin along the ordinate.

A thick-solid polygonal line represents a variation in multivalue code with regard to a pixel group having the classification number N1. The multivalue code is equal to '0' in a range of the pixel group tone value between 0 and 12, is equal to '1' in a range of the pixel group tone value between 13 and 31, is equal to '2' in a range of the pixel group tone value between 32 and 62, and is equal to '3' in a range of the pixel group tone value between 63 and 66. The multivalue code increases stepwise with an increase of the pixel group tone value and eventually reaches the maximum tone value '15'. The pixel group tone values in the tone value range of 0 to 255 with regard to the pixel group having the classification number N1 are accordingly converted to the 16 different multivalue codes in the tone value range of 0 to 15 (hexadecimal notation).

A thick-broken polygonal line represents a variation in multivalue code with regard to a pixel group having the classification number N2. The multivalue code changes from 0 to 1 at a pixel group tone value of '19' and from 1 to 2 at a pixel group tone value of '24' and successively increases to 3, 4, and 5 at pixel group tone values of '48', '52', and '78'. The pixel group tone values in the tone value range of 0 to 255 with regard to the pixel group having the classification number N2 are accordingly converted to the 16 different multivalue codes in the tone value range of 0 to 15 (hexadecimal notation). In this manner, the multivalue code generation process converts the pixel group tone values in the tone value range of 0 to 255 with regard to each pixel group to the 16 different multivalue codes in the tone value range of 0 to 15.

As shown in FIG. 10, the pixel group tone value having a stepwise change in multivalue code is varied according to the classification number of the pixel group. For example, the pixel group tone value having a stepwise change in multivalue code from 0 to 1 is equal to 13 with regard to the pixel group having the classification number N1 but is equal to 19 with regard to the pixel group having the classification number N2. The pixel group tone value having a stepwise change in multivalue code from '1' to '2' is equal to 32 with regard to the pixel group having the classification number N1 but is equal to 24 with regard to the pixel group having the classification number N2. The variations in multivalue code against the pixel group tone value set in the multivalue code table of this embodiment have each changeover point at different pixel group tone values corresponding to the respective pixel group classification numbers. Namely each pixel group has a specific correlation of the multivalue code to the pixel group tone value. The technique of setting a specific correlation of the multivalue code to the pixel group tone value with regard to each pixel group effectively restrains deterioration of the picture quality even under the condition of the restricted available range of the multivalue code, as described later in detail.

In the flowchart of FIG. 7, the multivalue code generation process refers to the multivalue code table storing such correlations and converts the specified pixel group tone value to a multivalue code with regard to the pixel group at step S204.

After generation of the multivalue code with regard to one pixel group of multiple adjacent pixels, the multivalue code generation process of FIG. 7 determines whether the processing has been completed for all the pixels included in the object image (step S206). When there is any unprocessed pixel (step S206: No), the multivalue code generation process returns to step S200 to set a next pixel group and repeats the subsequent series of processing to generate a multivalue code with regard to the next pixel group. When the processing has been completed for all the pixels included in the object image (step S206: Yes) through the repetition of this processing flow, the computer 100 outputs the multivalue code generated with regard to each pixel group to the color printer 200 (step S208) and terminates the multivalue code generation process of FIG. 7.

The output of the multivalue code with regard to each pixel group significantly reduces the total data volume supplied to the color printer 200, compared with output of conventional dot state data representing the dot on-off state of each pixel, as described below.

The color printer 200 of this embodiment is capable of creating three variable-size dots, the large-size dot, the medium-size dot, and the small-size dot. Each pixel accordingly takes one of four different dot states including a state of no dot creation and requires 2-bit data volume to show the dot on-off state. Each pixel group consists of 8 pixels and accordingly requires 16-bit data volume to show the dot on-off state of each pixel included in the pixel group.

The multivalue code generation process of the embodiment shown in FIG. 7, on the other hand, generates one of 16 different multivalue codes in the tone value range of 0 to 15 (see FIGS. 9 and 10) with regard to each pixel group. The expression of the 16 different multivalue codes requires 4-bit data volume with regard to each pixel group, while the expression of the dot on-off state of each pixel requires 16-bit data volume with regard to each pixel group. Namely the multivalue code generation process of the embodiment reduces the data volume output to the color printer 200 to one quarter. This attains high-speed data output from the computer 100 to the color printer 200 and high-speed image printing.

The color printer 200 receives the multivalue codes with regard to all pixel groups from the computer 100 and performs a dot on-off state determination process to determine the dot on-off state of each pixel included in each pixel group as described below.

C-2. Outline of Dot On-Off State Determination Process

Figure 11:
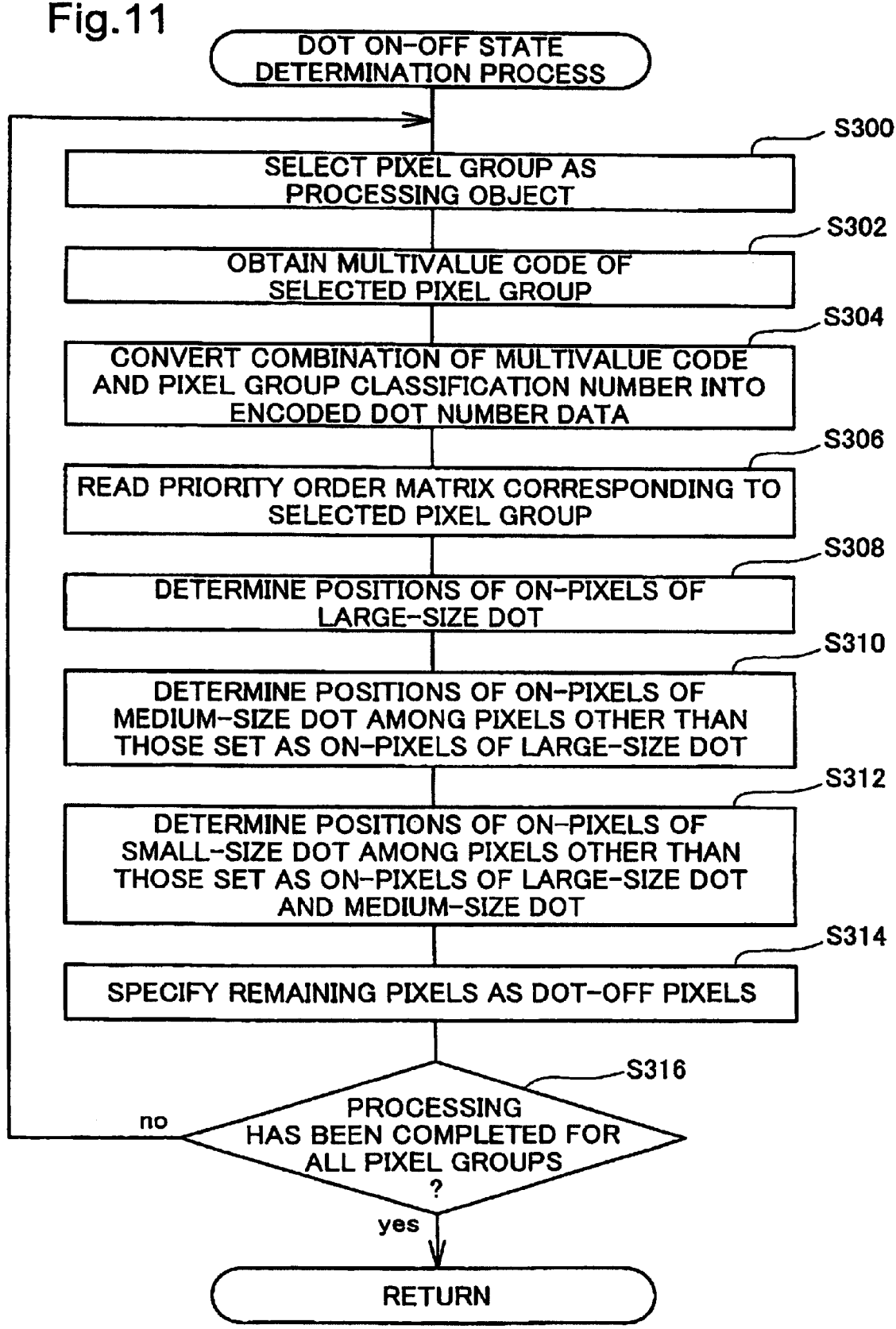
FIG. 11 is a flowchart showing the detailed flow of the dot on-off state determination process executed at step S108 in the image printing process of FIG. 6.

FIG. 11 is a flowchart showing the detailed flow of the dot on-off state determination process executed at step S108 in the image printing process of FIG. 6. The color printer 200 performs the dot on-off state determination process after receiving the multivalue code with regard to each pixel group from the computer 100. The details of the dot on-off state determination process are described below with reference to the flowchart of FIG. 11.

The dot on-off state determination process of the embodiment first selects a pixel group as a processing object (step S300), obtains the multivalue code of the selected pixel group (step S302), and converts the multivalue code of the pixel group to dot number data representing the numbers of respective size dots to be created in the pixel group (step S304). As described previously with reference to FIG. 10, the correlation of the multivalue code to the pixel group tone value is set for each pixel group, so that pixel groups having an identical pixel group tone value but different classification numbers often have different multivalue codes. As clearly understood from this fact, magnitude comparison of the multivalue codes is valid only among pixel groups having an identical classification number but is invalid among pixel groups having different classification numbers.

It is thus required to convert the multivalue code of each pixel group related to the classification number to data independent of the classification number. Conversion of the multivalue code of each pixel group to the data independent of the classification number validates the magnitude comparison among all the pixel groups. The converted data is related to the numbers of the respective size dots, that is, the numbers of the large-size dots, the medium-size dots, and the small-size dots, to be created in each pixel group.

According to this requirement, the dot on-off state determination process of FIG. 11 converts the multivalue code of the pixel group depending on the classification number to dot number data representing the numbers of respective size dots to be created in the pixel group at step S304. The actual conversion simply refers to a preset conversion table that stores adequate dot number data corresponding to each combination of the pixel group classification number and the multivalue code and thus requires an extremely short time.

Figure 12:
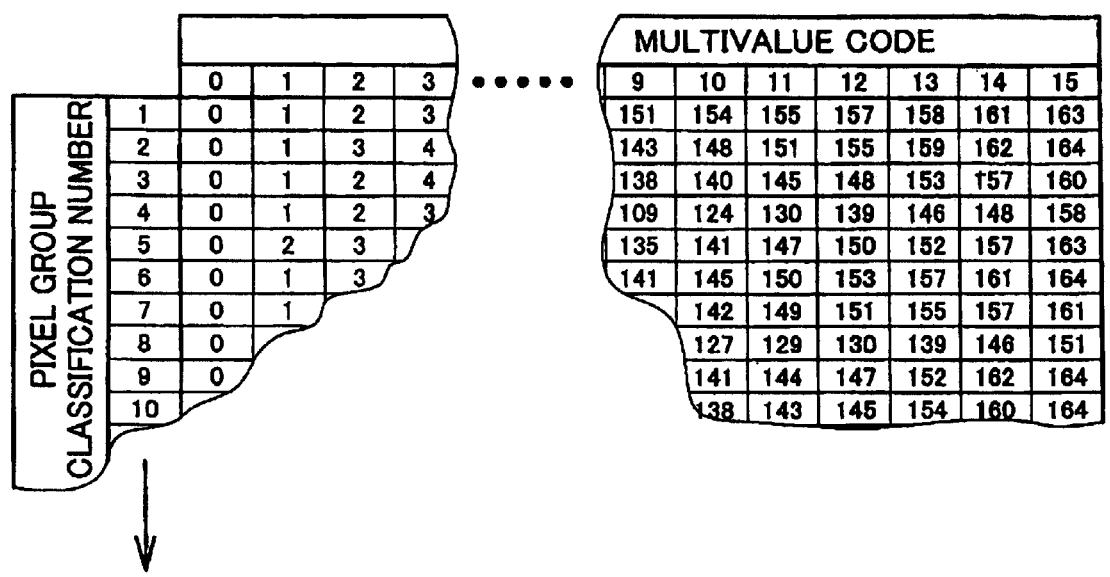
FIG. 12 conceptually shows a conversion table referred to in the dot on-off state determination process of FIG. 11.

FIG. 12 conceptually shows a conversion table referred to for conversion of each combination of the pixel group classification number and the multivalue code to dot number data. As illustrated, the conversion table stores the dot number data corresponding to each combination of the pixel group classification number and the multivalue code. With regard to a pixel group having a classification number '1', dot number data '0' is set corresponding to a multivalue code '0'. The dot number data '0' is code data representing that the numbers of the large-size dots, the medium-size dots, and the small-size dots to be created are all equal to 0. Dot number data '1' is set corresponding to a multivalue code '1'. The dot number data '1' is code data representing that the numbers of the large-size dots and the medium-size dots to be created are equal to 0 and that the number of the small-size dots to be created is equal to 1. Dot number data '164' is set corresponding to a multivalue code '15'. The dot number data '164' is code data representing that the number of the large-size dots to be created is 8 and that the numbers of the medium-size dots and the small-size dots are equal to 0.

The dot number data is set as such code data in the conversion table. The dot number data is not restricted to a data form directly specifying the numbers of the respective size dots to be created in each pixel group but may have any data form enabling specification of the numbers of the respective size dots to be created in each pixel group by any suitable method.

FIG. 13 shows a correlation map that allocates encoded dot number data to each combination of the numbers of the large-size dots, the medium-size dots, and the small-size dots to be created in each pixel group. The numbers of the respective size dots to be created in each pixel group are expressed as encoded dot number data, because of the reason given below.

Each pixel group consists of 8 pixels. The numbers of the large-size dots, the medium-size dots, and the small-size dots created in each pixel group respectively take one of 9 values from 0 to 8. Non-encoded dot number data requires 4-bit data volume each for the number of the large-size dots, the number of the medium-size dots, and the number of the small-size dots. Namely each pixel group requires 12-bit data volume for non-encoded expression.

Since each pixel group consists of 8 pixels, the total number of dots created in each pixel group is 8 at the maximum. For example, a combination of 4 large-size dots, 3 medium-size dots, and 2 small-size dots is practically impossible since the total number of dots created in the pixel group is 9 and exceeds the maximum value of 8. The practically possible combinations of the numbers of the respective size dots are thus limited in number and are given as below. The practically possible combinations of the numbers of the respective size dots created in each pixel group consisting of 8 pixels are expressed by the number of possible combinations in 8 selections with repetition among the four different states 'creation of the large-size dot', 'creation of the medium-size dot', 'creation of the small-size dot', and 'creation of no dot' in each pixel:

$$_4H_8(=_{4+8-1}C_8)$$

In this example, there are 165 practically possible combinations of the numbers of the respective size dots at the maximum. Here $_nH_r$ denotes an operator of determining the number of possible combinations in 'r' selections with repetition among 'n' options (number of repeated combinations), and $_nC_r$ denotes an operator of determining the number of possible combinations in 'r' selections without repetition among 'n' options. The 165 combinations of the numbers of the respective size dots are expressible by 8-bit data. Setting code data to each practically possible combination of the numbers of the respective size dots enables expression of the combination of the numbers of the respective size dots to be created in each pixel group by the 8-bit length. The encoded dot number data reduces the required data volume, compared with the non-encoded expression of the numbers of the respective size dots. In this embodiment, the dot number data is thus expressed as encoded data as shown in FIG. 13 and the conversion table of FIG. 12 sets the encoded dot number data corresponding to each combination of the pixel group classification number and the multivalue code. The method of setting the conversion table of FIG. 12 will be described later in detail.

The dot on-off state determination process of FIG. 11 refers to the conversion table of FIG. 12 to convert the multivalue code of each pixel group to the encoded dot number data representing the numbers of respective size dots to be created in the pixel group. Both the multivalue code and the pixel group classification number are required for conversion to the encoded dot number data by reference to the conversion table of FIG. 12. As described previously with reference to FIG. 8, the classification number of each pixel group is specified according to the position of the pixel group in an image. The multivalue code is set and output with regard to each pixel group. The output order of the multivalue codes thus identifies the position of a pixel group having a certain multivalue code on the image and enables easy specification of the classification number of the pixel group. The method of specifying the classification number of each pixel group according to the position of the pixel group on the image will be described later in detail. The computer 100 may output the pixel group classification number together with the multivalue code to the color printer 200.

The dot on-off state determination process of FIG. 11 subsequently reads a priority order matrix corresponding to the selected pixel group (step S306). The priority order matrix sets an order of priority of dot creation with regard to the respective pixels included in the pixel group. FIG. 14 shows one example of the priority order matrixes. Different priority order matrixes are set corresponding to pixel groups having different classification numbers. In the priority order matrix of FIG. 14(a) corresponding to a pixel group having a classification number '1', a pixel at the upper left corner has the highest priority of dot creation among 8 pixels of this pixel group. The numeral '1' set in the upper left-most pixel of the priority order matrix represents that this pixel has the highest priority or dot creation. Each numeral set in each pixel of the priority order matrix represents an ordinal number allocated to the pixel. The ordinal number '2' set in the lower right-most pixel of the priority order matrix represents that this pixel has the second highest priority of dot creation. In this manner, the priority order matrix sets the ordinal numbers representing the priority order of dot creation for the 8 pixels included in the pixel group.

Different priority order matrixes are allocated to pixel groups having different classification numbers. For example, in the priority order matrix of FIG. 14(b) corresponding to a pixel group having a classification number '2', a lower second-left pixel has the highest priority of dot creation (the pixel having the ordinal number '1'), and a lower right-most pixel has the second highest priority of dot creation (the pixel having the ordinal number '2'). In the priority order matrix of FIG. 14(c) corresponding to a pixel group having a classification number '3', an upper second-right pixel has the highest priority of dot creation (the pixel having the ordinal number '1'), and a lower left-most pixel has the second highest priority of dot creation (the pixel having the ordinal number '2').

The priority order matrixes allocated to the respective classification numbers of the pixel groups as shown in FIG. 14 are stored in advance in the ROM included in the color printer 200 of the embodiment. The dot on-off state determination process of FIG. 11 reads a priority order matrix corresponding to the classification number of the selected pixel group from the ROM at step S306. The method of setting the priority order matrix corresponding to each pixel group classification number will be described later in detail.

After reading the priority order matrix corresponding to the selected pixel group, the dot on-off state determination process determines the positions of on-pixels of the large-size dot among the 8 pixels included in the selected pixel group (step S308). The large-size dot is more conspicuous than the medium-size dot and the small-size dot. For the better dot dispersion of the large-size dot, it is preferable to determine the positions of on-pixels of the large-size dot, prior to those of the other size dots. The positions of on-pixels of the large-size dot are determined according to the encoded dot number data obtained by conversion of the multivalue code of the pixel group and the priority order matrix corresponding to the pixel group.

Figure 15:
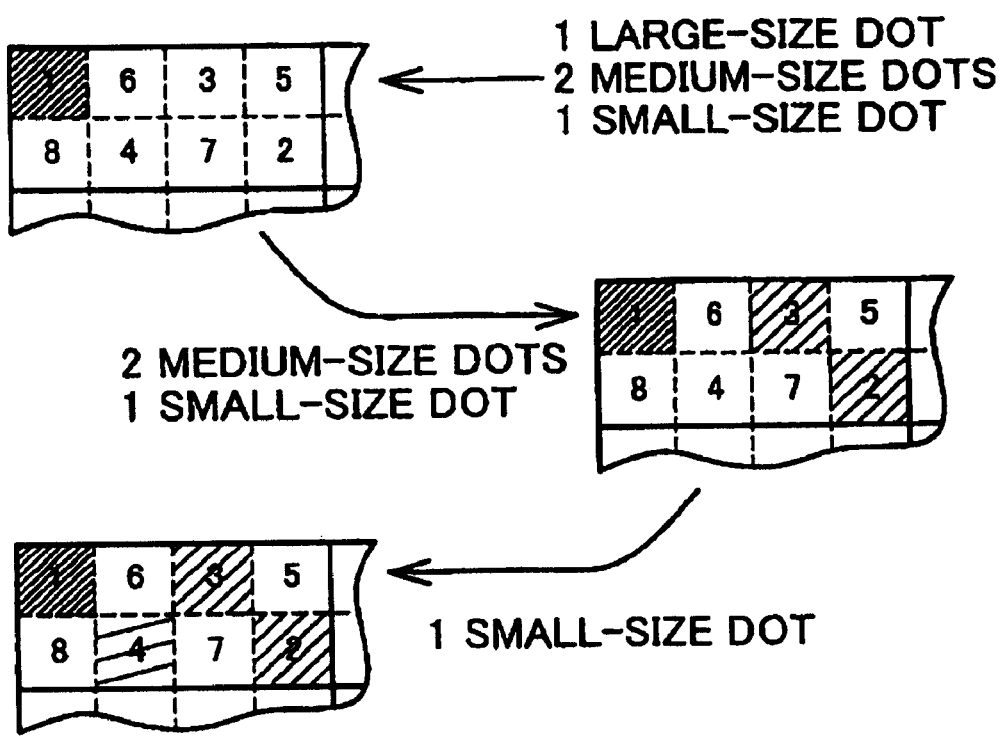
FIG. 15 conceptually shows determination of the positions of on-pixels of respective size dots in a certain pixel group, based on encoded dot number data and a priority order matrix.

FIG. 15 conceptually shows determination of the positions of on-pixels of the respective size dots in a certain pixel group, based on the encoded dot number data and the priority order matrix. In this illustrated example, the encoded dot number data represents a combination of 1 large-size dot, 2 medium-size dots, and 1 small-size dot to be created in a certain pixel group. As mentioned above, the priority order matrix sets the priority order of dot creation in respective pixels included in a pixel group, and the positions of on-pixels of the large-size dot are determined prior to those of the other size dots. The large-size dot is accordingly to be created in a pixel having the ordinal number '1'. When the encoded dot number data represents creation of 2 large-size dots, the large-size dot is to be created in a pixel having the ordinal number '2' in addition to the pixel having the ordinal number '1'. In the illustrated example of FIG. 15, the on-pixel of the large-size dot is filled with fine slant lines. In this manner, the dot on-off state determination process of FIG. 11 determines the positions of on-pixels of the large-size dot based on the encoded dot number data and the priority order matrix at step S308.

After determination of the positions of on-pixels of the large-size dot, the dot on-off state determination process of FIG. 11 determines the positions of on-pixels of the medium-size dot (step S310). In the illustrated example of FIG. 15, 2 medium-size dots are to be created. Since the pixel having the ordinal number '1' has already been set as the on-pixel of the large-size dot, the medium-size dot is to be created in a pixel having the ordinal number '2' and a pixel having the ordinal number '3'. In the illustrated example of FIG. 15, the on-pixels of the medium-size dot are filled with slant lines. In this manner, the dot on-off state determination process FIG. 11 determines the positions of on-pixels of the medium-size dot among the pixels other than those specified as the on-pixels of the large-size dot at step S310.

After determination of the positions of on-pixels of the medium-size dot, the dot on-off state determination process of FIG. 11 determines the positions of on-pixels of the small-size dot (step S312). In the illustrated example of FIG. 15, 1 small-size dot is to be created. Since the pixel having the ordinal number '1' and the pixels having the ordinal numbers '2' and '3' have already been set respectively as the on-pixel of the large-size dot and the on-pixels of the medium-size dot, the small-size dot is to be created in a pixel having the ordinal number '4'. In the illustrated example of FIG. 15, the on-pixel of the small-size dot is filled with rough slant lines.

After determination of the positions of the large-size dot, the medium-size dot, and the small-size dot, the remaining pixels in the pixel group are specified as dot-off pixels (step S314 in FIG. 11). This series of procedure determines the dot on-off state with regard to all the pixels in the selected pixel group.

The dot on-off state determination process then determines whether the processing has been completed for all the pixel groups (step S316). When there is any unprocessed pixel group (step S316: No), the dot on-off state determination process returns to step S300 to select a next pixel group as a new processing object and repeats the subsequent series of processing with regard to the next pixel group. When the processing has been completed for all the pixel groups (step S316: Yes), the processing flow exits from the dot on-off state determination process of FIG. 11 and goes back to the image printing process of FIG. 6. The image printing process creates dots according to the determined dot on-off state to print an image on the printing paper.

As described above, the image printing process of the embodiment collects a preset number of adjoining pixels to one pixel group, generates a multivalue code of the pixel group, and outputs the generated multivalue code to the color printer 200. The multivalue code of each pixel group is readily obtained by simply specifying the pixel group classification number and the pixel group tone value and referring to the multivalue code table shown in FIG. 9. Both the pixel group classification number and the pixel group tone value are extremely easily specifiable. The multivalue code of each pixel group is thus generable by an extremely simple and high-speed operation.

The multivalue code table of this embodiment restricts the multivalue codes available for each pixel group in the tone value range of 0 to 15. The multivalue code of each pixel is thus expressible by 4-bit data. This arrangement significantly reduces the required data volume compared with the dot state data representing the dot on-off state of each pixel, thus attaining high-speed supply of the multivalue code of each pixel group to the color printer 200.

The color printer 200 converts the received multivalue code of each pixel group to the encoded dot number data representing the numbers of the respective size dots to be created in the pixel group. The encoded dot number data is readily obtained by simply referring to the conversion table shown in FIG. 12. The color printer 200 then determines the positions of on-pixels of the large-size dot, the medium-size dot, and the small-size dot in each pixel group based on the encoded dot number data and the priority order matrix and actually creates dots according to the determined positions of on-pixels of the respective size dots to complete a printed image. The use of the priority order matrix determines the positions of on-pixels of the large-size dot, the medium-size dot, and the small-size dot by the relatively simple procedure. The color printer 200 thus enables the relatively easy and high-speed determination of the dot on-off state of the respective pixels in each pixel group based on the received multivalue code of the pixel group and ensures resulting high-speed image printing.

The image printing process of this embodiment enables high-speed and yet sufficiently high-quality image printing. Appropriate settings of the multivalue code table, the conversion table, and the priority order matrix according to the pixel group classification number give a high-quality printed image having favorable dot dispersibility, which is equivalent to the dot dispersibility attained by a large-scale dither matrix, for example, a blue noise mask or a green noise mask. The description sequentially regards the principle of specifying the classification number of each pixel group and the methods of setting the multivalue code table, the conversion table, and the priority order matrix, as well as the reason of such high-quality image printing.

C-3. Outline of Dither Technique

The image printing process of this embodiment is an evolutionary modification of the dither technique. For the better understanding, the outline of the dither technique is briefly explained as the basis of the principle of specifying the classification number of each pixel group and the methods of setting the multivalue code table, the conversion table, and the priority order matrix.

The dither technique is a typical method applied to convert image data to dot state data representing the dot on-off state of individual pixels. This technique uses a matrix of threshold values called a dither matrix and compares the tone value of image data in each pixel with a threshold value set at the corresponding pixel position in the dither matrix. The pixel having the tone value of image data equal to or greater than the threshold value is determined as a dot-on pixel, whereas the pixel having the tone value of image data smaller than the threshold value is determined as a dot-off pixel. The comparison between the tone value of the image data and the threshold value is made with regard to all the pixels included in an image to convert the image data into the dot state data representing the dot on-off state of individual pixels.

FIG. 16 conceptually shows part of a dither matrix as an example. The dither matrix of this illustrated example is defined by 128 pixels in a horizontal direction (main scanning direction) and 64 pixels in a vertical direction (sub-scanning direction) and accordingly has total of 8192 pixels. Threshold values evenly selected in a tone value range of 1 to 255 are set and stored at random in the 8192 pixels of the dither matrix. The threshold values of the dither matrix are selected in the tone value range of 1 to 255, since the image data to be processed in this embodiment is 1-byte data having tone values in a range of 0 to 255 and the pixel having the tone value of the image data equal to the threshold value is determined as a dot-on pixel.

When the dot-on pixel is restricted to pixels having tone values of image data greater than the threshold values (that is, when the pixel having the tone value of the image data equal to the threshold value is determined as a dot-off pixel), any pixel having a threshold value equal to the maximum tone value of the image data is consistently determined as a dot-off pixel. In order to avoid this constant dot-off state, the selectable range of the threshold values is set to the tone value range of the image data other than the maximum tone value. When the pixel having the tone value of the image data equal to the threshold value is determined as a dot-on pixel, on the other hand, any pixel having a threshold value equal to the minimum tone value of the image data is consistently determined as a dot-on pixel. In order to avoid this constant dot-on state, the selectable range of the threshold values is set to the tone value range of the image data other than the minimum tone value. In this embodiment, the tone value range of the image data is 0 to 255 and the pixel having the tone value of the image data equal to the threshold value is determined as a dot-on pixel. The selectable range of the threshold values is thus set to the tone value range of 1 to 255. The dimensions of the dither matrix are not restricted to those of FIG. 16 but may be set arbitrarily. The dither matrix may be a rectangular matrix having different numbers of horizontal pixels and vertical pixels or may be a square matrix having identical numbers of horizontal pixels and vertical pixels.

Figure 17:
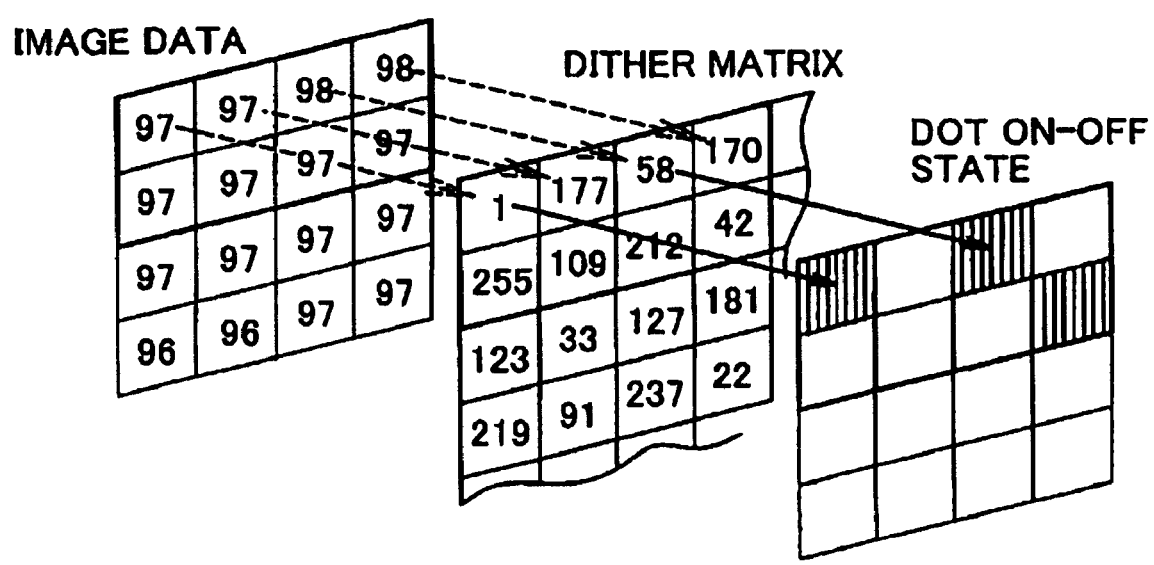
FIG. 17 conceptually shows determination of the dot on-off state in respective pixels with reference to a dither matrix.

FIG. 17 conceptually shows determination of the dot on-off state in respective pixels with reference to a dither matrix. The dot on-off state determination process selects each pixel as an object to be processed and compares the tone value of image data in the selected object pixel with a threshold value stored at the corresponding pixel position in the dither matrix. The arrows of the thin broken line in FIG. 17 conceptually represent comparison between the tone value of image data in each pixel and the threshold value stored at the corresponding pixel position in the dither matrix. For example, at a pixel of an upper left corner, the tone value of image data is 97 and the threshold value of the dither matrix is 1. The upper left pixel has the greater tone value than the threshold value and is thus determined as a dot-on pixel. The arrows of the solid line in FIG. 17 conceptually represent determination of dot-on pixels and storage of the determination results into a memory. At an adjacent pixel on the right side of the upper left pixel, the tone value of image data is 97 and the threshold value of the dither matrix is 177. The right adjacent pixel has the smaller tone value than the threshold value and is thus determined as a dot-off pixel. The dither technique refers to the dither matrix to determine the dot on-off state of respective pixels in this manner and thereby converts the image data into the dot state data representing the dot on-off state of individual pixels.

Based on the basic idea of this dither technique, the principle of specifying the classification number of each pixel group and the methods of setting the multivalue code table, the conversion table, and the priority order matrix are described below in detail.

C-4. Principle of Specifying Classification Number

The description sequentially regards the principle of specifying the classification number of each pixel group and the reason for applicability of the simple method shown in FIG. 8 to specification of the classification number of the pixel group.

Figure 18A:
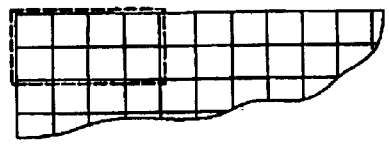
FIGS. 18A through 18C show the principle of specifying a classification number of each pixel group.
Figure 18B:
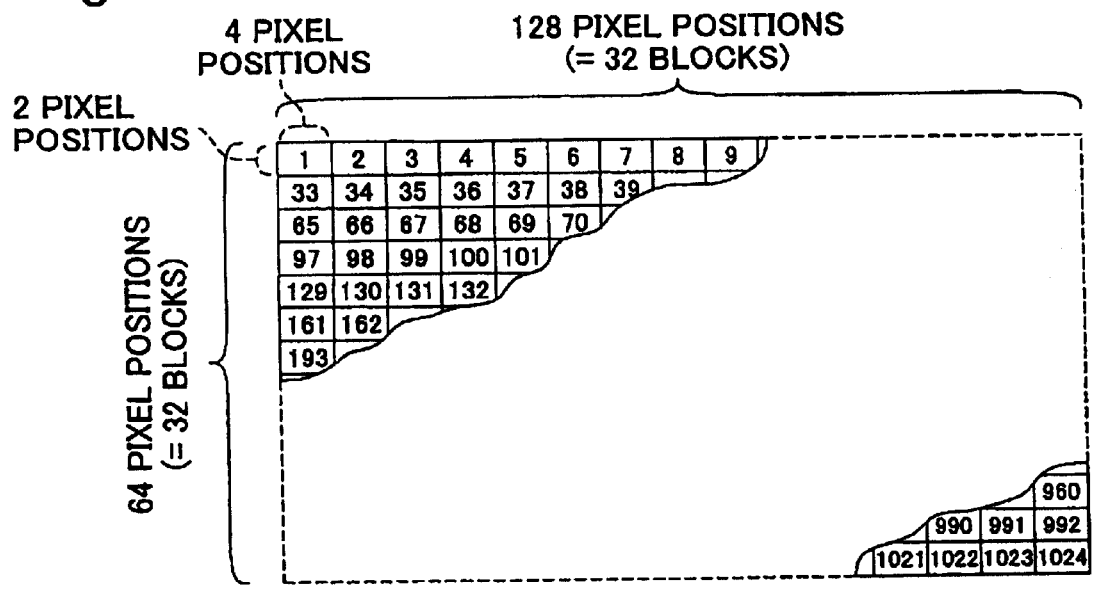
Figure 18C:
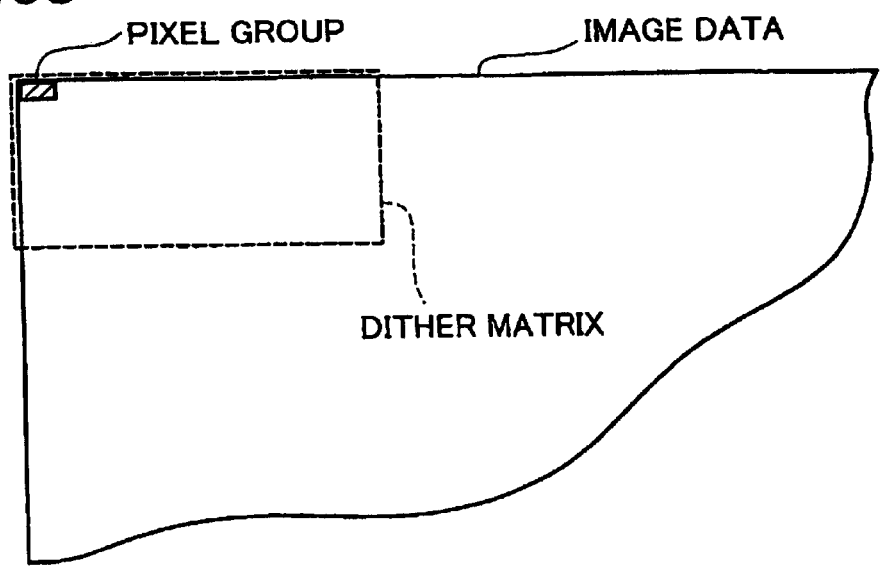

FIGS. 18A through 18C show the principle of specifying the classification number of each pixel group. In the illustrated example of FIG. 18A, one pixel group at an upper left corner of an image is set by collecting total of 8 pixels, that is, 4 pixels in the horizontal direction by 2 pixels in the vertical direction.

As described above, the dither technique compares the tone value of image data in each pixel with the threshold value set at the corresponding pixel position in the dither matrix and determines the dot on-off state of the pixel. The procedure of this embodiment collects a preset number of adjacent pixels to one pixel group and similarly collects the same preset number of threshold values set in the dither matrix to one block corresponding to the pixel group. FIG. 18B shows division of the threshold values set in the dither matrix of FIG. 16 by collecting 4 threshold values in the horizontal direction and 2 threshold values in the vertical direction to each block. The dither matrix of FIG. 16 stores the threshold values set in 8192 pixel positions defined by 128 pixel positions in the horizontal direction (in the main scanning direction) and 64 pixel positions in the vertical direction (in the sub-scanning direction). Collection of 4 threshold values in the horizontal direction and 2 threshold values in the vertical direction divides the dither matrix into 1024 blocks, that is, 32 blocks in both the horizontal direction and the vertical direction.

As shown in FIG. 18B, serial numbers of 1 to 1024 are allocated to these 1024 blocks. Each pixel group of image data is classified by the serial number of the corresponding block in the dither matrix applied at the position of the pixel group. For example, the block with the serial number '1' shown in FIG. 18B is applied to the pixel group of the upper left corner in the image as shown in FIG. 18C. This upper left pixel group is thus classified as a pixel group of the serial number '1'. This is the basic idea of specifying the classification number of each pixel group.

The simple method of FIG. 8 is applicable to specify the classification number of each pixel group, because of the following reason. FIG. 19 shows a method of computing the classification number of an object pixel group. One pixel group set in an image as the object pixel group is shown in FIG. 19A. The method of computing the classification number is described with regard to this object pixel group. As mentioned previously, the position of each pixel group is represented by the position of a pixel at an upper left corner in the pixel group. The position of the upper left pixel representing the position of the object pixel group is shown by a closed circle in FIG. 19A. The position of this upper left pixel is defined as (X,Y). Each pixel group has the size of 4 pixels in the main scanning direction and 2 pixels in the sub-scanning direction. There are accordingly 'n' and 'm' ('n' and 'm' are positive integers including 0) to satisfy:

$$X=4n+1$$

$$Y=2m+1$$

This means that 'n' pixel groups are present on the left of the object pixel group and 'm' pixel groups are present above the object pixel group.

As described above, each pixel group of image data is classified by the serial number of the corresponding block in the dither matrix applied at the position of the pixel group (see FIG. 18). The classification number allocated to each pixel group depends upon the method of shifting the dither matrix for application on the image data. Namely different shifting methods may allocate different classification numbers to an identical pixel group. Although any of various techniques may be adopted to shift the dither matrix for application on the image data, the simplest method of shifting the dither matrix in the horizontal direction is adopted here for the convenience of explanation. FIG. 19B conceptually shows repeated application of the same dither matrix onto the image data with successive shifts of the dither matrix in the horizontal direction.

FIG. 19C conceptually shows application of the dither matrix onto the object pixel group set in FIG. 19A in the course of repeated application of the dither matrix as shown in FIG. 19B. One of the blocks in the dither matrix, which is shifted horizontally on the image data, is applied at the position of the object pixel group. It is here assumed that a block of an M-th row and an N-th column in the dither matrix is applied onto the object pixel group. As shown in FIG. 19A, 'n' pixel groups are present on the left of the object pixel group and 'm' pixel groups are present above the object pixel group. The values N and M are accordingly expressed as:

$$N=n-\mathrm{int}(n/32)\times 32+1$$

$$M=m-\mathrm{int}(m/32)\times 32+1$$

where 'int' denotes an operator of dropping the figures after the decimal point and rounding down the value to the nearest integer. The arithmetic operation int(n/32) drops the figures after the decimal point and rounds down the value of n/32 to the nearest integer. The values M and N are computable from the above relational expressions (FIG. 19D) upon specification of the position of the object pixel group. The serial number allocated to the block of the M-th row and the N-th column in the dither matrix is given as the classification number of the object pixel group. As described previously with reference to FIG. 8, however, the classification number is extremely easily obtainable by simple extraction of data of preset bits from binary data of the coordinate values X and Y defining the position of the object pixel group. The reason for this simple specification is described below.

FIG. 20 shows a concrete procedure of specifying the classification number according to binary data of the coordinates representing the object pixel group. The position of the object pixel group is defined by the coordinates (X,Y), where X and Y are 10-bit data. FIG. 20(a) conceptually shows 10-bit binary data representing the value X. For the purpose of bit discrimination, serial numbers of 1 to 10 are sequentially allocated to the upper-most bit to the lower-most bit.

As described above with reference to FIG. 19, the number 'n' of pixel groups present on the left of the object pixel group is obtained by subtracting 1 from the value X and dividing the result of the subtraction by 4. The division by 4 is equivalent to a rightward shift by 2 bits. The required calculation thus subtracts 1 from the value X and shifts the obtained binary data rightward by 2 bits. The value X is not an arbitrary value but takes only a numerical value expressible as (4n+1). A simple rightward shift of the binary data by 2 bits without the subtraction of 1 accordingly determines the number 'n' of pixel groups. FIG. 20(b) conceptually shows binary data of the number 'n' obtained by the bit shift of the binary data of the value X.

The arithmetic operation int(n/32) is then performed to divide the number 'n' by 32 and drop the figures after the decimal point. The division by 32 is equivalent to a rightward shift of the binary data by 5 bits. The calculation of the binary data as an integer automatically drops the figures after the decimal point. Namely the binary data of int(n/32) is obtained by a simple rightward shift of the binary data of the number 'n' by 5 bits. FIG. 20(c) conceptually shows binary data of int(n/32) obtained by the bit shift of the binary data of the number 'n'.

The binary data of int(n/32) is multiplied by 32. The multiplication by 32 is equivalent to a leftward shift of the binary data by 5 bits. FIG. 20(d) conceptually shows binary data of int(n/32)×32 obtained by the bit shift of the binary data of the number 'n'.

Subtraction of the binary data of int(n/32)×32 from the binary data of the number 'n' gives the value N. As clearly understood from the comparison between the binary data of the number 'n' (see FIG. 20(b)) and the binary data of int(n/32)×32 (see FIG. 20(d)), these two binary data have common digits in the upper 5 bits. The binary data of the subtrahend int(n/32)×32 has 0 in all the lower 5 bits. Namely simple extraction of the lower 5 bits from the binary data of the minuend 'n' accordingly determines the value N. Simple application of mask data shown in FIG. 20(f) on the binary data of the number 'n' (FIG. 20(b)) gives the value N. The value N is also obtainable by applying mask data shown in FIG. 20(g) on the binary data of the value X representing the position of the object pixel group (FIG. 20(a)) and directly extracting $4^{th}$ to $8^{th}$ bit data.

The above description with reference to FIG. 20 regards the process of determining the value N representing the block position in the dither matrix from the value X of the coordinates (X,Y) representing the position of the object pixel group. In a similar manner, the value M representing the block position in the dither matrix is determined from the value Y. Upon specification of the position of the object pixel group, simple extraction of bit data from specified bits of the binary data identifies the ordinal numbers of the row and the column of the block in the dither matrix corresponding to the object pixel group. The classification number of the object pixel group is thus readily specified by the serial number of the corresponding block. This is the reason for applicability of the simple method shown in FIG. 8.

C-5. Method of Setting Multivalue Code Table

The method of setting the multivalue code table shown in FIG. 9 is described below. As mentioned previously, the multivalue code table stores variations in multivalue code against the pixel group tone value with regard to each pixel group classification number. The multivalue coding refers to this multivalue code table to convert the pixel group tone value to a multivalue code according to the pixel group specification number as shown in FIG. 10.

The multivalue code table of this embodiment is set based on the evolutionary modification of the dither technique to enable determination of the dot on-off state in each pixel with regard to multiple different size dots. The details of this modified dither technique are disclosed in Japanese Patent No. 3292104. The outline of this modified dither technique is briefly described as the basis of the method of setting the multivalue code table.

Figure 21:
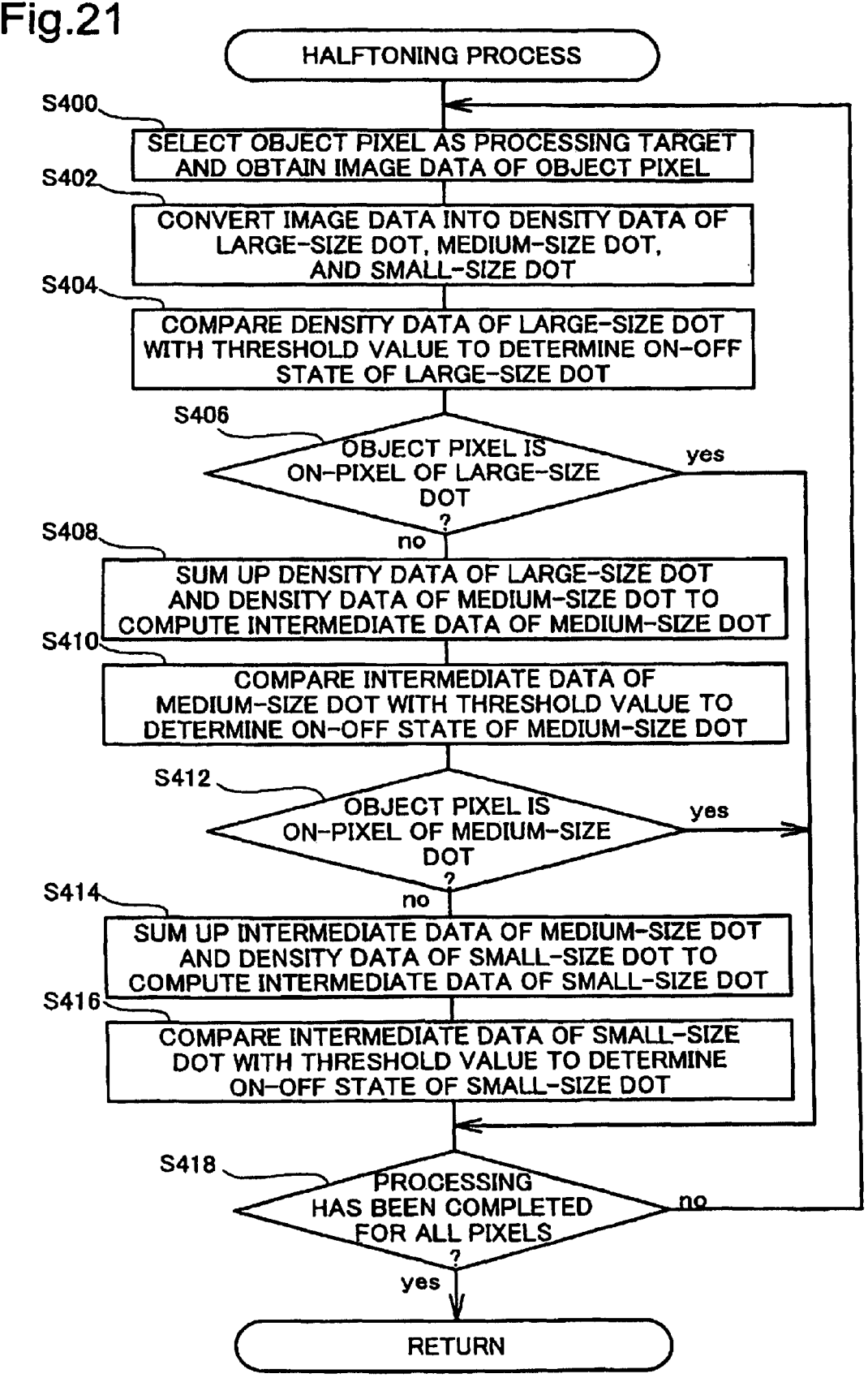
FIG. 21 is a flowchart showing a halftoning process as the modified dither technique to enable determination of the on-off state of the large-size dot, the medium-size dot, and the small-size dot in each pixel.

FIG. 21 is a flowchart showing a halftoning process as the modified dither technique to enable determination of the on-off state of the large-size dot, the medium-size dot, and the small-size dot in each pixel. The halftoning process first selects an object pixel in an image as a processing target for determination of the dot on-off state and obtains image data of the selected object pixel (step S400) and converts the obtained image data of the selected object pixel into density data of the large-size dot, the medium-size dot, and the small-size dot (step S402). The density data are expressed by the tone values representing the densities of the respective size dots to be created. The higher tone value of the density data represents the higher density of dot creation. For example, a tone value '255' of the density data shows a dot creation density of 100%, that is, creation of dots in all pixels. A tone value '0' of the density data shows a dot creation density of 0%, that is, no creation of dots in any pixels. The conversion of the image data into the density data is readily achieved by referring to a numerical table called a dot density conversion table.

Figure 22:
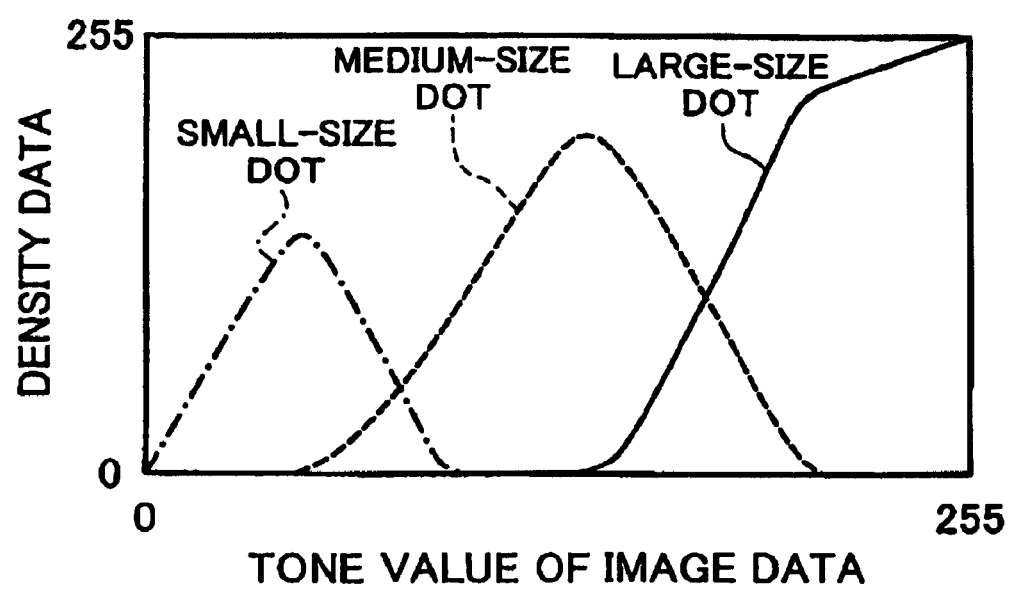
FIG. 22 conceptually shows a dot density conversion table referred to for conversion of a tone value of image data to density data of the large-size dot, the medium-size dot, and the small-size dot.

FIG. 22 conceptually shows the dot density conversion table referred to for conversion of the tone value of image data into the density data of the large-size dot, the medium-size dot, and the small-size dot. As illustrated, the dot density conversion table sets the density data of the small-size dot, the medium-size dot, and the large-size dot against the tone value of image data. In an area close to the tone value '0' of the image data, the density data of both the medium-size dot and the large-size dot are set to have a tone value of '0'. The density data of the small-size dot gradually increases with an increase in tone value of the image data. When the increasing tone value of the image data reaches a first preset level, the dot density conversion table starts decreasing the density data of the small-size dot and increasing the density data of the medium-size dot. When the tone value of the image data further increases and reaches a second preset level, the dot density conversion table sets the decreasing density data of the small-size dot to the tone value of '0' and starts decreasing the density data of the medium-size dot and increasing the density data of the large-size dot. The halftoning process of FIG. 21 refers to this dot density conversion table to convert the tone value of the image data into the density data of the large-size dot, the density data of the medium-size dot, and the density data of the small-size dot at step S402.

After conversion of the image data of the object pixel into the density data of the large-size dot, the medium-size dot, and the small-size dot, the halftoning process of FIG. 21 determines the on-off state of the large-size dot in the object pixel (step S404). The determination is based on the result of comparison between the density data of the large-size dot in the object pixel and a threshold value set at a corresponding position in the dither matrix. When the density data of the large-size dot is not smaller than the threshold value, a large-size dot is to be created in the object pixel. When the density data of the large-size dot is smaller than the threshold value, on the other hand, no large-size dot is to be created in the object pixel.

The halftoning process then specifies whether the object pixel is an on-pixel or an off-pixel of the large-size dot (step S406). In the case of specification of the object pixel as the on-pixel of the large-size dot (step S406: Yes), the halftoning process skips further determination with regard to the medium-size dot and the small-size dot and determines whether the processing has been completed for all the pixels included in the image (step S418). When there is any unprocessed pixel (step S418: No), the halftoning process returns to step S400 to select a next object pixel and repeats the subsequent series of processing.

In the case of specification of the object pixel as the off-pixel of the large-size dot (step S406: No), on the other hand, the halftoning process sums up the density data of the large-size dot and the density data of the medium-size dot to compute intermediate data of the medium-size dot (step S408) and compares the computed intermediate data of the medium-size dot with the threshold value in the dither matrix to determine the on-off state of the medium-size dot in the object pixel (step S410). When the intermediate data of the medium-size dot is not smaller than the threshold value, a medium-size dot is to be created in the object pixel. When the intermediate data of the medium-size dot is smaller than the threshold value, on the other hand, no medium-size dot is to be created in the object pixel.

The halftoning process then specifies whether the object pixel is an on-pixel or an off-pixel of the medium-size dot (step S412). In the case of specification of the object pixel as the on-pixel of the medium-size dot (step S412: Yes), the halftoning process skips further determination with regard to the small-size dot and determines whether the processing has been completed for all the pixels included in the image (step S418).

In the case of specification of the object pixel as the off-pixel of the medium-size dot (step S412: No), on the other hand, the halftoning process sums up the intermediate data of the medium-size dot and the density data of the small-size dot to compute intermediate data of the small-size dot (step S414) and compares the computed intermediate data of the small-size dot with the threshold value in the dither matrix to determine the on-off state of the small-size dot in the object pixel (step S416). When the intermediate data of the small-size dot is not smaller than the threshold value, a small-size dot is to be created in the object pixel. When the intermediate data of the small-size dot is smaller than the threshold value, on the other hand, no dot is to be created in the object pixel.

With regard to the object pixel having the greater threshold value in the dither matrix than the density data of the large-size dot than (that is, with regard to the object pixel specified as the off-pixel of the large-size dot), the procedure computes the intermediate data of the medium-size dot as the sum of the density data of the large-size dot and the density data of the medium-size dot and compares the computed intermediate data of the medium-size dot with the threshold value. A medium-size dot is to be created in the object pixel when the intermediate data of the medium-size dot is not smaller than the threshold value. With regard to the object pixel having the greater threshold value in the dither matrix than the intermediate data of the medium-size dot (that is, with regard to the object pixel specified as the off-pixel of the medium-size dot), the procedure computes the intermediate data of the small-size dot as the sum of the intermediate data of the medium-size dot and the density data of the small-size dot and compares the computed intermediate data of the small-size dot with the threshold value. A small-size dot is to be created in the object pixel when the intermediate data of the small-size dot is not smaller than the threshold value. With regard to the object pixel having the greater threshold value in the dither matrix than the intermediate data of the small-size dot, no dot is to be created in the object pixel.

This series of processing specifies the object pixel as the on-pixel of the large-size dot, the on-pixel of the medium-size dot, the on-pixel of the small-size dot, or the off-pixel of any size dot. It is then determined whether the processing has been completed for all the pixels included in the image (step S418). When there is any unprocessed pixel (step S418: No), the halftoning process returns to step S400 to select a next object pixel and repeats the subsequent series of processing. In this manner, the halftoning process successively determines the on-off state of the large-size dot, the medium-size dot, and the small-size dot in each pixel selected as a processing target. On completion of the processing for all the pixels included in the image (step S418: Yes), the processing flow terminates the halftoning process of FIG. 21.

The on-off state of the large-size dot, the medium-size dot, and the small-size dot in each pixel is determinable in the above manner by utilizing the dither matrix. The method of setting the multivalue code table shown in FIG. 9 is described on the basis of the above explanation.

As described above, the multivalue code generation process uses the pixel group tone value as a representative of image data of the respective pixels included in each pixel group and accordingly converts the image data of the pixel group to the multivalue code. The procedure of setting the multivalue code table determines the on-off state of the respective size dots, that is, the large-size dot, the medium-size dot, and the small-size dot, in each pixel on the assumption that all the pixels in one pixel group have image data of an identical tone value with the pixel group tone value. The halftoning process described above with reference to the flowchart of FIG. 21 is adopted to determine the on-off state of the respective size dots.

Figure 23:
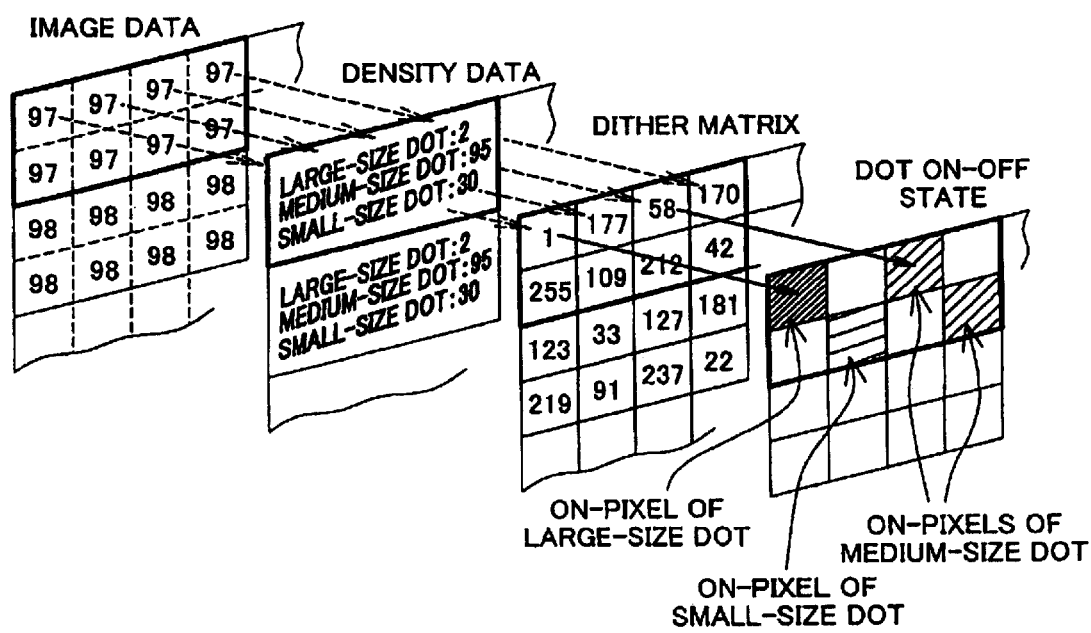
FIG. 23 conceptually shows an example of determining the on-off state of the large-size dot, the medium-size dot, and the small-size dot in respective pixels of a pixel group.

FIG. 23 conceptually shows an example of determining the on-off state of the large-size dot, the medium-size dot, and the small-size dot in respective pixels of a pixel group. An object pixel group for the halftoning process is encircled by the thick solid line in FIG. 23. The object pixel group consists of 8 pixels, and the image data of the respective pixels are identical with the pixel group tone value (equal to the tone value '97' in the illustrated example). The procedure converts the image data to density data of the respective size dots for determination of the on-off state of the respective size dots. The conversion of the image data to the density data is implemented by referring to the dot density conversion table of FIG. 22. Since all the pixels in the pixel group are assumed to have the identical tone value of image data, all the pixels have identical tone values of density data with regard to the respective size dots. In the illustrated example, all the pixels have the tone value '2' as the density data of the large-size dot, the tone value '95' as the density data of the medium-size dot, and the tone value '30' as the density data of the small-size dot.

As described above with reference to the flowchart of FIG. 21, the procedure sequentially compares the density data of the large-size dot, the intermediate data of the medium-size dot, and the intermediate data of the small-size dot in each pixel of the pixel group with the corresponding threshold value in the dither matrix. The on-off state of the respective size dots in the pixel is determined, based on the results of the comparison. The threshold values in the dither matrix used for the comparison are those set in a pixel group of the dither matrix corresponding to the object pixel group. In the illustrated example of FIG. 23, the object pixel group is on the upper left corner of the image, so that the threshold values used for the comparison are those set in an upper left pixel group of the dither matrix.

Among the eight pixels included in the object pixel group, any pixel having the threshold value of not greater than the density data of the large-size dot is determined as an on-pixel of the large-size dot. In the illustrated example, the density data of the large-size dot is equal to the tone value '2'. Only one pixel having the threshold value '1' satisfies this condition and is determined as the on-pixel of the large-size dot. In the illustration of FIG. 23, the on-pixel of the large-size dot is shown by a rectangle filled with fine slant lines. Any pixel having the threshold value of greater than the density data '2' of the large-size dot but of not greater than the intermediate data '97' of the medium-size dot as the sum of the density data of the large-size dot and the density data of the medium-size dot is determined as an on-pixel of the medium-size dot. Two pixels respectively having the threshold value '42' and the threshold value '58' satisfy this condition and are determined as the on-pixels of the medium-size dot. In the illustration of FIG. 23, the on-pixels of the medium-size dot are shown by rectangles filled with slant lines. Any pixel having the threshold value of greater than the intermediate data '97' of the medium-size dot but of not greater than the intermediate data '127' of the small-size dot as the sum of the intermediate data of the medium-size dot and the density data of the small-size dot is determined as an on-pixel of the small-size dot. Only one pixel having the threshold value '109' satisfies this condition and is determined as the on-pixel of the small-size dot. In the illustration of FIG. 23, the on-pixel of the small-size dot is shown by a rectangle filled with rough slant lines. Creation of one large-size dot, two medium-size dots, and one small-size dot is accordingly specified for the pixel group having the pixel group tone value '97'.

Allocation of a significantly different pixel group tone value to the pixel group causes specification of different numbers of the large-size dots, the medium-size dots, and the small-size dots to be created in the pixel group. The numbers of the large-size dots, the medium-size dots, and the small-size dots to be created in the pixel group are varied stepwise with a variation in pixel group tone value from 0 to 255. A different classification number of the pixel group gives different setting of threshold values in the dither matrix and thereby causes a different variation in numbers of the respective size dots. During a variation of the pixel group tone value from 0 to 255, specific pixel group tone values having changes in dot on-off state of the respective size dots are detected as threshold tone values with regard to each pixel group. The multivalue code table shown in FIG. 9 is set according to the threshold tone values detected for each pixel group.

Figure 24:
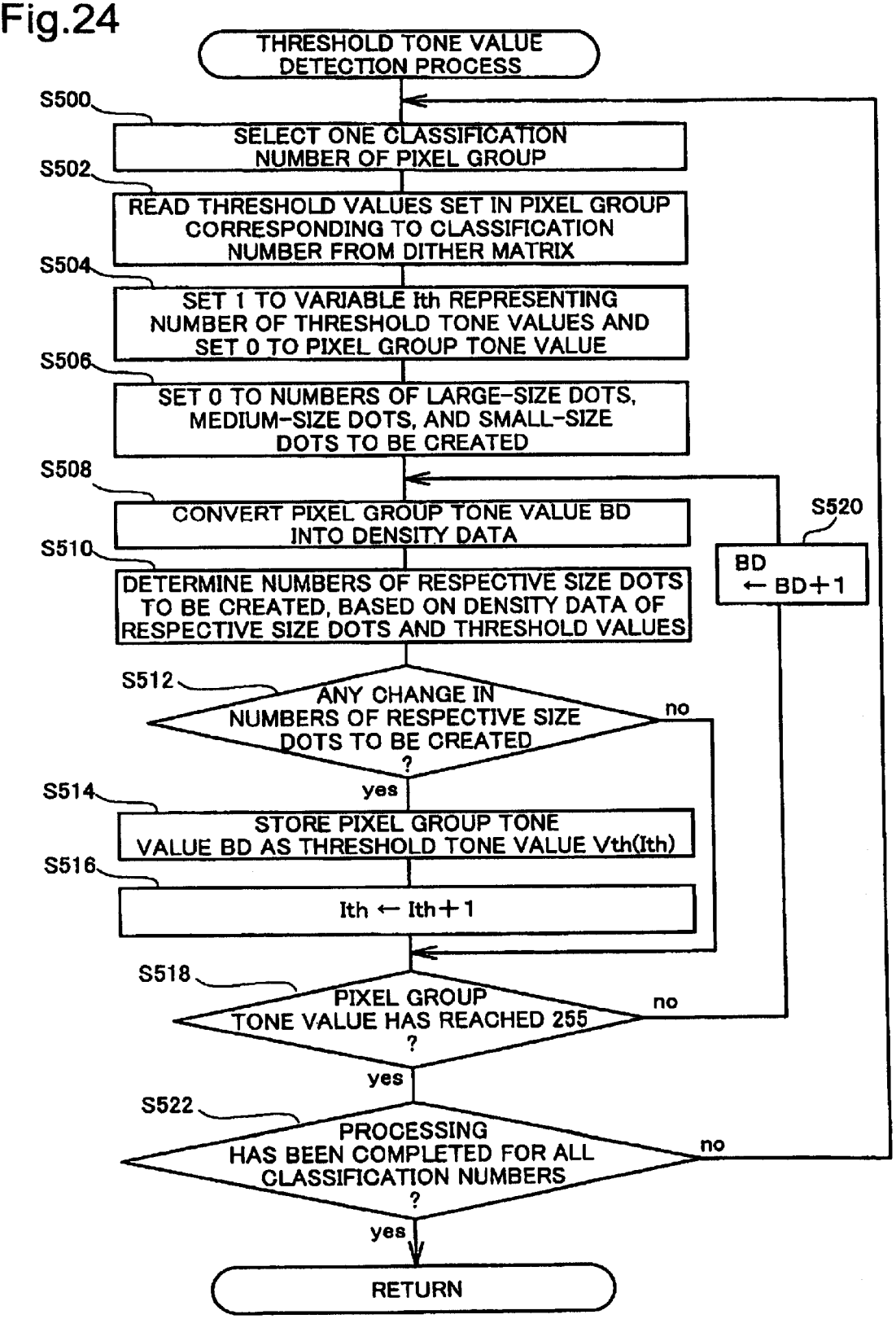
FIG. 24 is a flowchart showing a process of detecting threshold tone values of each pixel group.

FIG. 24 is a flowchart showing a process of detecting threshold tone values of each pixel group. The threshold tone value detection process first selects one classification number of pixel group as a processing target (step S500). For example, a classification number '1' is selected.

The threshold tone value detection process then reads threshold values set in a pixel group identified by the selected classification number from the dither matrix (step S502). For example, 8 threshold values set in a block position '1' (FIG. 18B) corresponding to the classification number '1' are read from the dither matrix of FIG. 16.

The threshold tone value detection process then sets a value '1' to a variable Ith representing the number of detected threshold tone values and a value '0' to a pixel group tone value BD (step S504), and sets a value '0' to all the numbers of the large-size dots, the medium-size dots, and the small-size dots to be created (step S506).

The threshold tone value detection process refers to the dot density conversion table of FIG. 22 to convert the pixel group tone value to the density data of the large-size dot, the medium-size dot, and the small-size dot (step S508) and specifies the numbers of the large-size dots, the medium-size dots, and the small-size dots to be created, based on the density data and the threshold values (step S510). As described previously with reference to FIGS. 21 and 23, the number of threshold values of not greater than the density data of the large-size dot is specified as the number of the large-size dots to be created. The number of threshold values of greater than the density data of the large-size dot but of not greater than the intermediate data of the medium-size dot is specified as the number of the medium-size dots to be created. The number of threshold values of greater than the intermediate data of the medium-size dot but of not greater than the intermediate data of the small-size dot is specified as the number of the small-size dots to be created.

It is then determined whether the specified numbers of the respective size dots has any change from the previous settings (step S512). When there is any change (step S512: Yes), the threshold tone value detection process stores the current setting of the pixel group tone value BD as a threshold tone value Vth(Ith) (step S514) and increments the variable Ith representing the number of threshold tone values by '1' (step S516). When there is no change (step S512: No), on the other hand, the threshold tone value detection process skips the steps of storing the threshold tone value Vth(Ith) and incrementing the variable Ith.

It is subsequently determined whether the pixel group tone value BD has reached the maximum tone value '255' (step S518). When the pixel group tone value BD has not yet reached the tone value '255' (step S518: No), the threshold tone value detection process increments the pixel group tone value BD by '1' (step S520) and returns to step S508 to convert the incremented pixel group tone value BD to density data and executes the subsequent series of processing. When there is any change in numbers of the respective size dots (step S512: Yes), the threshold tone value detection process stores the current setting of the pixel group tone value BD as another threshold tone value Vth(Ith) (step S514) and increments the variable Ith representing the number of threshold tone values by '1' (step S516). This series of processing is repeated until the pixel group tone value BD eventually reaches the tone value '255'. The pixel group tone value BD reaching the maximum tone value '255' (step S518: Yes) indicates detection of all the threshold tone values Vth with regard to the selected classification number.

The threshold tone value detection process then determines whether the processing has been completed for all the classification numbers (step S522). When there is any unprocessed classification number (step S522: No), the threshold tone value detection process returns to step S500 to select a next classification number as a new processing target and repeats the subsequent series of processing with regard to the next classification number. Upon detection of all the threshold tone values Vth with regard to all the classification numbers (step S522: Yes), the processing flow terminates the threshold tone value detection process of FIG. 24.

After detection of all the threshold tone values, some of the detected threshold tone values are skipped out for reduction of the total number of threshold tone values to a required number. As described previously with reference to FIGS. 9 and 10, the multivalue code table of this embodiment stores the settings of 16 different multivalue codes in the value range of 0 to 15 with regard to respective pixel groups. The presence of 16 different multivalue codes means the requirement of 15 threshold tone values. The number of the threshold tone values detected by the threshold tone value detection process of FIG. 24 is, however, greater than the required number '15' for practically all pixel groups. The total number of threshold tone values is accordingly reduced to 15 by skipping out some of the detected threshold tone values. The greater number of the detected threshold tone values than the required number '15' for practically all pixel groups is ascribed to the following reason.

As mentioned previously, the threshold tone values represent specific pixel group tone values having changes in dot on-off state of the respective size dots in one pixel group when the pixel group tone value varies from 0 to 255 in the course of determination of the dot on-off state in each pixel of the pixel group. The dot on-off state in each pixel group is determined according to the density data of the large-size dot, the medium-size dot, and the small-size dot (more precisely, the density data of the large-size dot, the intermediate data of the medium-size dot, and the intermediate data of the small-size dot) and the threshold values set at a specific position in the dither matrix corresponding to the position of the pixel group. Namely the number of detected threshold tone values depends on the density data of the large-size dot, the medium-size dot, and the small-size dot set corresponding to each pixel group tone value (the settings of the dot density conversion table shown in FIG. 22), the threshold values set in the dither matrix, and the number of pixels included in each pixel group. In the description hereof, it is assumed that the available dots are the three different size dots, the large-size dot, the medium-size dot, and the small-size dot.

The dither matrix is required to give favorable dot dispersibility for the high picture quality and has no significant difference in distribution of threshold values among pixel groups. The high picture quality is also achievable by smooth changes in occurrence frequencies of the respective size dots with an increase in tone value of image data. The density data of the respective available dots, for example, the large-size dot, the medium-size dot, and the small-size dot, set in the dot density conversion table accordingly have a suitable range for the high picture quality. The number of threshold tone values detected for each pixel group thus most strongly depends on the number of pixels included in each pixel group. For example, when the available dots are the large-size dot, the medium-size dot, and the small-size dot and each pixel group consists of 8 pixels, the number of the detected threshold tone values is in a range of 17 to 23 with regard to practically all pixel groups. The skip-out of some of the detected threshold tone values reduces the total number of threshold tone values to the required number '15' and accordingly restricts the multivalue codes to 16 different values in the range of 0 to 15. The presence of 17 to 23 threshold tone values gives 18 to 24 different multivalue codes and requires 5-bit data for expression of these multivalue codes. The restricted number of the threshold tone values to or below 15, on the other hand, gives at most 16 different multivalue codes and requires 4-bit data for expression of these multivalue codes.

FIG. 25 shows an example of skipping out some of detected threshold tone values for reduction of the total number of threshold tone values to a required number. The left half of FIG. 25 shows threshold tone values detected by the threshold tone value detection process of FIG. 24. In the illustrated example of FIG. 25, 18 threshold tone values Vth have been detected with regard to one pixel group. These 18 threshold tone values Vth divide the pixel group tone values varying in the tone value range of 0 to 255 into 19 tone areas. The multivalue coding of these pixel group tone values gives 19 different multivalue codes. The total number of threshold tone values Vth is reduced to the required number '15' by skipping out threshold tone values highlighted by slant lines.

The skip-out of some of the threshold tone values reduces the total number of different multivalue codes. The reduced number of multivalue codes may, however, undesirably lower the resolution of tone expression and the picture quality of a resulting printed image. A preferable procedure thus skips out every other threshold tone values detected in a high tone area, because of the following reason. As is empirically known in the art, the insufficient resolution of tone expression in a low tone area with small-size dots sparsely created remarkably deteriorates the picture quality, while the insufficient resolution of tone expression in a high tone area with large-size dots densely created does not significantly affect the picture quality. The skip-out of every other or more discrete threshold tone values, instead of sequential threshold tone values, effectively prevents the concentrated reduction of the resolution in a specific tone area and relieves the possible influence on the picture quality. The technique of skipping out every other threshold tone values detected in the high tone area thus minimizes the potential adverse effects on the picture quality.

In the illustrated example of FIG. 25, 18 threshold tone values have been detected and three threshold tone value should be skipped out. The concrete procedure skips out every other threshold tone values detected in the high tone area, that is, the three threshold tone values highlighted with slant lines and accordingly reduces the total number of threshold tone values to 15. The right half of FIG. 25 shows the remaining threshold tone values after the skip-out of the three threshold tone values. Such reduction enables division of the pixel group tone values in the tone value range of 0 to 255 into 16 tone areas and accordingly restricts the number of different multivalue codes to 16.

The multivalue code table of the embodiment shown in FIG. 9 is set according to the remaining threshold tone values. In the illustrated example of FIG. 25, a multivalue code '0' is related to pixel group tone values of smaller than a first threshold tone value Vth(1)=12. A multivalue code '1' is related to pixel group tone values of not smaller than the first threshold tone value but of smaller than a second threshold tone value Vth(2)=31. A multivalue code '2' is related to pixel group tone values of not smaller than the second threshold tone value but of smaller than a third threshold tone value Vth(3)=35. In this manner, one multivalue code is related to each tone area defined by a pair of adjoining threshold tone values. As mentioned above with reference to FIG. 25, the total number of threshold tone values is reduced to 15 with regard to each pixel group, so that the pixel group tone values in each pixel group are divided into 16 tone areas. Correlation of the multivalue codes 0 to 15 to the 16 tone areas gives the setting of the multivalue code shown in FIG. 9.

The above procedure simply skips out some of the detected threshold tone values to eliminate the extra number of threshold tone values and reduce the total number of threshold tone values to the required number but does not adjust the remaining threshold tone values. One modified procedure may additionally adjust the remaining threshold tone values to have appropriate tone differences in at least a tone area with the skip-out threshold tone values.

In the illustrated example of FIG. 25, the skip-out of three threshold tone values 190, 203, and 225 gives a tone difference of 19 between remaining threshold tone values 179 and 198, a tone difference of 10 between remaining threshold tone values 198 and 208, a tone difference of 29 between remaining threshold tone values 208 and 237, and a tone difference of 18 in a range over 237. As mentioned above, the insufficient resolution of tone expression in the low tone area remarkably deteriorates the picture quality, while the insufficient resolution of tone expression in the high tone area does not significantly affect the picture quality. Setting the larger tone difference between the remaining threshold tone values after the skip-out in the higher tone area is expected to minimize the potential adverse effects on the picture quality due to the skip-out of the extra number of threshold tone values. From this point of view, the tone differences after the skip-out shown in FIG. 25 do not show an adequate distribution. The preferable procedure thus adjusts the remaining threshold tone values after the skip-out to have appropriate tone differences.

FIG. 26 shows adjustment of the remaining threshold tone values after the skip-out of FIG. 25. The left half of FIG. 26 shows the remaining threshold tone values after the skip-out and tone differences between adjoining threshold tone values. The right half of FIG. 26 shows the threshold tone values after the adjustment and adjusted tone differences between adjoining threshold tone values. Adjustment of the remaining threshold tone values to have a larger tone difference in the higher tone area ensures a high-quality printed image.

The above description regards the process of skipping out the extra number of threshold tone values with regard to a pixel group consisting of 8 pixels. This technique is applicable to skip out any extra number of threshold tone values with regard to a pixel group including a different number of pixels. Application of this technique to a pixel group consisting of 16 pixels is described as one modified example As mentioned previously, the number of threshold tone values detected in one pixel group strongly depends on the number of pixels included in the pixel group. The number of threshold tone values detected with regard to a pixel group consisting of 16 pixels is in a range of 34 to 47, which is almost double the number of threshold tone values detected with regard to a pixel group consisting of 8 pixels. With regard to a pixel group consisting of 16 pixels, the procedure skips out some of the detected threshold tone values to reduce the total number of threshold tone values to or below 31. The presence of 34 to 47 threshold tone values gives 35 to 48 different multivalue codes and requires 6-bit data for expression of these multivalue codes. The restricted number of the threshold tone values to or below 31, on the other hand, gives at most 32 different multivalue codes and requires 5-bit data for expression of these multivalue codes.

Figure 27:
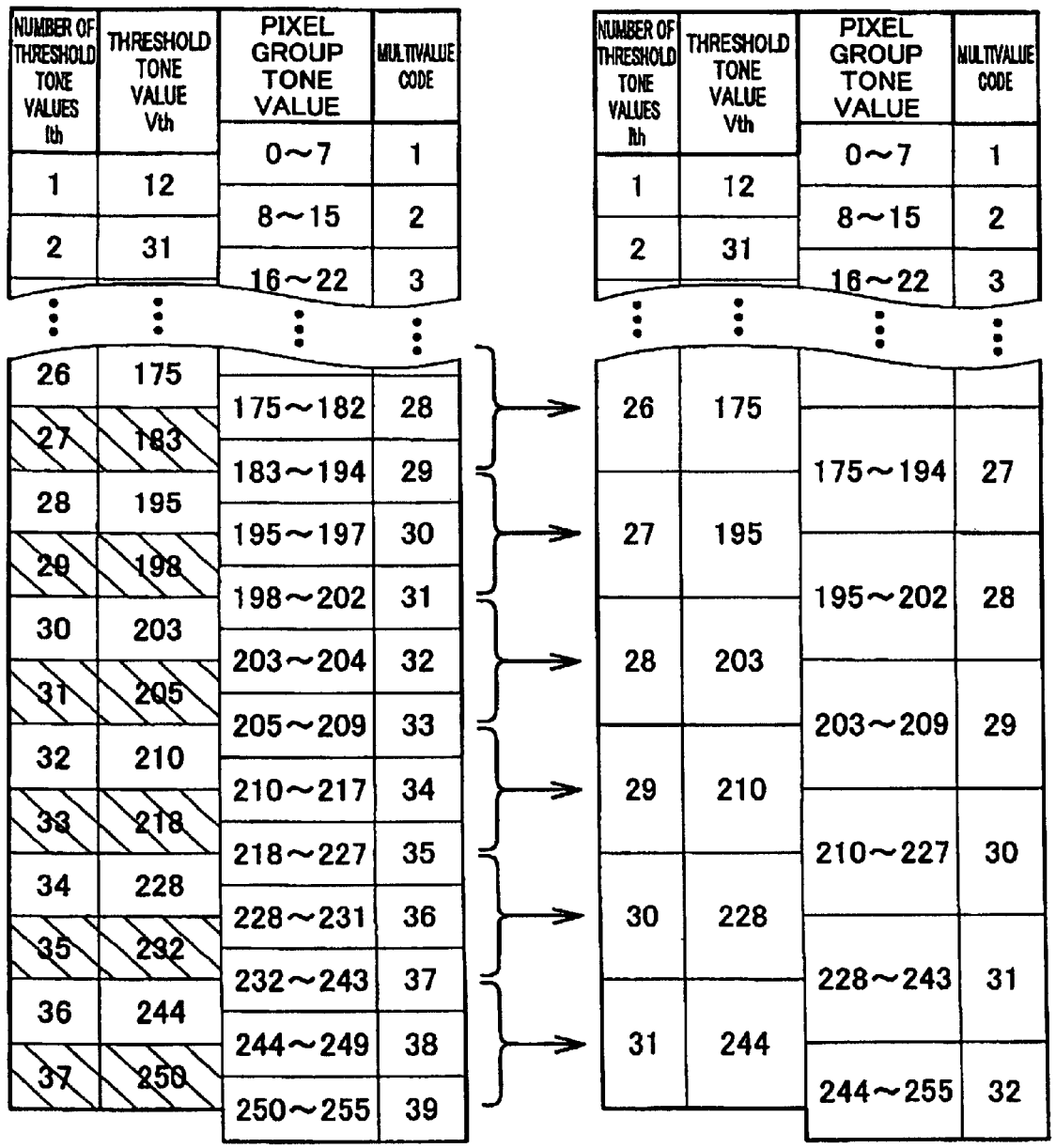
FIG. 27 shows a process of skipping out some of threshold tone values with regard to one pixel group consisting of 16 pixels.

FIG. 27 shows a process of skipping out some of threshold tone values with regard to one pixel group consisting of 16 pixels. The left half of FIG. 27 shows threshold tone values detected by the threshold tone value detection process of FIG. 24 with regard to a pixel group consisting of 16 pixels. In the illustrate example of FIG. 27, 37 threshold tone values Vth have been detected with regard to the pixel group. These 37 threshold tone values Vth divide the pixel group tone values varying in the tone value range of 0 to 255 into 38 tone areas. The multivalue coding of these pixel group tone values gives 38 different multivalue codes. The total number of threshold tone values Vth is reduced to the required number '31' by skipping out threshold tone values highlighted by slant lines. The right half of FIG. 27 shows the remaining threshold tone values after the skip-out. Such reduction restricts the number of different multivalue codes to 32. The 32 multivalue codes are expressible by 5-bit data. The technique skips out every other threshold tone values detected in the high tone area and thus minimizes the potential adverse effects on the picture quality. In this example, the modified procedure may additionally adjust the remaining threshold tone values after the skip-out to have appropriate tone differences.

Figure 28:
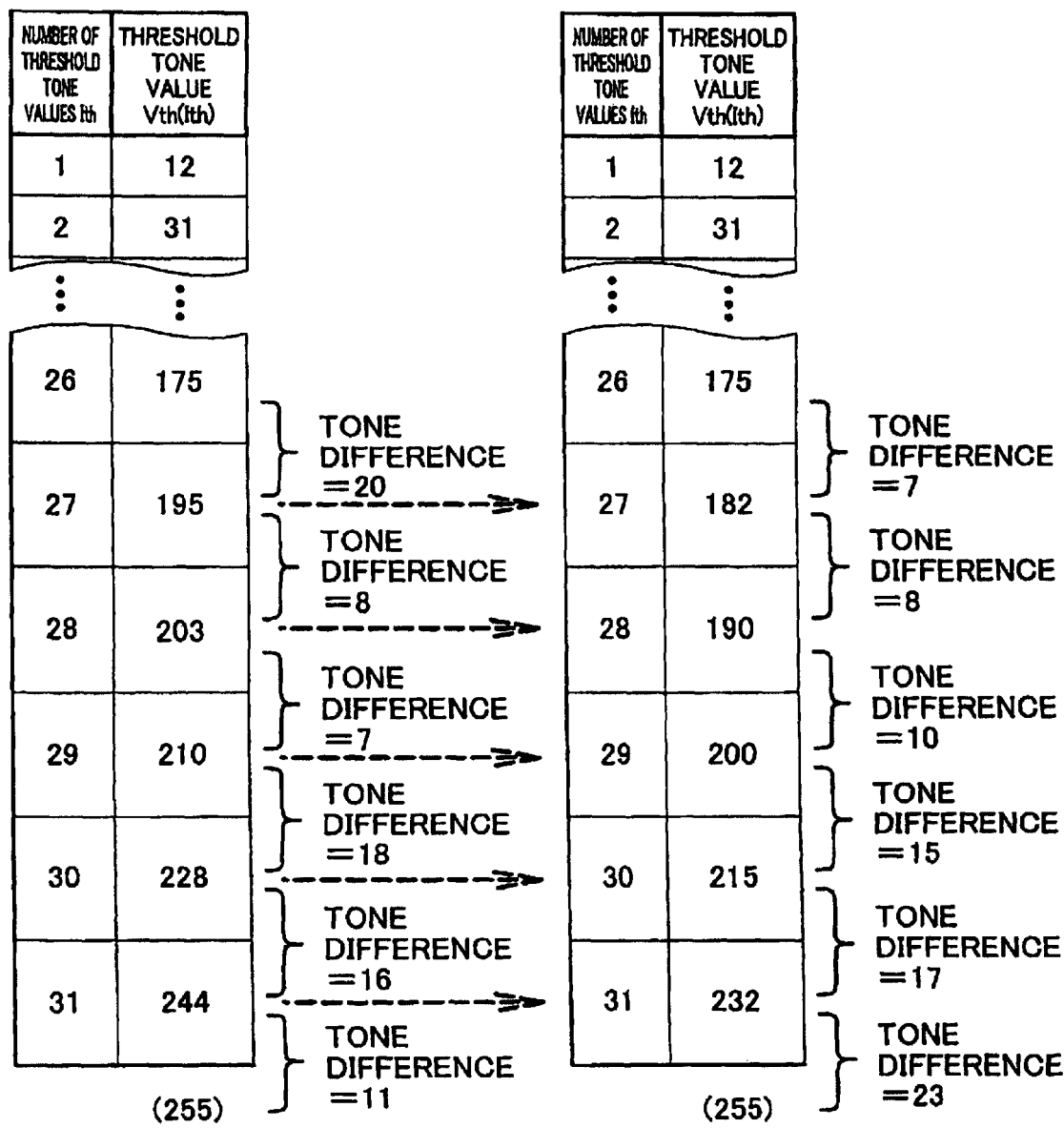
FIG. 28 shows adjustment of remaining threshold tone values after the skip-out with regard to a pixel group consisting of 16 pixels.

FIG. 28 shows adjustment of the remaining threshold tone values after the skip-out with regard to a pixel group consisting of 16 pixels. Like the example of FIG. 26 with regard to a pixel group consisting of 8 pixels, the left half of FIG. 28 shows the remaining threshold tone values after the skip-out and tone differences between adjoining threshold tone values. The right half of FIG. 28 shows the threshold tone values after the adjustment and adjusted tone differences between adjoining threshold tone values. Adjustment of the remaining threshold tone values to have a larger tone difference in the higher tone area ensures a high-quality printed image.

C-6. Method of Setting Conversion Table

The description regards the method of setting the conversion table shown in FIG. 12. The conversion table is referred to in the dot on-off state determination process of FIG. 11 for conversion of each combination of the multivalue code and the classification number to dot number data representing the number of dots to be created in each pixel group.

As clearly understood from the method of setting the multivalue code table described above with reference to FIGS. 24 and 25, each multivalue code set in the multivalue code table is specified according to the numbers of the large-size dots, the medium-size dots, and the small-size dots to be created in each pixel group. The multivalue code is not directly related to the numbers of the respective size dots to be created in each pixel group, but each combination of the multivalue code and the pixel group classification number is correlated to a combination of the numbers of the respective size dots to be created in each pixel group. The multivalue code indicates only the presence or the absence of any change in numbers of the large-size dots, the medium-size dots, and the small-size dots to be created in a pixel group with an increase in pixel group tone value from 0 to 255, but does not include information regarding a concrete variation in combination of the numbers of the respective size dots.

The classification number of the pixel group identifies each stepwise change of the multivalue code in the pixel group and, in combination with the multivalue code, specifies the combination of the numbers of the respective size dots. A combination of the numbers of respective size dots is determined as the basis of setting the multivalue code with regard to each classification number. Code data representing each combination of the numbers of the respective size dots is stored in relation to one multivalue code. The conversion table of FIG. 12 is set by repeating this series of processing with regard to all classification numbers.

Figure 29:
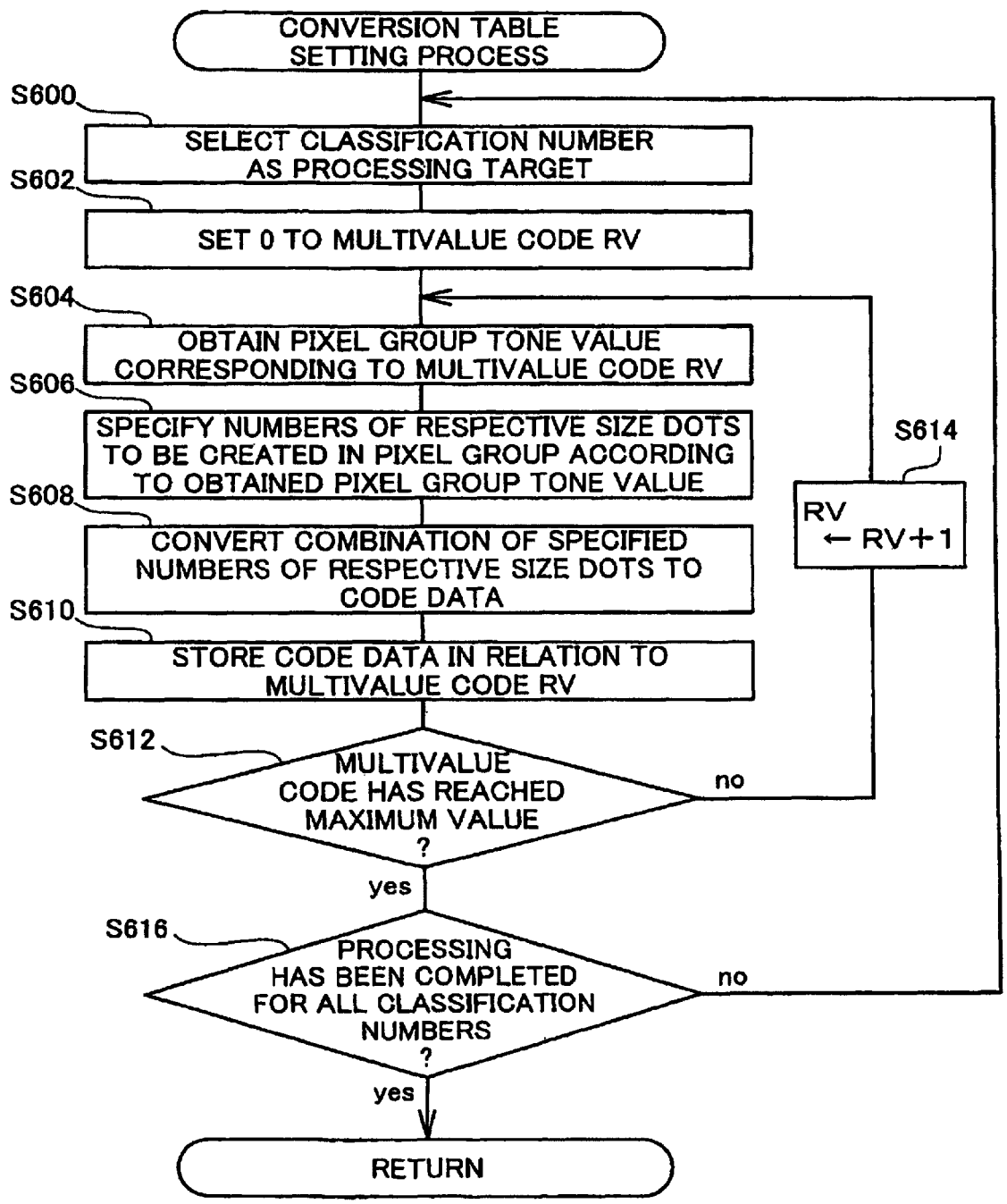
FIG. 29 is a flowchart showing a processing flow of setting a conversion table.

FIG. 29 is a flowchart showing a processing flow of setting the conversion table. The conversion table setting process first selects one classification number of an object pixel group as a processing target (step S600) and sets a value '0' to a multivalue code RV (step S602).

The conversion table setting process then selects one pixel group tone value among multiple pixel group tone values corresponding to the multivalue code RV (step S604). For example, when the multivalue code is equal to N, the procedure of step S604 refers to the multivalue code table shown in FIG. 9 and selects one pixel group tone value among multiple pixel group tone values corresponding to the multivalue code N. The conversion table setting process subsequently specifies the numbers of the large-size dots, the medium-size dots, and the small-size dots to be created in the object pixel group on the assumption that all the pixels included in the object pixel group have tone values equal to the obtained pixel group tone value (step S606). As described previously, the multivalue code table is set according to the numbers of the large-size dots, the medium-size dots, and the small-size dots to be created in one pixel group. Selection of any pixel group tone value among the multiple pixel group tone values corresponding to the multivalue code N gives an identical specification result regarding the numbers of the respective size dots to be created in the pixel group. In the high tone area with the skip-out of the extra threshold tone values, each selected pixel group tone value may give a different specification result regarding the numbers of the respective size dots to be crated in the pixel group. Even in this case, the procedure selects any arbitrary pixel group tone value among multiple pixel group tone values corresponding to the multivalue code and specifies the numbers of the respective size dots according to the selected pixel group tone value. The on-off state of the respective size dots in the pixel group may be determined according to the halftoning process described above with reference to FIG. 21.

The combination of the numbers of the respective size dots thus specified is converted to code data (step S608). The correlation map of FIG. 13 is referred to for conversion of the combination of the numbers of the respective size dots to the code data. The conversion table setting process stores the code data in relation to the multivalue code RV (step S610) and determines whether the multivalue code RV has reached the maximum value ('15' in this embodiment) (step S612).

When the multivalue code RV has not yet reached the maximum value (step S612: No), the conversion table setting process increments the multivalue code RV by '1' (step S614), returns to step S604 to select one pixel group tone value among multiple pixel group tone values corresponding to the incremented multivalue code RV, and repeats the subsequent series of processing. The multivalue code RV eventually reaches the maximum value (step S612: Yes) during repetition of this series of processing. This indicates setting of all the data in the conversion table with regard to the selected classification number.

The conversion table setting process then determines whether the processing has been completed for all the classification numbers (step S616). When there is any unprocessed classification number (step S616: No), the conversion table setting process returns to step S600 to select a next classification number as a new processing target and repeats the subsequent series of processing with regard to the next classification number. On completion of the processing for all the classification numbers (step S616: Yes), the processing flow completes storage of all the data in the conversion table and terminates the conversion table setting process of FIG. 29.

The color printer 200 of this embodiment stores in advance the conversion table in the internal ROM of the control circuit 260. The dot on-off state determination process of FIG. 11 refers to this conversion table to convert the multivalue code to dot number data.

The conversion table stores one dot number data corresponding to each combination of the pixel group classification number and the multivalue code. The less variety of the multivalue codes thus naturally reduces the data volume of the conversion table. As mentioned previously, the number of different multivalue codes available for each pixel group is restricted to or below a preset number ('16' in this embodiment). This arrangement desirably saves the memory capacity required for storage of the conversion table.

C-7. Method of Setting Priority Order Matrix

The description regards the method of setting the priority order matrix shown in FIG. 14. As mentioned previously, the priority order matrix specifies the order of dot creation with regard to respective pixels included in one pixel group. The dot on-off state determination process of FIG. 11 reads a priority order matrix corresponding to the selected pixel group and determines the on-pixels of the large-size dot, the medium-size dot, and the small-size dot in a priority order specified by the priority order matrix.

Like the multivalue code table described above, the priority order matrix of this embodiment is set based on the technique disclosed in Japanese Patent No. 3292104 (the evolutionary modification of the dither technique to enable determination of the dot on-off state in each pixel with regard to multiple different size dots). The multivalue code table setting process specifies the numbers of the large-size dots, the medium-size dots, and the small-size dots to be created in one pixel group on the assumption that all the pixels included in the pixel group have an identical value of the image data (identical pixel group tone value) and detects the presence or the absence of any change in numbers of the respective size dots during an increase in pixel group tone value from 0 to 255 to set a multivalue code of the pixel group. As shown in FIG. 12, the combination of the multivalue code and the classification number determines the numbers of the large-size dots, the medium-size dots, and the small-size dots to be created in the pixel group. The combination of the multivalue code and the classification number, however, does not give information on the positions of the on-pixels of the respective size dots in the pixel group. The priority order matrix stores this missing information on the positions of the on-pixels of the respective size dots in the pixel group. Application of the modified dither technique disclosed in Japanese Patent No. 3292104 to each pixel group determines not only the numbers of the respective size dots to be created in the pixel group but the positions of the on-pixels with regard to the respective size dots in the pixel group as described previously with reference to FIGS. 21 through 23. The procedure of this embodiment divides this modified dither technique into two information elements. The information on the numbers of the respective size dots to be created is specified by the multivalue code (more precisely, the combination of the multivalue code and the classification number), whereas the information on the positions of the on-pixels of the respective size dots is specified by the priority order matrix. The priority order matrix is set by a relatively simple process as described below.

Figure 30A:
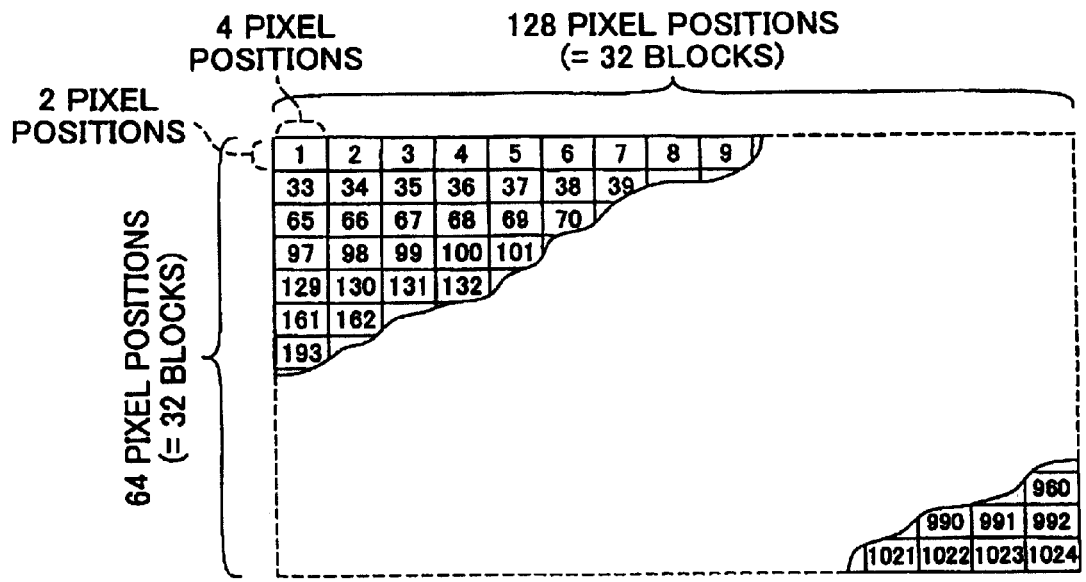
FIGS. 30A through 30C show a process of setting a priority order matrix.
Figure 30B:
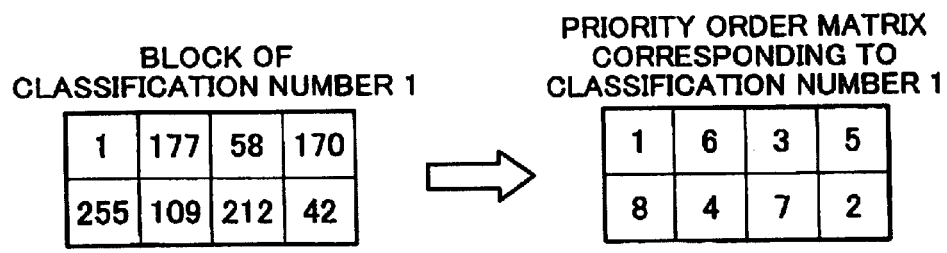
Figure 30C:
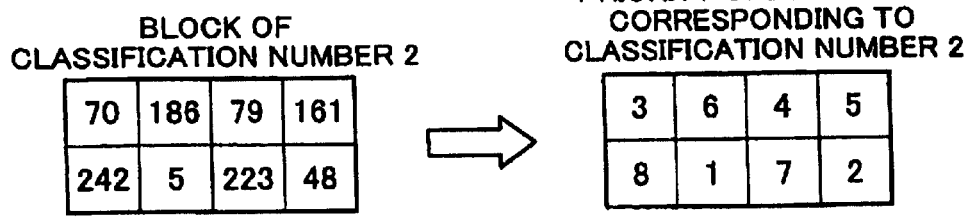

FIGS. 30A through 30C show a concrete process of setting the priority order matrix. The priority order matrix setting process first divides a dither matrix into multiple blocks where each block has an identical size with that of each pixel group and allocates serial numbers to the multiple blocks. As described above with reference to FIG. 18, the allocated serial numbers represent the classification numbers of pixel groups. FIG. 30A conceptually shows division of a dither matrix into multiple blocks. In the illustrated example, the dither matrix has the size of 128 pixels in the main scanning direction and 64 pixels in the sub-scanning direction (see FIG. 16), and each pixel group has the size of 4 pixels in the main scanning direction and 2 pixels in the sub-scanning direction. The dither matrix is accordingly divided into 1024 blocks, that is, 32 blocks in the main scanning direction and 32 blocks in the sub-scanning direction, with classification numbers of 1 to 1024 as shown in FIG. 30A.

After division of the dither matrix into multiple blocks, one priority order matrix is generated from each block. FIG. 30B shows a process of generating a priority order matrix corresponding to a classification number '1' as one example. The left half of FIG. 30B shows threshold values included in one block of the dither matrix having the classification number '1'. As described previously with reference to FIG. 23, pixels having the smaller threshold values are sequentially specified as dot-on pixels. A pixel having a smallest threshold value '1' is specified as a first dot-on pixel in the block of the classification number '1' shown in FIG. 30B. An ordinal number '1' is accordingly allocated to this pixel. A pixel having a second smallest threshold value '42' is then specified as a second dot-on pixel. An ordinal number '2' is accordingly allocated to this pixel. In this manner, ordinal numbers '1' to '8' are sequentially allocated to pixels having the smaller threshold values set in the block. This gives a priority order matrix corresponding to the classification number '1' as shown in the right half of FIG. 30B.

FIG. 30C shows a process of generating a priority order matrix corresponding to a classification number '2' by sequentially allocating the ordinal numbers '1' to '8' to pixels having the smaller threshold values in a block of the classification number '2'. In this manner, priority order matrixes corresponding to the classification numbers '1' to '1024' are generated with regard to the respective blocks of the classification numbers '1' to '1024' shown in FIG. 30A.

The color printer 200 of this embodiment stores in advance the priority order matrixes in relation to the respective pixel group classification numbers in the internal ROM of the control circuit 260. The dot on-off state determination process of FIG. 11 selectively reads a priority order matrix corresponding to the pixel group classification number from the stored priority order matrixes.

C-8. Principle of Adequately Determining Dot On-Off State Based on Multivalue Code As described above, the image printing process of this embodiment collects a preset number of multiple pixels to one pixel group and refers to the multivalue code table shown in FIG. 9 to specify a multivalue code of each pixel group. The image printing process then sequentially refers to the conversion table shown in FIG. 12 and the priority order matrix shown in FIG. 14 to determine the positions of the on-pixels in each pixel group with regard to the resize size dots, based on the specified multivalue code of the pixel group. The determination of the positions of the on-pixels of the respective size dots by this procedure ensures output of a high-quality image with preferable dot dispersibility. The image printing process of this embodiment collectively processes each pixel group including a relatively small number of pixels (for example, 8 pixels) and still attains favorable dot dispersibility, which is equivalent to the dot dispersibility attained by application of a large-scale dither matrix of over 1000 pixels, for example, a blue noise mask or a green noise mask. The principle of attaining such good dot dispersibility is described below.

Application of the modified dither technique disclosed in Japanese Patent No. 3292104 converts image data of each pixel to the density data of the large-size dot, the intermediate data of the medium-size dot, and the intermediate data of the small-size dot and sequentially compares these density data and intermediate data with a threshold value set at the corresponding pixel position in the dither matrix to determine the on-off state of the large-size dot, the medium-size dot, and the small-size dot in the pixel as described previously with reference to FIGS. 21 and 22. Application of a dither matrix having good dispersibility, for example, a blue noise mask or a green noise mask, ensures a high-quality printed image with favorable dot dispersibility.

Adjacent pixels generally tend to have similar or identical tone values of image data. The recent requirement for the higher picture quality makes a significant increase in resolution of image data. The higher resolution of image data results in the more prominent tendency of allocation of similar or identical tone values to adjacent pixels. Some variation in picture quality accordingly arises among printed images obtained by the procedure of collecting a preset number of multiple pixels to one pixel group and determining the on-off state of the large-size dot, the medium-size dot, and the small-size dot on the assumption that all pixels included in the pixel group have an identical value of image data as described previously with reference to FIG. 23.

The multivalue code generation process of the embodiment converts the pixel group tone value of a pixel group to a multivalue code depending on the classification number of the pixel group as described previously. The combination of the generated multivalue code and the classification number of the pixel group then gives dot number data representing the numbers of the respective size dots to be created in the pixel group. With regard to the pixel group shown in FIG. 23, the combination of the multivalue code and the classification number gives dot number data representing creation of one large-size dot, two medium-size dots, and one small-size dot.

Figure 31:
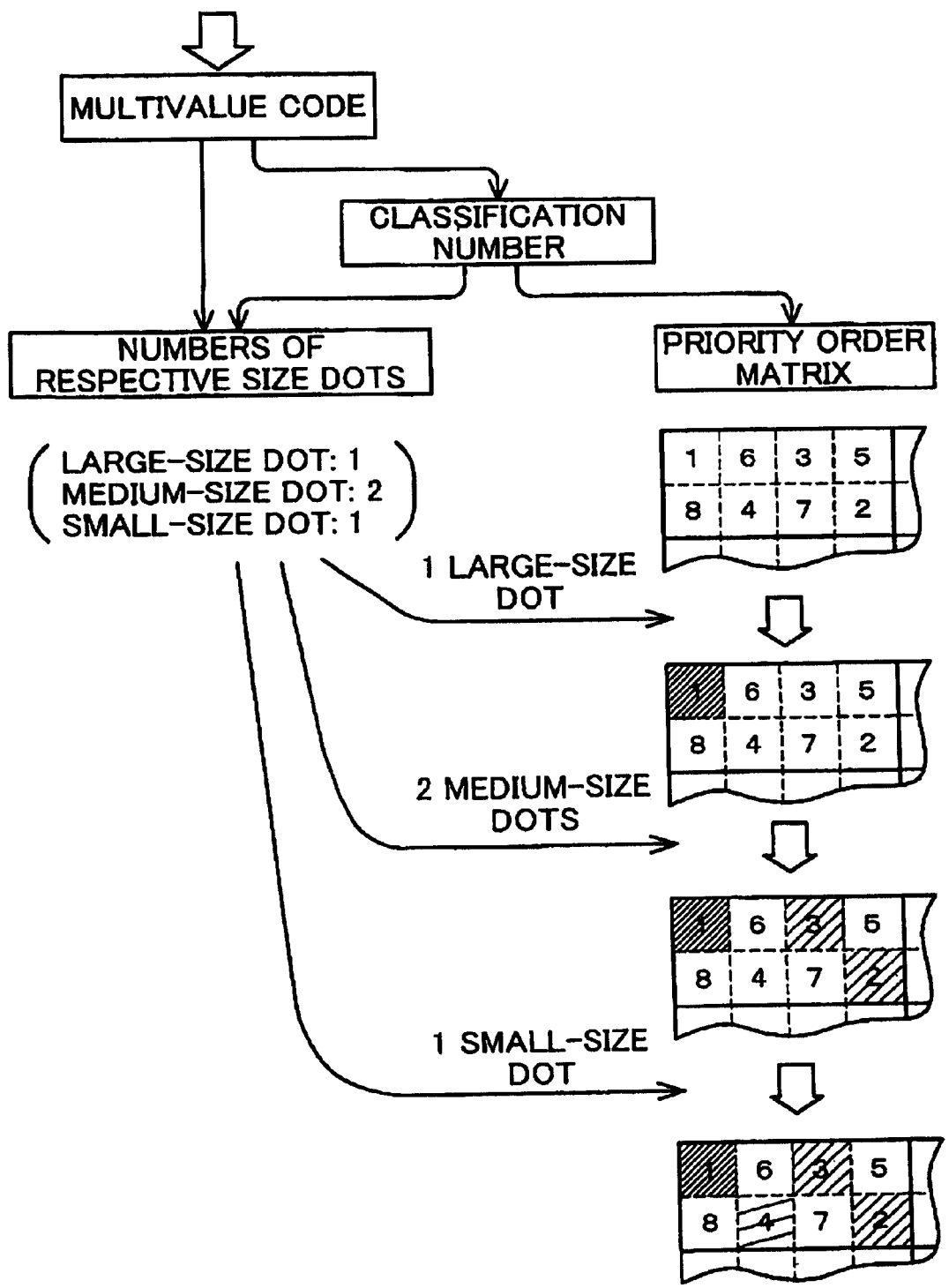
FIG. 31 conceptually shows a general processing flow of dot on-off state determination of the embodiment to determine the on-off state of the large-size dot, the medium-size dot, and the small-size dot in respective pixels of a pixel group based on a received multivalue code.

The dot on-off state determination process of the embodiment receives a multivalue code and determines the on-off state of the large-size dot, the medium-size dot, and the small-size dot in each pixel included in the pixel group. FIG. 31 conceptually shows a general processing flow of dot on-off state determination of the embodiment to receive a multivalue code and determine the on-off state of the large-size dot, the medium-size dot, and the small-size dot in the respective pixels of the pixel group. The processing flow receives a multivalue code of one pixel group, specifies a classification number of the pixel group, and determines the numbers of the large-size dots, the medium-size dots, and the small-size dots to be created in the pixel group according to the combination of the received multivalue code and the specified classification number. The processing flow also selectively reads a priority order matrix corresponding to the classification number among the stored priority order matrixes. The concrete procedure of specifying the classification number will be described later.

In the illustrated example of FIG. 23, the pixel group is located on the upper left corner of the image. The classification number of the pixel group is accordingly specified as '1'. The combination of the multivalue code of this pixel group and the specified classification number gives dot number data representing creation of one large-size dot, two medium-size dots, and one small-size dot. The positions of the on-pixels of the respective size dots in the pixel group are determined by referring to the priority order matrix corresponding to the classification number '1'. The priority order matrix is generated from a relevant part of the dither matrix used for determination of the dot on-off state in the respective pixels of the pixel group shown in FIG. 23.

The positions of the on-pixels of the large-size dot, the medium-size dot, and the small-size dot in the pixel group are determined according to the numbers of the respective size dots and the priority order matrix. The concrete procedure of determining the positions of the on-pixels of the respective size dots is described previously with reference to FIG. 15. In the illustrated example of FIG. 31, the large-size dot is to be created in a pixel having an ordinal number '1', the medium-size dot is to be created in pixels having ordinal numbers '2' and '3', and the small-size dot is to be created in a pixel having an ordinal number '4'. In the illustration of FIG. 31, the on-pixel of the large-size dot, the on-pixels of the medium-size dot, and the on-pixel of the small-size dot are filled respectively with fine slant lines, with slant lines, and with rough slant lines in the same manner as the illustration of FIG. 15. The resulting dot dispersion is completely identical with the dot dispersion of FIG. 23 obtained by the modified dither technique of determining the dot on-off state in the respective pixels.

The dot on-off state determination process of the embodiment receives only a multivalue code of a pixel group depending upon the classification number and determines the dot on-off state in the pixel group as described above. This procedure gives the identical dot dispersion result with the dot distribution obtained by the modified dither technique disclosed in Japanese Patent No. 3292104 to refer to the dither matrix and determine the on-off state of the large-size dot, the medium-size dot, and the small-size dot in the respective pixels. The procedure of this embodiment accordingly ensures a high-quality printed image with favorable dot dispersibility.

The multivalue code table referred to for generation of the multivalue code is set on the basis of the dither matrix as described previously with reference to FIGS. 24 and 25. The conversion table and the priority order matrix referred to in the process of determining the dot on-off state according to the multivalue code are similarly set on the basis of the dither matrix (see FIGS. 29 and 30). Application of a blue noise mask or a green noise mask for the dither matrix as the basis of setting these tables ensures a high-quality printed image.

C-9. Method of Specifying Classification Number According to Position of Pixel Group The following briefly describes the method of specifying the classification number of a pixel group according to the position of the pixel group on an image.

FIGS. 32A through 32C show a method of specifying the classification number of a pixel group according to the position of the pixel group on an image. In this illustrated example, an object pixel group is located at a position of an i-th pixel group in the main scanning direction and a j-th pixel group in the sub-scanning direction from the upper left corner of the image as shown in FIG. 32A. The position of this object pixel group is defined by coordinates (i,j). The size of the dither matrix is generally far smaller than the size of the image. The same dither matrix is repeatedly applied on the image with successive shifts in the main scanning direction as mentioned previously with reference to FIG. 19B.

The dither matrix has 32 blocks in both the main scanning direction and the sub-scanning direction (see FIG. 18B). A block of an I-th row and a J-th column in the dither matrix corresponds to the position of the object pixel group. The values I and J are expressed as:

$$I = i - \text{int}(j/32) \times 32$$

$$J = j - \text{int}(j/32) \times 32$$

where 'int' denotes an operator of dropping the figures after the decimal point and rounding down the value to the nearest integer. Substitution of the coordinates (i,j) of the object pixel group into the above equations determines the values I and J. The object pixel group is located at the position of the I-th row and the J-th column in the applied dither matrix and accordingly has a classification number expressed as:

$$I + (J-1) \times 32 \tag{2}$$

The values I and J defining the position of the object pixel group in the dither matrix are extremely easily obtainable without such calculation but by simple extraction of data of preset bits from binary data of the coordinate values 'i' and 'j'. FIG. 33 shows a concrete procedure of specifying the position of the object pixel group in the dither matrix according to binary data of the coordinate values 'i' and 'j' of the object pixel group. FIG. 33(a) conceptually shows 10-bit binary data representing the coordinate value 'i'. For the purpose of bit discrimination, serial numbers of 1 to 10 are sequentially allocated to the upper-most bit to the lower-most bit in FIG. 33(a).

The procedure of specifying the value I representing the position of the object pixel group in the dither matrix first calculates int(i/32), which is equivalent to a rightward shift of the binary data of the coordinate value 'i' by 5 bits (see FIG. 33(b)). The procedure then calculates int(i/32)×32, which is equivalent to a leftward shift of binary data of int(i/32) by 5 bits (see FIG. 33(c)). The procedure subsequently subtracts the obtained value int(i/32)×32 from the coordinate value 'i' to determine the value I. This series of operations is equivalent to simple extraction of the lower 5 bits from the binary data of the coordinate value 'i'. The value I is thus extremely easily obtainable from the binary data of the coordinate value 'i'. Similarly simple extraction of the lower 5 bits from binary data of the coordinate value 'j' determines the value J. The classification number is readily computable from the values I and J according to Equation (2) given above.

The image printing process of this embodiment performs the multivalue code generation process (step S106 in FIG. 6) and the dot on-off state determination process (step S108 in FIG. 6) described above in detail. The multivalue code generation process of the embodiment collects a preset number of multiple pixels to one pixel group and generates a multivalue code from a pixel group tone value of the pixel group. Simple reference to the multivalue code table enables extremely high-speed generation of the multivalue code.

The multivalue code depends on the classification number of the pixel group and has an extremely smaller data volume than the data volume of the conventional dot state data representing the dot on-off state of each pixel. The multivalue code table of the embodiment restricts the variety of multivalue codes to or below a preset number. This arrangement further reduces the required data volume of the multivalue code and thereby ensures extremely high-speed data output from the computer 100 to the color printer 200. The multivalue code generation process of the embodiment attains high-speed generation and output of the multivalue codes and enables quick image printing.

The multivalue code generation process generates the multivalue code by simply referring to the multivalue code table. The classification number and the pixel group tone value required for the reference to the multivalue code table are obtainable by extremely simple operations. These operations do not require the high throughput of the computer 100 but are performed at a sufficiently practical speed by even a device of a relatively low throughput.

The main part of the multivalue code generation process is simple reference to the relevant table. The multivalue code generation process may thus be actualized by a hardware configuration, that is, by an IC chip with a built-in exclusive logic circuit, instead of the software configuration executed by the CPU. The hardware configuration enables extremely high-speed generation of the multivalue code. Even in a simple system of direct connection the color printer 200 with an imaging device generating image data, for example, the digital camera 120, the multivalue code generation process is sufficiently executable by the digital camera 120 or the color printer 200. This arrangement enables quicker image printing.

The dot on-off state determination process executed in the image printing process of the embodiment receives the generated multivalue code of a pixel group and determines the dot on-off state of the respective pixels included in the pixel group. The received multivalue code is converted to a combination of the numbers of the respective size dots by referring to the conversion table. The positions of the on-pixels of the respective size dots are then determined by referring to the priority order matrix. The dot on-off state determination process of the embodiment quickly determines the positions of the on-pixels of the respective size dots by simple reference to the conversion table and the priority order matrix.

In general, the greater variety of available dots increasingly complicates the determination of the positions of the on-pixels of the respective dots. The dot on-off state determination process of the embodiment, on the other hand, basically adopts the same procedure of referring to the conversion table and the priority order table and does not significantly complicate the processing with the increased variety of available dots. The dot on-off state determination process of the embodiment thus enables simple and quick determination. Like the multivalue code generation process, the main part of dot on-off state determination process is simple reference to the relevant tables. The dot on-off state determination process may thus be actualized by a hardware configuration, that is, by an IC chip with a built-in exclusive logic circuit, instead of the software configuration executed by the CPU. The hardware configuration enables extremely high-speed determination of the dot on-off state of the respective pixels.

D. Modifications

The image printing process of the embodiment may be modified in various ways. Some examples of possible modification are briefly described below.

D-1. First Modified Example

The multivalue code generation process of the embodiment refers to the multivalue code table, which stores multivalue codes corresponding to pixel group tone values in the tone value range of 0 to 255. The multivalue code increases stepwise with an increase in pixel group tone value. The multivalue code is thus specifiable corresponding to the pixel group tone value by storing only pixel group tone values (threshold tone values) having respective stepwise changes of the multivalue code. An image printing process of a first modified example executes a modified multivalue code generation process described below.

Figure 34:
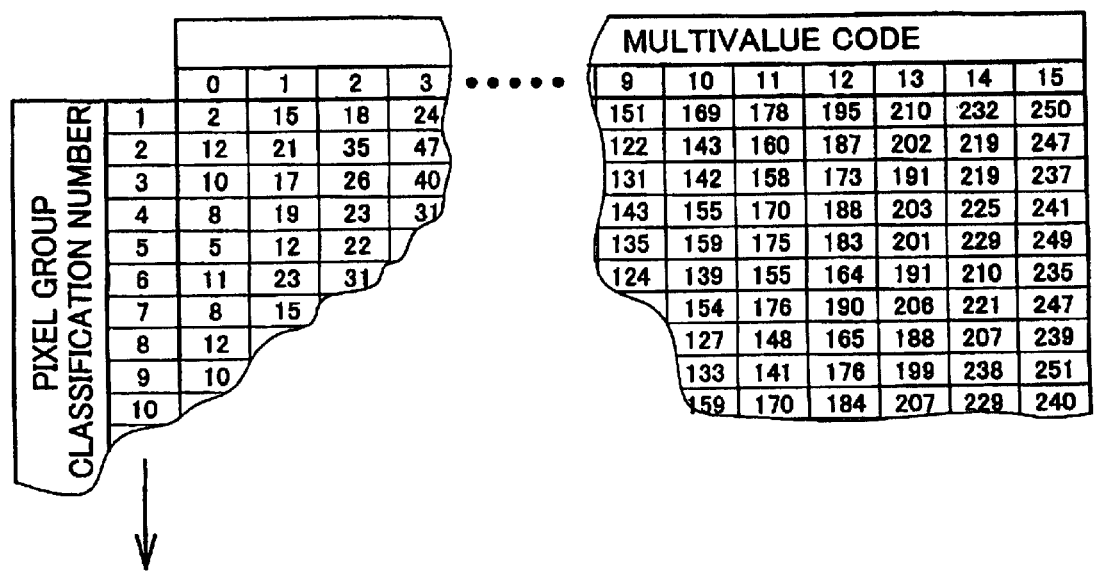
FIG. 34 conceptually shows a threshold value table referred to in a modified multivalue code generation process of a first modified example.

FIG. 34 conceptually shows a threshold value table referred to in the modified multivalue code generation process. The threshold value table stores multiple threshold tone values set corresponding to each classification number. Comparison of a pixel group tone value with the threshold tone values set in the threshold value table converts the pixel group tone value to a multivalue code. For example, with regard to a classification number '1', a multivalue code '0' is set corresponding to a threshold tone value '2'. In a pixel group with the classification number '1', pixel group tone values of smaller than the threshold tone value '2' are accordingly converted to the multivalue code '0'. A multivalue code '1' is set corresponding to a threshold tone value '15'. In the pixel group with the classification number '1', pixel group tone values of not smaller than the threshold tone value '2' and of smaller than the threshold tone value '15' are accordingly converted to the multivalue code '1'. Similarly multivalue codes '14' and '15' are set respectively corresponding to threshold tone values '240' and '250'. Pixel group tone values of not smaller than the threshold tone value '240' and of smaller than the threshold tone value '250' are converted to the multivalue code '14'. Pixel group tone values of not smaller than the threshold tone value '250' are converted to the multivalue code '15'.

In the threshold value table of FIG. 34, the threshold tone values are correlated to the multivalue codes with regard to each classification number. One modified structure of the threshold value table may not correlate the threshold tone values to the multivalue codes but may simply store a group of threshold tone values with regard to each classification number. In this modified structure, a pixel group tone value is converted to a multivalue code by counting the number of threshold tones values that are smaller than the pixel group tone value. For example, it is assumed that a pixel group having the classification number '1' has a pixel group tone value '20'. In the group of threshold tone values set for the classification number 1, there are three threshold tone values '2', '15', and '18' that are smaller than the pixel group tone value '20'. Namely the pixel group tone value '20' is converted to a multivalue code '3'.

The modified multivalue code generation process of the first modified example specifies a pixel group tone value and a classification number of each pixel group and refers to the threshold value table of FIG. 34 to generate a multivalue code of the pixel group. The threshold value table has a smaller data volume than the multivalue code table (see FIG. 9), which is referred to in the multivalue code generation process of the embodiment described previously. The modified multivalue code generation process of the first modified example thus desirably saves the memory capacity, compared with the multivalue code generation process of the embodiment. The advantage of the multivalue code generation process of the embodiment is, on the other hand, quicker specification of a multivalue code corresponding to a classification number and a pixel group tone value by simple reference to the multivalue code table. The modified multivalue code generation process requires comparison of a pixel group tone value with the threshold tone values set in the threshold value table to convert the pixel group tone value to a multivalue code, while the multivalue code generation process of the embodiment does not require such comparison.

D-2. Second Modified Example

The image printing process of the embodiment is described with regard to the color printer 200 that is capable of creating the three variable size dots, the large-size dot, the medium-size dot, and the small-size dot. The technique of the invention is, however, not restricted to this color printer 200 but is applicable to variety of other printers, for example, a printer that is capable of creating two variable size dots, large-size dot and small-size dot, a printer that is capable of creating two different dots having different ink densities (high-density dot and low-density dot), and a printer that is capable of creating four or more different types of dots. In an image printing process of a second modified example described below, the technique of the invention is applied to the printer that is capable of creating two variable size dots, the large-size dot and the small-size dot.

The image printing process of the embodiment described above is on the assumption that each pixel group consists of 8 pixels and that each pixel takes one of the four different dot states, that is, creation of the large-size dot, creation of the medium-size dot, creation of the small-size dot, and creation of no dot. The number of threshold tone values detected by the threshold tone value detection method of FIG. 24 is in the range of 17 to 23 with regard to practically all pixel groups. Each threshold tone value represents a pixel group tone value having a change in dot on-off state in a pixel group. The less variety of available dots naturally reduces the number of threshold tone values detected in each pixel group and accordingly decreases the variety of multivalue codes. The image printing process of the second modified example creates the two variable size dots, the large-size dot and the small-size dot. This gives the less variety of multivalue codes in each pixel group than the image printing process of the embodiment that creates the three variable size dots, the large-size dot, the medium-size dot, and the small-size dot. Further restriction of the variety of multivalue codes by an adequate procedure attains higher-speed image printing, while minimizing the potential deterioration of the picture quality. The image printing process of the second modified example adopts the adequate procedure of restricting the variety of multivalue codes as described later. As the basis of such restriction, a method of detecting threshold tone values in each pixel group is described briefly in the structure of creating the two variable size dots, the large-size dot and the small-size dot.

The detection of threshold tone values in the structure of creating the large-size dot and the small-size dot is basically equivalent to the detection of threshold tone values in the structure of creating the large-size dot, the medium-size dot, and the small-size dot described previously with reference to FIG. 24. The threshold tone value detection process converts a pixel group tone value of a pixel group to density data of the large-size dot and the small-size dot on the assumption that all pixels in the pixel group have tone values identical with the pixel group tone value. A dot density conversion table is referred to for the conversion of the pixel group tone value to the density data of the large-size dot and the small-size dot.

Figure 35:
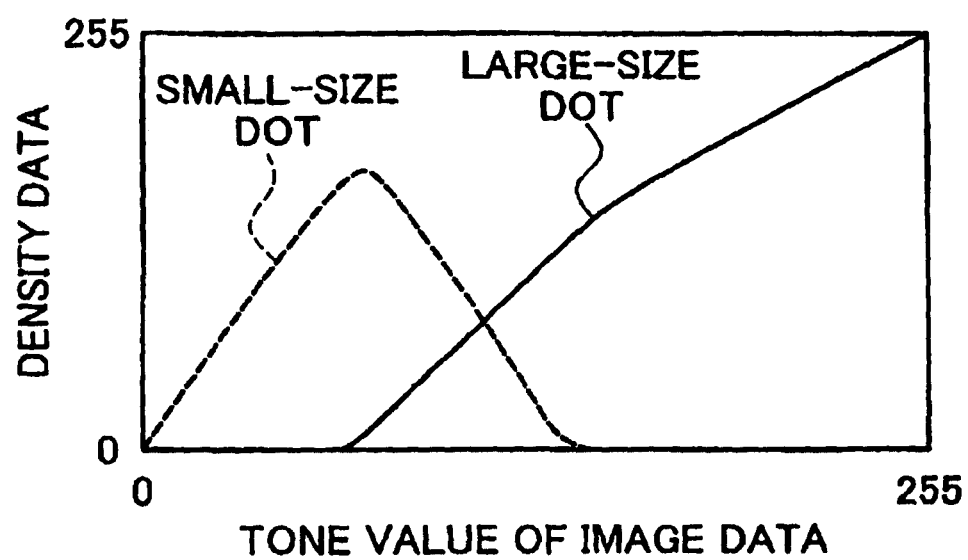
FIG. 35 conceptually shows a dot density conversion table referred to for conversion of a pixel group tone value to density data of the large-size dot and the medium-size dot.

FIG. 35 conceptually shows the dot density conversion table referred to for conversion of the pixel group tone value to the density data of the large-size dot and the medium-size dot. The dot density conversion table shown in FIG. 22 sets the density data of the small-size dot, the medium-size dot, and the large-size dot against the tone value of image data. The dot density conversion table shown in FIG. 35, on the other hand, sets the density data of only the small-size dot and the large-size dot against the tone value of image data. After conversion of the pixel group tone value to the density data of the large-size dot and the small-size dot, the procedure compares the density data of the large-size dot with threshold values set at a corresponding position in the dither matrix to determine the on-off state of the large-size dot in respective pixels of the pixel group. The procedure then sums up the density data of the large-size dot and the density data of the small-size dot to compute intermediate data of the small-size dot and compares the intermediate data of the small-size dot with the threshold values in the dither matrix to determine the on-off state of the small-size dot in the respective pixels of the pixel group.

Figure 36:
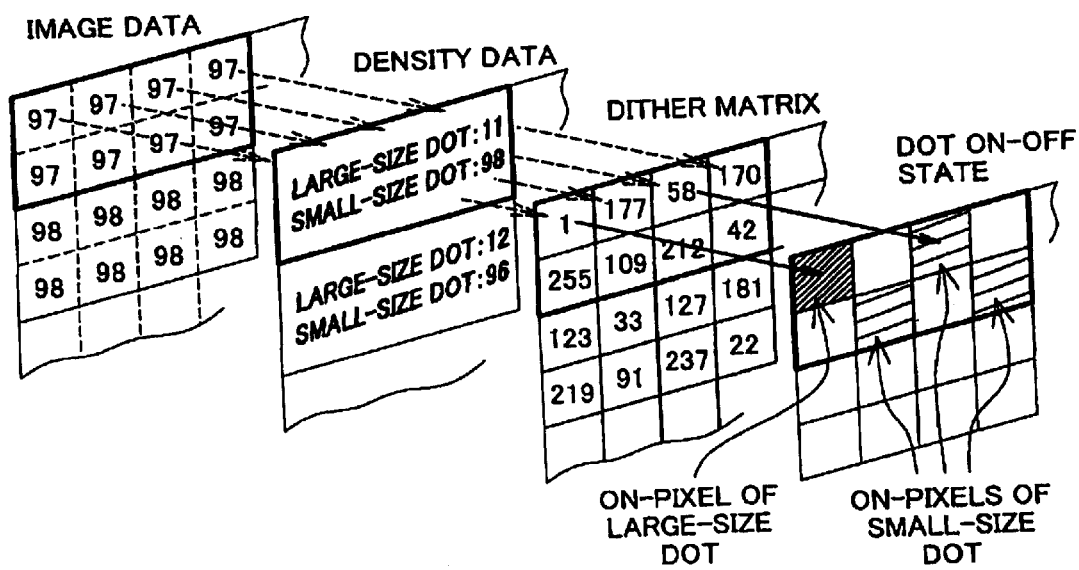
FIG. 36 conceptually shows an example of determining the on-off state of the large-size dot and the small-size dot in respective pixels of a pixel group.

FIG. 36 conceptually shows an example of determining the on-off state of the large-size dot and the small-size dot in respective pixels of a pixel group having a pixel group tone value '97'. In the illustrated example, the density data of the large-size dot is equal to '11'. The large-size dot is to be created in one pixel having a smaller threshold value in the dither matrix than the density data '11' of the large-size dot. The on-pixel of the large-size dot is filled with fine slant lines. The intermediate data of the small-size dot is equal to 109 as the sum of the density data of the large-size dot and the density data of the small-size dot. The small-size dot is to be created in off-pixels of the large-size dot having smaller threshold values in the dither matrix than the intermediate data '109' of the small-size dot. The on-pixels of the small-size dots are filled with rough slant lines. In the pixel group having the pixel group tone value '97', one large-size dot and three small-size dots are to be created according to the distribution pattern shown in FIG. 36. This series of operations is performed with regard to all pixel group tone values varying in the tone value range of 0 to 255 to specify pixel group tone values having changes in dot on-off state as threshold tone values.

When the available dots are the large-size dot and the small-size dot and each pixel group consists of 8 pixels, the number of the detected threshold tone values is in a range of 11 to 15 with regard to practically all pixel groups. Application of different settings of threshold values in a dither matrix onto individual pixel groups located at different positions in an image naturally gives different dot creation patterns. As mentioned previously, the dither matrix is required to give favorable dot dispersibility and accordingly has no significant difference in distribution of threshold values among pixel groups. The number of detected threshold tone values is thus practically fixed in the range of 11 to 15, irrespective of the positions of the pixel groups in the image. Detection of the 11 to 15 threshold tone values in each pixel group results in duodecimal to hexadecimal notation of the pixel group tone values and accordingly gives 12 to 16 different multivalue codes. Expression of these multivalue codes requires 4-bit data. Since one multivalue code is generated with regard to each pixel group, the data volume of control data transferred from the computer 100 to the color printer 200 is calculated as (number of pixel groups)×4 bits.

The image printing process of the second modified example skips out some of the threshold tone values detected in each pixel group to reduce the total number of different multivalue codes to 8. Expression of the 8 different multivalue codes requires only 3-bit data. Such skip-out reduces the required data volume for expression of the multivalue codes to ¾ and the data volume of the control data transferred from the computer 100 to the color printer 200 to ¾, thus attaining high-speed transfer of the control data. Simple skip-out of threshold tone values for the less variety of multivalue codes may, however, cause deterioration of the picture quality. The image printing process of the second modified example thus adopts the following technique to skip out some of the detected threshold tone values with minimized deterioration of the picture quality.

Figure 37:
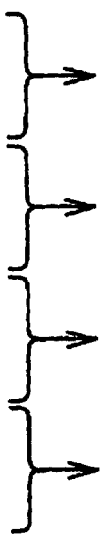
FIG. 37 shows an example of skipping out some of detected threshold tone values for reduction of the total number of threshold tone values in a second modified example.

FIG. 37 shows an example of skipping out some of detected threshold tone values for reduction of the total number of threshold tone values in a second modified example. The left half of FIG. 37 shows threshold tone values detected with regard to a certain pixel group in the structure of creating the two variable size dots, the large-size dot and the small-size dot. As mentioned above, when the available dots are the large-size dot and the small-size dot and each pixel group consists of 8 pixels, the number of the detected threshold tone values is in the range of 11 to 15 with regard to practically all pixel groups. In the example of FIG. 37, there are 11 threshold tone value Vth detected in this pixel group. This means generation of 12 different multivalue codes.

The image printing process of the second modified example skips out 4 threshold tone values Vth for reduction of the detected 11 threshold tone values Vth to 7 and accordingly decreases the variety of multivalue codes to 8. The adopted procedure skips out every other threshold tone values detected in a high tone area to minimize the potential deterioration of the picture quality. The skip-out of threshold tone values has no influence in a low tone area that significantly affects the picture quality. This skip-out technique thus desirably minimizes the potential deterioration of the picture quality. In the illustration of FIG. 37, the threshold tone values highlighted with slant lines are skipped out. The number of threshold tone values detected in each pixel group is thus reduced from 11 to 7 by skip-out of every alternate threshold tone values in the high tone area. A multivalue code table is then set according to the remaining threshold tone values after the skip-out. The skip-out technique enables expression of each multivalue code by 3-bit data and accordingly reduces the total data volume of control data transferred from the computer 100 to the color printer 200. This arrangement ensures high-speed image output with minimized deterioration of the picture quality.

The image printing process of the second modified example may additionally adjust the remaining threshold tone values after the skip-out to have appropriate tone differences. In the illustrated example of FIG. 37, the skip-out of four threshold tone values 95, 150, 183, and 231 gives a tone difference of 42 between remaining threshold tone values 74 and 116, a tone difference of 62 between remaining threshold tone values 116 and 178, a tone difference of 34 between remaining threshold tone values 178 and 212, and a tone difference of 43 in a range over 212. As mentioned above, the insufficient resolution of tone expression in the low tone area remarkably deteriorates the picture quality. Relatively smaller tone differences are thus desirable in the lower tone area. The remaining threshold tone values after the skip-out are adjusted to have a better distribution of tone differences. FIG. 38 shows adjustment of remaining threshold tone values after the skip-out to have a better distribution of tone differences. The adjustment reduces the tone difference between the adjacent threshold tone values in the low tone area that significantly affects the picture quality, while keeping the greater tone differences between the adjacent threshold tone values in the high tone area that has the less influence on the picture quality. This effectively improves the resulting picture quality.

D-3. Third Modified Example

The image printing process of the embodiment independently selects threshold tone values for skip-out in each pixel group. Selection of threshold tone values for skip-out may be performed in a related manner to prevent skip-out of close threshold tone values between at least adjacent pixel groups. An image printing process of a third modified example skips out some of threshold tone values in one pixel group for reduction of the variety of multivalue codes by taking into account the skip-out in an adjacent pixel group.

FIG. 39 conceptually shows skip-out of threshold values with consideration to prevent skip-out of close threshold tone values between adjacent pixel groups. In the illustrated example of FIG. 39, 17 threshold tone values have been detected in each of adjacent pixel groups A and B. The presence of 17 threshold tone values gives 18 different multivalue codes and requires 5-bit data for expression of these multivalue codes. Skip-out of 2 threshold tone values in each of the pixel groups A and B reduces the variety of multivalue codes to 16, which requires only 4-bit data for expression. As mentioned above, skip-out of every other threshold tone values detected in the high tone area minimizes the potential deterioration of the picture quality. The $16^{th}$ threshold tone value '225' and the $14^{th}$ threshold tone value '203' are thus to be skipped out in the pixel group A.

Similarly the skip-out of every other threshold tone values in the high tone area expels the $16^{th}$ threshold tone value '239' and the $14^{th}$ threshold tone value '202' in the pixel group B adjacent to the pixel group A. Such selection of the threshold tone values for skip-out expels the two close threshold tone values '203' and '202' in the adjacent pixel groups A and B. The skip-out effect of the close threshold tone values between the two continuous pixel groups undesirably increases the potential for deterioration of the picture quality. The skip-out threshold tone value in the pixel group B is thus changed from the 14th threshold tone value '202' to the 13th threshold tone value '171'.

Threshold tone values for skip-out in adjacent pixel groups are selected to restrict the tone difference between skip-out threshold tone values in the adjacent pixel groups to or above a preset value, for example, a tone difference of '10'. This arrangement disperses the skip-out effect of the threshold tone values to different tone ranges in the adjacent pixel groups A and B, thus reducing the potential for deterioration of the picture quality and ensuring high-quality image output.

D-4. Fourth Modified Example

The dot on-off state determination process of the embodiment converts the combination of the classification number and the multivalue code of each pixel group to dot number data representing the numbers of the respective size dots to be created in the pixel group. The dot on-off state in the respective pixels of the pixel group is determined sequentially with regard to the respective size dots. For example, the dot on-off state determination process shown in the flowchart of FIG. 11 sequentially determines the dot on-off state of the large-size dot, the dot on-off state of the medium-size dot, and the dot on-off state of the small-size dot. This processing flow is, however, not restrictive. One possible modification may sequentially select one pixel in a pixel group and specify the dot creation state of the selected pixel as creation of the large-size dot, creation of the medium-size dot, creation of the small-size dot, or creation of no dot. Such modification is described below as a modified dot on-off state determination process executed in an image printing process of a fourth modified example.

The modified dot on-off state determination process executed in the fourth modified example is described below with reference to the flowchart of FIG. 40.

Like the dot on-off state determination process of the embodiment, the modified dot on-off state determination process first selects a pixel group as a processing object (step S700), obtains a multivalue code of the selected pixel group (step S702), and generates dot number data representing the numbers of the respective size dots to be created in the pixel group, based on the multivalue code and a classification number of the pixel group (step S704). The dot number data is readily obtained corresponding to the combination of the classification number and the multivalue code of the pixel group by simply referring to the conversion table of FIG. 12.

The modified dot on-off state determination process then converts the generated dot number data to intermediate data of a 16-bit length (step S706). The conversion table of FIG. 12 expresses the dot number data as code data of an 8-bit length for reduction of the total data volume. The modified dot on-off state determination process converts the dot number data to the 16-bit intermediate data expressed in the form that facilitates determination of the dot on-off state. The intermediate data has the 16-bit length since each pixel group consists of 8 pixels and the dot on-off state of each pixel is expressible by 2-bit data. Namely the 16-bit intermediate data uses 8 sets of 2-bit data corresponding to the 8 pixels to represent the numbers of the respective size dots. Such expression of the numbers of the respective size dots to be created in each pixel group is readily correlated to the respective pixels in the pixel group and thus facilitates determination of the dot on-off state. A correlation map setting intermediate data in relation to code data is prepared and stored in advance. The modified dot on-off state determination process refers to this correlation map to obtain the intermediate data at step S706.

FIG. 41 shows a correlation map of correlating the intermediate data to the code data representing the numbers of the respective size dots. As described previously, the code data is correlated to each combination of the numbers of the respective size dots (see FIG. 13). The 16-bit data includes 8 sets of 2-bit data aligned corresponding to 8 pixels included in each pixel group, where each 2-bit data represents the dot on-off state of each pixel. The code data is converted to such intermediate data of the 16-bit length.

For example, code data '1' represents a combination of 0 large-size dot, 0 medium-size dot, and 1 small-size dot. For the purpose of reference, the right half of FIG. 41 shows the combinations of the numbers of the respective size dots represented by the respective code data. When creation of the small-size dot and creation of no dot are respectively expressed by 2-bit data '01' and 2-bit data '00', 16-bit data corresponding to the code data '1' includes 1 set of the 2-bit data '01' and 7 sets of the 2-bit data '00'.

In another example, code data '163' represents a combination of 7 large-size dots, 1 medium-size dot, and 0 small-size dot. When creation of the large-size dot and creation of the medium-size dot are respectively expressed by 2-bit data '11' and 2-bit data '10', 16-bit data corresponding to the code data '163' includes 7 sets of the 2-bit data '11' and 1 set of the 2-bit data '10'.

The string of the 2-bit data is set in the order of the large-size dot, the medium-size dot, and the small-size dot in a right-aligned manner. For example, in a combination of 1 large-size dot, 2 medium-size dots, and 3 small-size dots, 1 set of the 2-bit data '11' representing creation of the large-size dot is arranged on the right-most end, 2 sets of the 2-bit data '10' representing creation of the medium-size dot are arranged on the left of the 2-bit data '11', and 3 sets of the 2-bit data '01' representing creation of the small-size dot are arranged on the left of the 2-bit data '10'. The remaining 2-bit data spaces on the left end have 2 sets of the 2-bit data '00' representing creation of no dot. The string of the 2-bit data may alternatively be set in the order of the large-size dot, the medium-size dot, and the small-size dot in a left-aligned manner.

Figure 40:
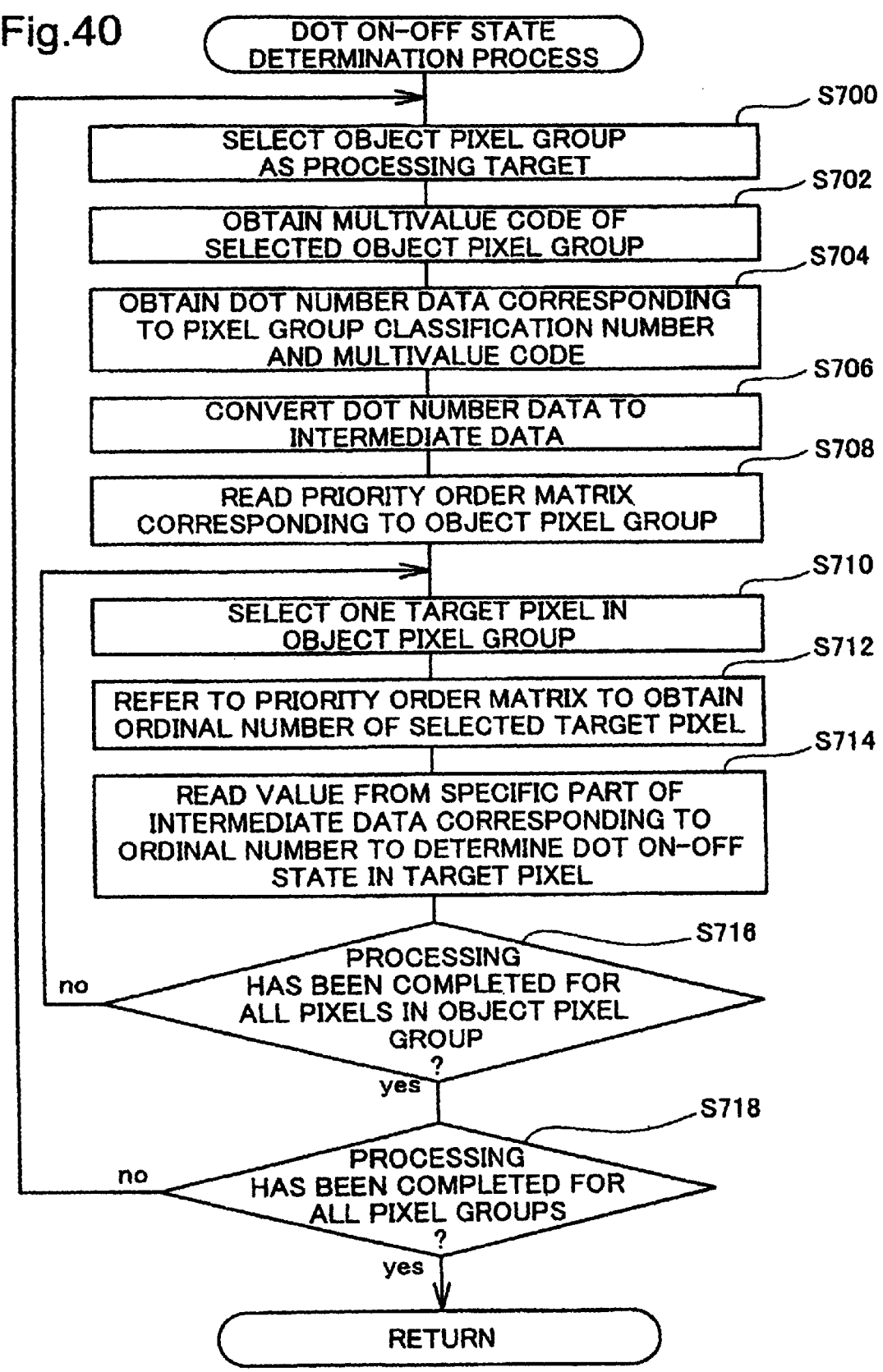
FIG. 40 is a flowchart showing a modified dot on-off state determination process executed in a fourth modified example.

The modified dot on-off state determination process of FIG. 40 refers to the correlation map of FIG. 41 to convert the dot number data to the 16-bit intermediate data at step S706. This modified process first refers to the conversion table of FIG. 12 to convert the combination of the classification number and the multivalue code of the selected pixel group to 8-bit code data as the dot number data and then refers to the correlation map of FIG. 41 to convert the 8-bit code data to 16-bit intermediate data. The code data is one-to-one related to the intermediate data. The 8-bit code data set in the conversion table of FIG. 12 may thus be replaced by the 16-bit intermediate data. The 16-bit intermediate data is then directly obtainable corresponding to the combination of the classification number and the multivalue code of each pixel group. This arrangement enables the higher-speed generation of the 16-bit intermediate data, although increasing the total data volume of the conversion table.

After generation of the intermediate data, the modified dot on-off state determination process reads a priority order matrix corresponding to the selected pixel group (step S708), selects one pixel in the pixel group as a processing target for determination of the dot on-off state (step S710), and reads an ordinal number set at a pixel position corresponding to the selected pixel from the priority order matrix (step S712).

Figure 42A:
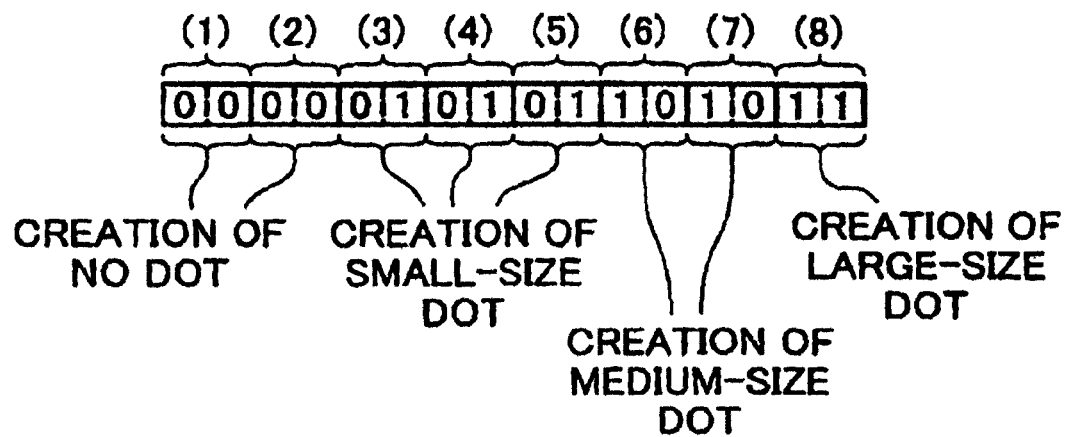
FIGS. 42A through 42C show determination of the dot on-off state by reading 2-bit data set at a position corresponding to a specified ordinal number from intermediate data.

The modified dot on-off state determination process then reads the 2-bit data set at a position corresponding to the ordinal number of the selected pixel from the 16-bit intermediate data to determine the dot on-off state of the selected pixel (step S714). FIG. 42 shows determination of the dot on-off state by reading 2-bit data set at a position corresponding to a specified ordinal number from intermediate data. FIG. 42A shows intermediate data obtained by conversion of code data representing the numbers of the respective size dots to be created in one pixel group. As mentioned above, the intermediate data has the 16-bit length and includes 8 sets of 2-bit data. The 16-bit intermediate data of FIG. 42A includes 1 set of the 2-bit data '11' representing creation of the large-size dot, 2 sets of the 2-bit data '10' representing creation of the medium-size dot, 3 sets of the 2-bit data '01' representing creation of the small-size dot, and 2 sets of the 2-bit data '00' representing creation of no dot. These 2-bit data are arranged in the order of the large-size dot, the medium-size dot, and the small-size dot in a right-aligned manner.

Figure 42B:

It is here assumed that the pixel selected as a processing target for determination of the dot on-off state has an ordinal number '3'. Reading the 2-bit data set as the $3^{rd}$ right 2-bit data from the intermediate data specifies the dot creation state in the pixel having the ordinal number '3'. FIG. 42B conceptually shows a process of reading the $3^{rd}$ right 2-bit data from the intermediate data. In the illustrated example, the 2-bit data read from the intermediate data is '10', so that creation of the medium-size dot is specified as the dot creation state of this pixel. When the selected pixel has an ordinal number '1', the right-most 2-bit data is read from the intermediate data and creation of the large-size dot is specified as the dot creation state of this pixel.

The modified dot on-off state determination process determines the dot on-off state of each pixel by the extremely simple operation of reading the 2-bit data set at a position corresponding to an ordinal number of the pixel from the 16-bit intermediate data, because of the following reason. As mentioned above, the intermediate data includes the sets of 2-bit data representing creation of the large-size dot, the medium-size dot, and the small-size dot in the right-aligned manner. The dot on-off state determination process on the basis of the dither technique sequentially determines the dot on-off state in the order of the large-size dot, the medium-size dot, and the small-size dot as shown in FIGS. 21 and 23. The sequential read of the 2-bit data from the right end of the intermediate data gives a data string of the 2-bit data representing creation of the large-size dot, the medium-size dot, and the small-size dot. This arrangement is equivalent to the order of determining the positions of the on-pixels of the respective size dots by the modified dither technique shown in FIGS. 21 and 23.

The modified dither technique shown in FIGS. 21 and 23 sequentially specifies the pixels with the smaller threshold values in the dither matrix as the dot-on pixels. The ordinal numbers set in the priority order matrix represent the ascending order of the threshold values set in the dither matrix. The ordinal number of each pixel is accordingly equal to the priority order of dot creation by the modified dither technique shown in FIGS. 21 and 23.

The ordinal number of each pixel in a pixel group accordingly specifies the priority order of dot creation in the pixel of the pixel group by the modified dither technique shown in FIGS. 21 and 23. The read of the 2-bit data set at the position corresponding to the ordinal number from the right end of the intermediate data specifies the dot on-off state determined by the modified dither technique shown in FIGS. 21 and 23.

Figure 42C:

The procedure of this modified example changes the reading position of 2-bit data from the intermediate data according to the specified ordinal number. One possible modification may fix the reading position of 2-bit data from the intermediate data but shift the data string of the intermediate data by a number of 2-bit data sets corresponding to the specified ordinal number. The shift of the data straight of the intermediate data also enables determination of the dot on-off state. FIG. 42C conceptually shows a process of determining the dot on-off state by the shift of the data string of the intermediate data. In the illustrated example, the reading position of 2-bit data is fixed to the right end of the intermediate data, and the data string of the intermediate data is shifted rightward by the number of 2-bit data sets corresponding to the specified ordinal number of the pixel (that is, (ordinal number–1) sets). As clearly understood from the comparison between FIGS. 42B and 42C, the identical 2-bit data set is read from the intermediate data. Shift of a data string by a preset number of bits is executable at a relatively high speed. The shift of the data string of the intermediate data in this manner enables the high-speed read of 2-bit data set at a position corresponding to a specified ordinal number of each pixel from the intermediate data and thereby quick determination of the dot on-off state of the pixel.

In this manner, the modified dot on-off state determination process of FIG. 40 reads the 2-bit data set at the position corresponding to the ordinal number of the selected pixel from the intermediate data to determine the dot on-off state of the selected pixel (step S714). The modified dot on-off state determination process then specifies whether determination of the dot on-off state has been completed for all the pixels included in the currently selected pixel group selected as the processing target (step S716). When there is any unprocessed pixel in the pixel group (step S716: No), the processing flow goes back to step S710 to select a next pixel in the pixel group as a new processing target and repeats the subsequent series of processing for the newly selected pixel. This series of processing is repeated until completion of determination of the dot on-off state in all the pixels included in the currently selected pixel group (step S716: Yes). On completion of the processing for all the pixels in the currently selected pixel group, the modified dot on-off state determination process specifies whether determination of the dot on-off state has been completed for all the pixel groups included in the object image (step S718). When there is any unprocessed pixel group (step S718: No), the processing flow goes back to step S700 to select a next pixel group as a new processing target and repeats the subsequent series of processing for the newly selected pixel group. On completion of determination of the dot on-off state in all the pixel groups included in the object image (step S718: Yes), the processing flow exits from the modified dot on-off state determination process of FIG. 40.

As described above, this modified dot on-off state determination process readily determines the dot on-off state of each pixel by simply reading 2-bit data set at a position corresponding to a specified ordinal number from 16-bit intermediate data. The image printing process of the fourth modified example quickly determines the dot on-off state of individual pixels in this manner and thereby attains high-speed image printing.

D-5. Fifth Modified Example

The modified dot on-off state determination process of the fourth modified example refers to the conversion table of FIG. 12 to convert the received multivalue code of each pixel group to intermediate data representing the numbers of the respective size dots and subsequently refers to the priority matrix to determine the positions of the on-pixels of the respective size dots in the pixel group. One possible modification may directly determine the positions of the on-pixels of the respective size dots to be created in each pixel group, based on the multivalue code of the pixel group. Such modification is described below as a modified dot on-off state determination process of a fifth modified example.

For the better understanding, the principle of direct determination of the positions of the on-pixels of the respective size dots in one pixel group according to the multivalue code of the pixel group is described briefly, prior to the description of the modified dot on-off state determination process of the fifth modified example. The dot on-off state determination process of the embodiment obtains the multivalue code and the classification number of a pixel group and specifies the numbers of the respective size dots to be created in the pixel group, based on the combination of the multivalue code and the classification number of the pixel group as shown in FIG. 31. The dot on-off state determination process of the embodiment then refers to the priority order matrix corresponding to the classification number and determines the positions of the on-pixels of the respective size dots in the pixel group. Namely the combination of the multivalue code and the classification number of each pixel group specifies a set of dots to be created in respective pixels of the pixel group. A set of dots to be created in respective pixels of a pixel group is specified corresponding to each combination of the multivalue code and the classification number and is stored in a correlation table. The dot on-off state of each pixel is directly determinable by simple reference to this correlation table. The modified dot on-off state determination process of the fifth modified example adopts this idea to directly determine the dot on-off state of the respective pixels included in each pixel group according to the multivalue code of the pixel group.

FIG. 43 conceptually shows a conversion table referred to in the modified dot on-off state determination process of the fifth modified example. The conversion table used in the fifth modified example sets data representing a set of dots to be created in pixels of one pixel group corresponding to each combination of the multivalue code and the classification number. In the description below, such data is referred to as dot data. Simple reference to the conversion table shown in FIG. 43 readily specifies dot data corresponding to each combination of the classification number and the multivalue code of one pixel group. For example, dot data DD(i,j) is obtained corresponding to a combination of a classification number 'i' and a multivalue code 'j' in a certain pixel group. The dot data indicates the dot on-off state in respective pixels of the pixel group.

Figures 44A, 44B:
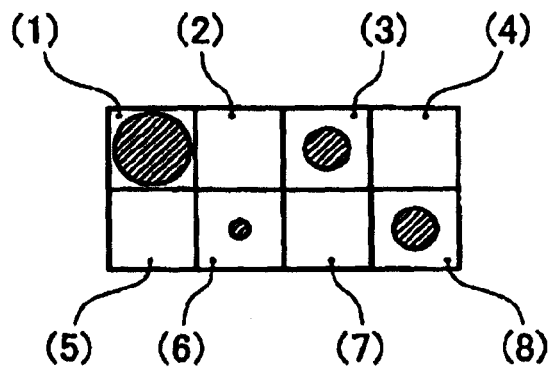
FIGS. 44A and 44B show the data structure of dot data set in the conversion table of the fifth modified example.

FIG. 44 shows the data structure of the dot data set in the conversion table of the fifth modified example. As shown in FIG. 44A, the dot data has a 16-bit length and includes 8 sets of 2-bit data. One dot data includes 8 sets of 2-bit data since each pixel group includes 8 pixels in this example. One dot data includes 16 sets of 2-bit data when each pixel group includes 16 pixels. Each data set has a 2-bit length since the color printer 200 of the embodiment takes one of the four dot creation states in each pixel, that is, creation of the large-size dot, creation of the medium-size dot, creation of the small-size dot, and creation of no dot. One of the four dot creation state in each pixel is expressible by 2-bit data. Each data set corresponding to one pixel accordingly has the 2-bit length.

As shown in FIG. 44, the 8 sets of 2-bit data included in the dot data respectively correspond to 8 pixels at predetermined positions in each pixel group. For example, a $1^{st}$ set of 2-bit data on the head of the dot data shown in FIG. 44A corresponds to a pixel on an upper left corner in the pixel group as shown in FIG. 44B. A $2^{nd}$ set of 2-bit data in the dot data corresponds to a second left pixel on the upper row in the pixel group. In this manner, the 8 sets of 2-bit data included in the dot data respectively correspond to the 8 pixels at the respective positions in each pixel group.

The 2-bit data of each data set represents the dot type to be created in the corresponding pixel. The 2-bit data '11', '10', '01', and '00' respectively represent creation of the large-size dot, creation of the medium-size dot, creation of the small-size dot, and creation of no dot. The dot data shown in FIG. 44A accordingly indicates creation of the large-size dot in the pixel on the upper left corner of the pixel group, creation of the medium-size dot in a third left pixel on the upper row and in a pixel on the lower right corner of the pixel group, creation of the small-size dot in a second left pixel on the lower row, and creation of no dot in all the other pixels.

Simple reference to this conversion table enables direct determination of the dot on-off state of the respective dots in one pixel group based on the classification number and the multivalue code of the pixel group.

The modified dot on-off state determination process of the fifth modified example determines the dot on-off state of the respective pixels included in each pixel group based on the multivalue code as described below.

Figure 45:
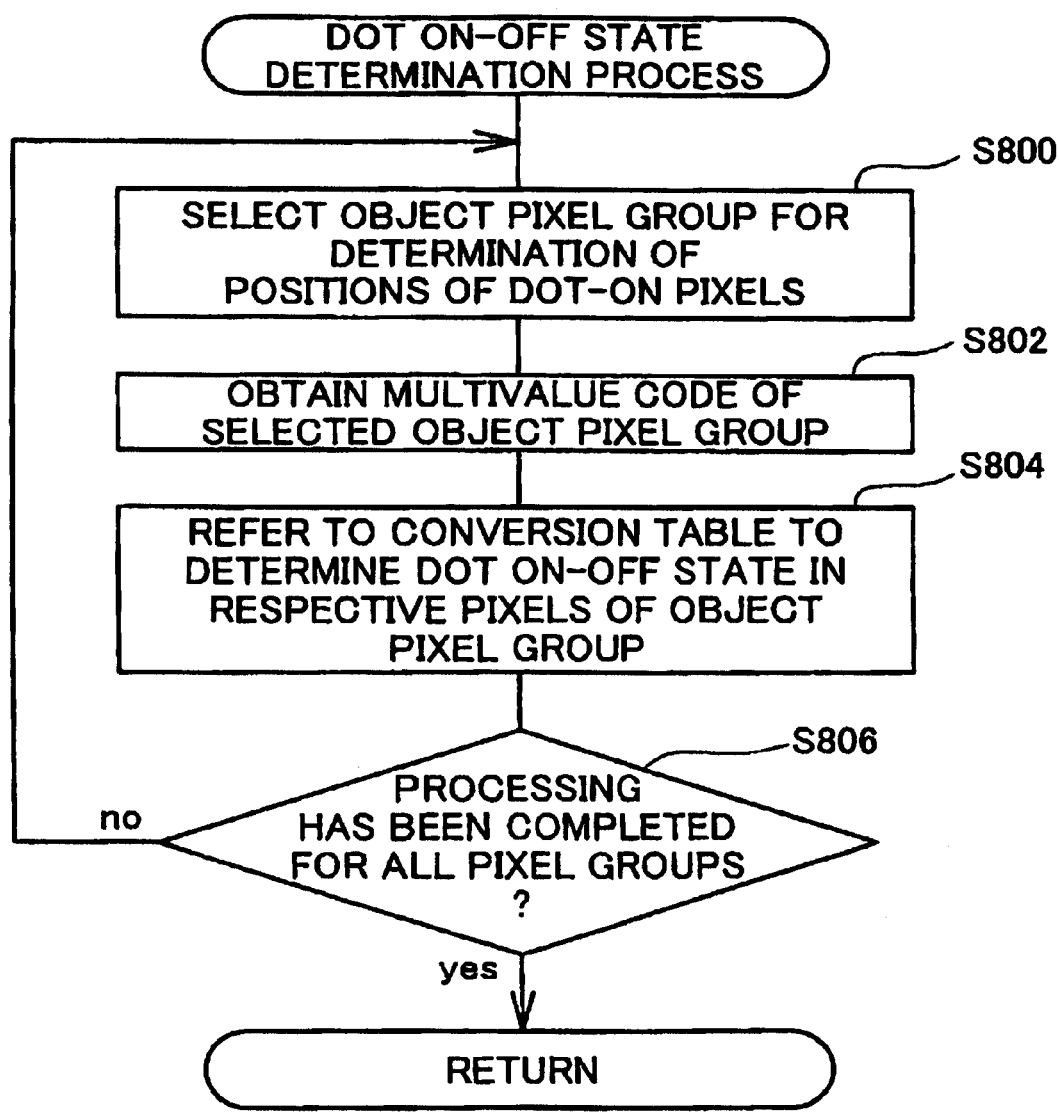
FIG. 45 is a flowchart showing the modified dot on-off state determination process executed in the fifth modified example.

FIG. 45 is a flowchart showing the modified dot on-off state determination process of the fifth modified example. The modified dot on-off state determination process first selects one pixel group as a processing object (step S800) and obtains a multivalue code and a classification number of the selected pixel group (step S802). The modified dot on-off state determination process refers to the conversion table shown in FIG. 43 and reads dot data representing the dot on-off state of the respective pixels included in the selected pixel group, corresponding to the combination of the classification number and the multivalue code (step S804). The modified dot on-off state determination process of the fifth modified example simply reads the dot data stored at the specified position of the conversion table to determine the dot on-off state of the respective pixels included in each pixel group.

The modified dot on-off state determination process then determines whether determination of the dot on-off state has been completed for all the pixel groups (step S806). When there is any unprocessed pixel group (step S806: No), the modified dot on-off state determination process returns to step S800 to select a next pixel group as a new processing object and repeats the subsequent series of processing with regard to the next pixel group. When determination of the dot on-off state has been completed for all the pixel groups (step S806: Yes) during the repetition of processing, the processing flow exits from the modified dot on-off state determination process of the fifth modified example shown in FIG. 45.

As described above, the modified dot on-off state determination process of the fifth modified example refers to the conversion table only once and immediately determines the on-off state of the respective size dots in respective pixels of each pixel group, based on the multivalue code. This arrangement further accelerates the determination of the dot on-off state in the respective pixels and thereby enables the higher-speed image output, compared with even the dot on-off state determination processes of the embodiment and the various modified examples described above.

The embodiment and its modified examples discussed above are to be considered in all aspects as illustrative and not restrictive. There may be many modifications, changes, and alterations without departing from the scope or spirit of the main characteristics of the present invention.

For example, in the embodiment and its modified examples described above, the greater pixel group tone value in one pixel group is converted to the greater multivalue code. Such conversion is, however, not essential. The greater pixel group tone value in one pixel group may be converted to the smaller multivalue code. Otherwise the magnitude relation in conversion of the pixel group tone value to the multivalue code may be inverted partly.

In the embodiment and its modified examples described above, the number of pixels included in each pixel group is fixed in any images. The number of pixels included in each pixel group may be determined appropriately according to the resolution of an object image for printing or according to the resolution of supplied image data.

In this application, the variety of multivalue codes may be restricted according to the number of pixels included in each pixel group. The higher number of pixels included in each pixel group naturally causes the greater variety of multivalue codes. In such cases, it is preferable to restrict the variety of multivalue codes adequately. This enables high-speed image output with minimized deterioration of the picture quality even when each pixel group consists of a higher number of pixels.

The embodiment and its modified examples regard the image printing process that creates dots on printing paper to give a printed image. The technique of the invention is, however, not restricted to image printing but may be applied in variety of other fields. For example, the technique of the invention is applicable to a liquid crystal display device that disperses bright points at adequate densities on a liquid crystal display screen to express an image of continuously varying tones.

What is claimed is:

1. An image processing device that processes image data representing a multi-tone image by multivalue coding and outputs results of the multivalue coding, said image processing device comprising:
    a pixel group tone value specification module that collects every preset number of multiple pixels to one pixel group to divide a large number of pixels constituting the image to plural pixel groups, and specifies a pixel group tone value as a representative tone value of each pixel group;
    a correlation map storage module that stores in advance plural correlation maps, each correlation map setting a restricted number of multivalue codes obtained as results of the multivalue coding in correlation to pixel group tone values, where the restricted number of multivalue codes is less than a total number of possible states, one of which is selectively specified for each pixel group based on a preset number of threshold values provided corresponding to the preset number of multiple pixels included in the pixel group;
    a multivalue coding module that selects one correlation map for each pixel group among the stored plural correlation maps and refers to the selected correlation map to convert the specified pixel group tone value of the pixel group to a multivalue code; and
    an output module that outputs multivalue codes of all the plural pixel groups.

2. An image processing device in accordance with claim 1, wherein each of the plural correlation maps stored in said correlation map storage module sets plural changeover tone values defined as pixel group tone values having stepwise changes in multivalue code when the multivalue codes are arranged in a magnitude order of the pixel group tone values,
    where at least half of the plural changeover tone values are identical with plural threshold tone values defined as pixel group tone values having changes in state specified for each pixel group based on the threshold values provided corresponding to the multiple pixels included in the pixel group.

3. An image processing device in accordance with claim 1, wherein the threshold values provided corresponding to the multiple pixels included in each pixel group are selected from a global dither matrix, based on a position of the pixel group in the image.

4. An image processing device in accordance with claim 2, wherein a matching rate of the plural changeover tone values set in each correlation map with the plural threshold tone values is higher in a lower tone value area of the image data below a medium tone value than in a higher tone value area of the image data above the medium tone value.

5. An image processing device in accordance with claim 2, wherein at least half of the changeover tone values set in each correlation map are identical with remaining threshold tone values after exclusion of a preset number of non-adjacent but discrete threshold tone values from the plural threshold tone values arranged in a magnitude order.

6. An image processing device in accordance with claim 5, wherein the preset number of non-adjacent but discrete threshold tone values are excluded from the plural threshold tone values at predetermined intervals in a higher tone value area.

7. An image processing device in accordance with claim 2, wherein at least half of the changeover tone values set in each correlation map are identical with remaining threshold tone values after exclusion of one of adjacent threshold tone values having a tone difference of not greater than a preset value when the plural threshold tone values are arranged in a magnitude order.

8. An image processing device in accordance with claim 1, wherein each correlation map referred to for multivalue coding of each pixel group is specified by taking into account plural changeover tone values with stepwise changes in multivalue code set in another correlation map applied to another pixel group adjoining to the pixel group.

9. An image processing device in accordance with claim 8, wherein at least half of the plural changeover tone values set in each correlation map are identical with remaining threshold tone values after exclusion of at least one threshold tone value from plural threshold tone values with changes in state specified for each pixel group based on the threshold values provided corresponding to the multiple pixels included in the pixel group, and
    the at least one excluded threshold tone value is selected such that corresponding changeover tone values between correlation maps applied to adjacent pixel groups have at least a preset tone difference.

10. An image processing device in accordance with claim 1, wherein said correlation map storage module stores plural different combinations of multiple threshold values as the plural correlation maps, and
    said multivalue coding module refers to a correlation map selected for each pixel group and compares the specified pixel group tone value of the pixel group with the multiple threshold values set in the selected correlation map to convert the pixel group tone value to a multivalue code.

11. An image processing device in accordance with claim 1, wherein each multivalue code is defined as a combination of three different dots having different tone values,
    said pixel group tone value specification module specifies the pixel group tone value as a representative tone value of each pixel group consisting of a preset number N of pixels, where N is an integer of not less than 2, and
    each correlation map stored in said correlation map storage module sets multivalue codes of not less than (N+2) and of not greater than 2N.

12. An image processing device in accordance with claim 11, wherein each correlation map stored in said correlation map storage module sets a fixed number 2N of multivalue codes.

13. An image processing device in accordance with claim 1, wherein each multivalue code is defined as a combination of two different dots having different tone values,
   said pixel group tone value specification module specifies the pixel group tone value as a representative tone value of each pixel group consisting of a preset number N of pixels, where N is an integer of not less than 2, and
   each correlation map stored in said correlation map storage module sets (N+1) multivalue codes.

14. An image processing device in accordance with claim 13, wherein said pixel group tone value specification module specifies the pixel group tone value as a representative tone value of each pixel group consisting of a preset number M of pixels, where M is an integer expressible as a power of 2, and
   each correlation map stored in said correlation map storage module sets M multivalue codes at the maximum.

15. An image generation system, comprising:
   an image processing device in accordance with claim 1, and
   an image generation device that receives the multivalue codes output from said output module of said image processing device and generates an image based on the received multivalue codes.

16. An image generation system in accordance with claim 15, wherein said image generation device is a printer that is capable of creating at least one type of dots with regard to each of multiple colors on a recording medium and generates the image as a distribution of dots.

17. An image processing method that processes image data representing a multi-tone image by multivalue coding and outputs results of the multivalue coding, said image processing method comprising: Collecting every preset number of multiple pixels to one pixel group to divide a large number of pixels constituting the image to plural pixel groups, and specifying a pixel group tone value as a representative tone value of each pixel group; storing in advance plural correlation maps, each correlation map setting a restricted number of multivalue codes obtained as results of the multivalue coding in correlation to pixel group tone values, where the restricted number of multivalue codes is less than a total number of possible states, one of which is selectively specified for each pixel group based on a preset number of threshold values provided corresponding to the preset number of multiple pixels included in the pixel group; selecting one correlation map for each pixel group among the stored plural correlation maps; and referring to the selected correlation map to convert the specified pixel group tone value of the pixel group to a multivalue code and outputting multivalue codes of all the plural pixel groups,
   Wherein at least one operation of the image processing method is executed by a microprocessor.

18. An image processing method in accordance with claim 17, wherein the multivalue codes are output to an image generation device, which generates an image based on the received multivalue codes.

19. An image processing method in accordance with claim 17, wherein each multivalue code is defined as a combination of three different dots having different tone values,
   the pixel group tone value is specified as a representative tone value of each pixel group consisting of a preset number N of pixels, where N is an integer of not less than 2, and
   each correlation map sets multivalue codes of not less than (N+2) and of not greater than 2N.

20. An image processing method in accordance with claim 17, wherein each multivalue code is defined as a combination of two different dots having different tone values,
   the pixel group tone value is specified as a representative tone value of each pixel group consisting of a preset number N of pixels, where N is an integer of not less than 2, and
   each correlation map sets (N+1) multivalue codes.

21. A program product that causes a computer to attain an image processing method, said image processing method processing image data representing a multi-tone image by multivalue coding and outputting results of the multivalue coding,
   said program product comprising:
   a first program code of collecting every preset number of multiple pixels to one pixel group to divide a large number of pixels constituting the image to plural pixel groups, and specifying a pixel group tone value as a representative tone value of each pixel group;
   a second program code of selecting one of plural correlation maps, which are stored in advance in a storage medium, for each pixel group, each correlation map setting a restricted number of multivalue codes obtained as results of the multivalue coding in correlation to pixel group tone values, where the restricted number of multivalue codes is less than a total number of possible states, one of which is selectively specified for each pixel group based on a preset number of threshold values provided corresponding to the preset number of multiple pixels included in the pixel group;
   a third program code of referring to the selected correlation map to convert the specified pixel group tone value of the pixel group to a multivalue code and outputting multivalue codes of all the plural pixel groups; and
   a recording medium that records said first through third program codes therein.

22. A program product in accordance with claim 21, wherein each multivalue code is defined as a combination of three different dots having different tone values,
   each correlation map sets multivalue codes of not less than (N+2) and of not greater than 2N, where N is an integer of not less than 2, and
   said first program code specifies the pixel group tone value as a representative tone value of each pixel group consisting of a preset number N of pixels.

23. A program product in accordance with claim 21, wherein each multivalue code is defined as a combination of two different dots having different tone values,
   each correlation map sets (N+1) multivalue code, where N is an integer of not less than 2, and
   said first program code specifies the pixel group tone value as a representative tone value of each pixel group consisting of a preset number N of pixels.

* * * * *